United States Patent
Kangas et al.

(10) Patent No.: US 10,323,987 B2
(45) Date of Patent: Jun. 18, 2019

(54) POLARIZATION SELECTIVE, FREQUENCY SELECTIVE, AND WIDE DYNAMIC RANGE DETECTORS, IMAGING ARRAYS, READOUT INTEGRATED CIRCUITS, AND SENSOR SYSTEMS

(71) Applicant: Apple Inc., Cupertino, CA (US)

(72) Inventors: Miikka M. Kangas, Sunnyvale, CA (US); Michael J. Bishop, San Carlos, CA (US); Robert Chen, Mountain View, CA (US); David I. Simon, San Francisco, CA (US); Harold L. Sontag, III, Gilroy, CA (US); George Dee Skidmore, Richardson, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/873,795

(22) Filed: Jan. 17, 2018

(65) Prior Publication Data

US 2018/0143078 A1 May 24, 2018

Related U.S. Application Data

(63) Continuation of application No. 15/542,425, filed as application No. PCT/US2016/012753 on Jan. 8, 2016, now Pat. No. 9,939,322.

(Continued)

(51) Int. Cl.
*G01J 4/00* (2006.01)
*G01J 5/08* (2006.01)
(Continued)

(52) U.S. Cl.
CPC .............. *G01J 5/0825* (2013.01); *G01J 4/04* (2013.01); *G01J 5/0225* (2013.01);
(Continued)

(58) Field of Classification Search
CPC .... G01J 5/0825; G01J 4/04; G01J 5/08; G01J 5/0846; G01J 5/02
(Continued)

(56) References Cited

U.S. PATENT DOCUMENTS

| 5,483,261 A | 1/1996 | Yasutake |
| 5,488,204 A | 1/1996 | Mead et al. |

(Continued)

FOREIGN PATENT DOCUMENTS

| EP | 2 918 983 A1 | 9/2015 |
| JP | 2000-163031 A | 6/2000 |

(Continued)

OTHER PUBLICATIONS

Jones, W. C. et al. (2003). "A Polarization Sensitive Bolometric Receiver for Observations of the Cosmic Microwave Background," SPIE, 4855:227-238.

(Continued)

*Primary Examiner* — Roy M Punnoose
(74) *Attorney, Agent, or Firm* — Morrison & Foerster LLP

(57) ABSTRACT

This relates to sensor systems, detectors, imagers, and readout integrated circuits (ROICs) configured to selectively detect one or more frequencies or polarizations of light, capable of operating with a wide dynamic range, or any combination thereof. In some examples, the detector can include one or more light absorbers; the patterns and/or properties of a light absorber can be configured based on the desired measurement wavelength range and/or polarization direction. In some examples, the detector can comprise a plurality of at least partially overlapping light absorbers for enhanced dynamic range detection. In some examples, the detector can be capable of electrostatic tuning for one or more flux levels by varying the response time or sensitivity (Continued)

to account for various flux levels. In some examples, the ROIC can be capable of dynamically adjusting at least one of the frame rate integrating capacitance, and power of the illumination source.

20 Claims, 27 Drawing Sheets

Related U.S. Application Data

(60) Provisional application No. 62/213,019, filed on Sep. 1, 2015, provisional application No. 62/102,523, filed on Jan. 12, 2015, provisional application No. 62/101,894, filed on Jan. 9, 2015, provisional application No. 62/101,713, filed on Jan. 9, 2015, provisional application No. 62/101,565, filed on Jan. 9, 2015.

(51) Int. Cl.
*G01J 5/02* (2006.01)
*G01J 5/20* (2006.01)
*G01J 4/04* (2006.01)

(52) U.S. Cl.
CPC ........... *G01J 5/0846* (2013.01); *G01J 5/0853* (2013.01); *G01J 5/20* (2013.01); *G01J 2005/202* (2013.01)

(58) Field of Classification Search
USPC ........................................................ 356/370
See application file for complete search history.

(56) References Cited

U.S. PATENT DOCUMENTS

| | | | |
|---|---|---|---|
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,198,099 B1* | 3/2001 | Kim | G01J 5/20 250/338.1 |
| 6,310,610 B1 | 10/2001 | Beaton et al. | |
| 6,323,846 B1 | 11/2001 | Westerman et al. | |
| 6,410,917 B1 | 6/2002 | Choi | |
| 6,690,014 B1* | 2/2004 | Gooch | G01J 5/20 250/338.4 |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,268,349 B2 | 9/2007 | Moon et al. | |
| 7,663,607 B2 | 2/2010 | Hotelling et al. | |
| 8,441,094 B2 | 5/2013 | Brueckl et al. | |
| 8,479,122 B2 | 7/2013 | Hotelling et al. | |
| 8,610,070 B2 | 12/2013 | Schimert et al. | |
| 9,411,055 B2 | 8/2016 | Yoon et al. | |
| 2002/0179837 A1 | 12/2002 | Ray | |
| 2006/0000974 A1 | 1/2006 | Brouns | |
| 2006/0197753 A1 | 9/2006 | Hotelling | |
| 2006/0208189 A1 | 9/2006 | Vilain | |
| 2007/0170363 A1 | 7/2007 | Schimert et al. | |
| 2010/0006757 A1* | 1/2010 | Oda | G01J 5/08 250/330 |
| 2011/0266443 A1* | 11/2011 | Schimert | G01J 1/02 250/338.4 |
| 2011/0266445 A1* | 11/2011 | Beratan | G01J 1/02 250/338.4 |
| 2011/0304005 A1 | 12/2011 | Brueckl et al. | |
| 2014/0175284 A1* | 6/2014 | Roh | G01J 5/0853 250/338.4 |
| 2014/0217289 A1 | 8/2014 | Nam et al. | |
| 2014/0226021 A1 | 8/2014 | Koechlin et al. | |

FOREIGN PATENT DOCUMENTS

| | | |
|---|---|---|
| JP | 2002-342033 A | 11/2002 |
| JP | 2013-047658 A | 3/2013 |
| JP | 2013-530386 A | 7/2013 |
| KR | 10-0658114 | 12/2006 |
| KR | 10-2014-0075462 | 6/2014 |
| WO | WO-2010/094051 A1 | 8/2010 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Notice of Allowance dated Nov. 29, 2017, for U.S. Appl. No. 15/542,425, filed Jul. 8, 2017, eight pages.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Singapore Search Report dated Jul. 11, 2017, for Patent Application No. 11201705483Y, four pages.

Singapore Search report dated Oct. 30, 2018, for Patent Application No. 10201806077V, three pages.

\* cited by examiner

POLARIZATION SELECTIVE, FREQUENCY SELECTIVE, AND WIDE DYNAMIC RANGE DETECTORS, IMAGING ARRAYS, READOUT INTEGRATED CIRCUITS, AND SENSOR SYSTEMS

CROSS-REFERENCE TO RELATED APPLICATIONS

This application is a continuation of U.S. patent application Ser. No. 15/542,425 filed Jul. 8, 2017 (U.S. Patent Application Publication No. 2017/0370776), which claims the benefit of U.S. Provisional Patent Application No. 62/101,565 filed on Jan. 9, 2015; U.S. Provisional Patent Application No. 62/101,713 filed on Jan. 9, 2015; U.S. Provisional Patent Application No. 62/101,894 filed on Jan. 9, 2015; U.S. Provisional Patent Application No. 62/102,523 filed on Jan. 12, 2015; and U.S. Patent Application No. 62/213,019 filed on Sep. 1, 2015, the entire disclosures of which are herein incorporated by reference for all purposes.

FIELD

This relates generally to sensor systems, detectors, imagers, and readout integrated circuits.

BACKGROUND

Detectors, imaging arrays, readout integrated circuits, and sensor systems can be used for a number of applications, such as imaging or the like. In some examples, detectors and sensor systems capable of selectively detecting light based on frequency and/or polarization can be desired.

For a given dynamic range, gain, or mode of operation for a detector, a read-out integrated circuit (ROIC), or both, the sensor system's performance can be compromised when operating outside normal operating parameters. For example, the dynamic range can be limited by how fast the data or stored charge can be read by the processor, which can be important especially when imaging moving objects, such as a human. Therefore, a detector and ROIC capable of operating with a wide or ultra-wide dynamic range and capable of adjusting the dynamic range, gain, or mode of operation can be desired.

An imaging array can be employed to image a scene, and a readout circuit (ROIC) can be coupled to the imaging array to measure the output current from detector pixels included in the imaging array. For a given ROIC, the integrating capacitors can be set prior to operation of the sensor system. However, in some examples, bright (e.g., high photon flux) objects of interest or high illumination powers can lead to high photocurrents measured by the integrating capacitors. Dark current can also be measured by the integrating capacitors, which along with high photocurrents, can lead to saturation of the integrating capacitors. While the system can be cooled or the frame rate can be increased to prevent saturation, these options may be not be suitable for certain applications. The output current from or the optical flux range detected by the detector pixels may change depending on several factors, such as a change in the imaged scene. As a result, the pre-determined parameters of the sensor system may only be optimal for a few instances in time. Therefore, a sensor system and ROIC capable of dynamically adjusting the integrating capacitance, frame rate, illumination source power, and time constant can be desired.

SUMMARY

This relates to detector and sensor systems. Examples of the disclosure are directed to light detectors configured to selectively detect one or more frequencies or wavelengths within a desired measurement wavelength range. In some examples, the light detector can include one or more light absorbers. The one or more light absorbers can be patterned with a plurality of slits, a mesh, as a plate absorber, or a combination thereof. The dimensions of the light absorber and/or properties of the patterns included in the light absorber can be configured based on the desired measurement wavelength range. Examples of the disclosure are also directed to light detectors configured to detect incident light and determining the polarization of incident light. In some examples, the patterns of the light absorbers can be based on polarization direction. In some examples, the orientation direction of the patterns can be different and such that the detector absorbs a plurality of polarizations. The polarization of the incident light can be determined based on the plurality of light absorbers.

This also relates to sensor systems that can include one or more detectors capable of operating with a wide or ultra-wide dynamic range. In some examples, the detector can comprise a plurality of light absorbers with at a least a portion of a first light absorber overlapping a portion of a second light absorber. High flux light can be detected without saturation of the sensor system by allowing the second light absorber to absorb some or all of light not absorbed by the first light absorber. In some examples, low flux light can be accurately detected by allowing incident light to be absorbed by a second light absorber, which can have a lower sensitivity and faster time constant than the first light absorber. In some examples, the detector can comprise a plurality of light absorbers that are non-overlapping. High flux light can be detected by distributing incident light among the plurality of light absorbers, and therefore, saturation of any one light absorber can be prevented. In some examples, at least two of the plurality of light absorbers can have different properties (e.g., dimensions, form factor, heat capacity, and type of material), and therefore, the light absorbers can absorb different amounts of incident light. In some examples, the detector can be capable of electrostatic tuning for one or more flux levels. The electrostatic tuning can vary the response time or sensitivity of the detector to account for both high and low flux light. In some examples, the detector can include an array of detector pixels with intermixed time constants.

This also relates to a system and methods for uncooled detection in the shortwave infrared regime. The system can include a detector operating at a high frame rate (e.g., 1-10 kHz) that employs a large integrating capacitor (e.g., 10-200 mega electron) and an illumination source that actively illuminates the active area of the detector pixels. In some examples, at least one of the frame rate, capacitance of the integrating capacitors, and power of the illumination source can be dynamically adjusted to prevent saturation of the integrating capacitors or to achieve a certain image contrast. In some examples, the product of the frame rate and the capacitance of the integrating capacitors can be proportional to the active area of the detector pixels. In some examples, the power of the illumination source can be such that the photocurrent is between 2-10 times greater than the dark current. In some examples, the imaging array can include intermixed time constants, wherein a ROIC can be coupled to the imaging array and operated at multiple frame rates.

BRIEF DESCRIPTION OF THE DRAWINGS

FIGS. 4N-4O illustrate top views of exemplary light absorbers including encapsulation according to examples of the disclosure.

DETAILED DESCRIPTION

In the following description of examples, reference is made to the accompanying drawings in which it is shown by way of illustration specific examples that can be practiced. It is to be understood that other examples can be used and structural changes can be made without departing from the scope of the various examples.

Representative applications of methods and apparatus according to the present disclosure are described in this section. These examples are being provided solely to add context and aid in the understanding of the described examples. It will thus be apparent to one skilled in the art that the described examples may be practiced without some or all of the specific details. Other applications are possible, such that the following examples should not be taken as limiting.

Various techniques and process flow steps will be described in detail with reference to examples as illustrated in the accompanying drawings. In the following description, numerous specific details are set forth in order to provide a thorough understanding of one or more aspects and/or features described or referenced herein. It will be apparent, however, to one skilled in the art, that one or more aspects and/or features described or referenced herein may be practiced without some or all of these specific details. In other instances, well-known process steps and/or structures have not been described in detail in order to not obscure some of the aspects and/or features described or referenced herein.

Further, although process steps or method steps can be described in a sequential order, such processes and methods can be configured to work in any suitable order. In other words, any sequence or order of steps that can be described in the disclosure does not, in and of itself, indicate a requirement that the steps be performed in that order. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modification thereto, does not imply that the illustrated process or any of its steps are necessary to one or more of the examples, and does not imply that the illustrated process is preferred.

In some examples, a detector capable of operating at or near room temperature may be desired. Detectors operating in the short-wave infrared (SWIR) range can include Mercury Cadmium Telluride (HgCdTe) based, Indium Antimonide (InSb) based, and Indium Gallium Arsenide (InGaAs) based detectors. However, in some examples, these types of detectors can have performance characteristics insufficient for characterization of an object. Additionally, these types of detectors can require cryogenic cooling, which may not be suitable for portable electronic devices, whose size and weight requirements can be limited.

Figure 1:
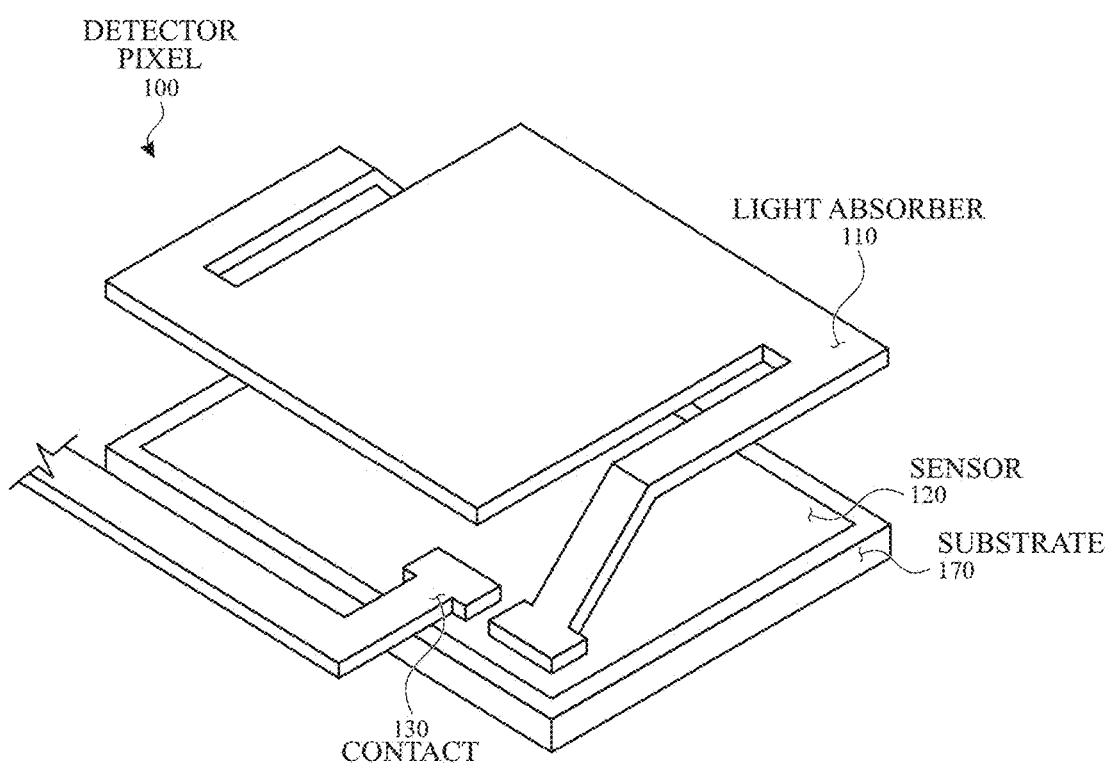
FIG. 1 illustrates an exemplary detector pixel in a detector according to examples of the disclosure.

One type of detector capable operating at or near room temperature can be bolometers or microbolometers. FIG. 1 illustrates an exemplary detector pixel according to examples of the disclosure. In some examples, detector pixel 100 can be a bolometer. A detector pixel can include one or more detector elements with a common footprint. A detector element can be an element designed to detect the presence of light and can individually generate a signal representative of the detected light. A bolometer can be a type of thermal detector that operates by detecting changes in temperature or resistance of a material. Detector pixel 100 can include a light absorber 110. Light absorber 110 can be any type of material capable of absorbing light. Light absorber 110 can be exposed to electromagnetic radiation or light, and any light absorbed by light absorber 110 can produce heat within the light absorber, changing its temperature. The change in temperature can be proportional to the amount of light absorbed. Light absorber 110 can be thermally coupled to a sensor 120 mounted on a substrate 170. The change in temperature in the light absorber can cause a change in the resistance of sensor 120. Sensor 120 can be electrically coupled to an integrated circuit (not shown) through contact 130. The integrated circuit can be coupled to a processor, computer, or controller, which can bias detector pixel 100 with a constant current or constant voltage and can measure the change in resistance due to light impinging on the surface of light absorber 110.

Light incident on an object can penetrate to one or more depths within the object. When light is incident on the object, a portion of incident light can reflect off the object's surface. Another portion of the light incident on the object can enter superficially, but can reflect back. In some examples, it may be desirable to distinguish between portions of reflected light (e.g., light that reflects off the object's surface and light that only enters the object superficially) from light that reaches deeper portions in the object. If the detector is unable to distinguish between light that has reflected at the object's surface or has only entered superficially and light that has entered deeper into the object, the processor may make an erroneous measurement of the object's properties.

The accuracy of the measured transmittance, refractive index, reflectance, absorbance, or material composition can be improved by measuring light of certain polarizations or by determining the characteristics of polarized light. Scattering events within an object can depolarize light, and the probability of a scattering event can increase with the depth of light penetration in the object. Light that enters into deeper into the object can be randomized, and photons reflecting back towards the detector can be depolarized. Conversely, polarized light that specularly reflects off the object's surface can maintain its polarization. Similarly, light that only enters the object superficially can maintain a large degree of its polarization. Therefore, a detector capable of polarization selectivity can be desired.

Figure 2A:
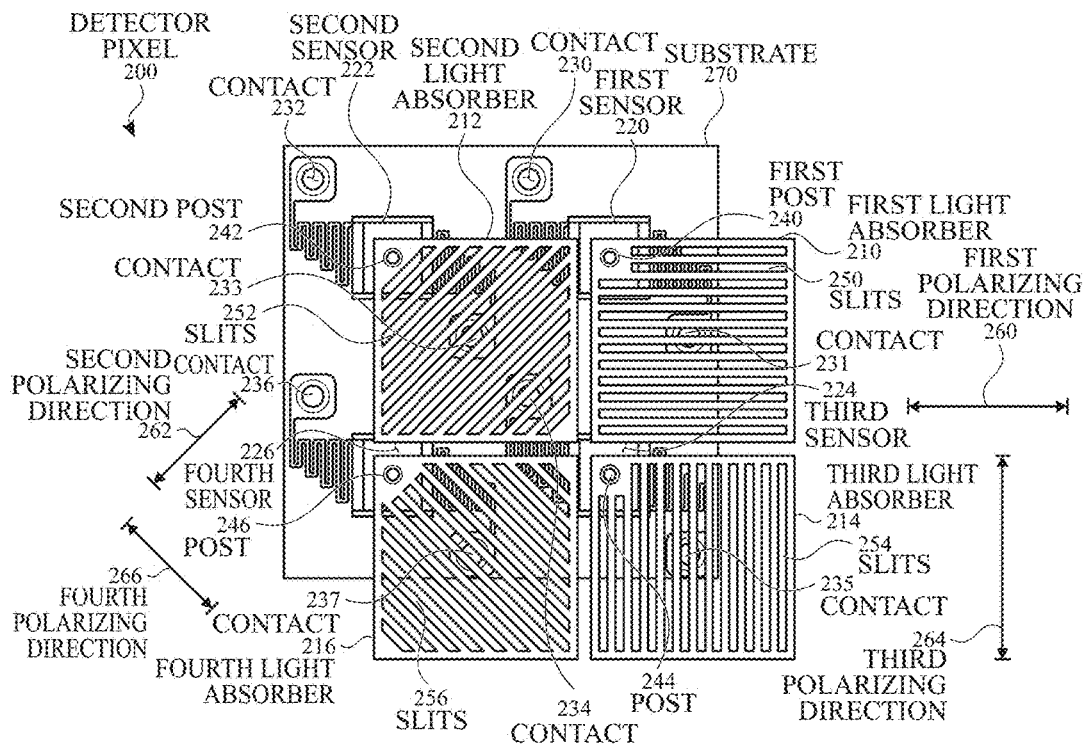
FIGS. 2A-2C illustrate top, plan, and cross-sectional views of an exemplary polarization selective light detector according to examples of the disclosure.
Figure 2B:
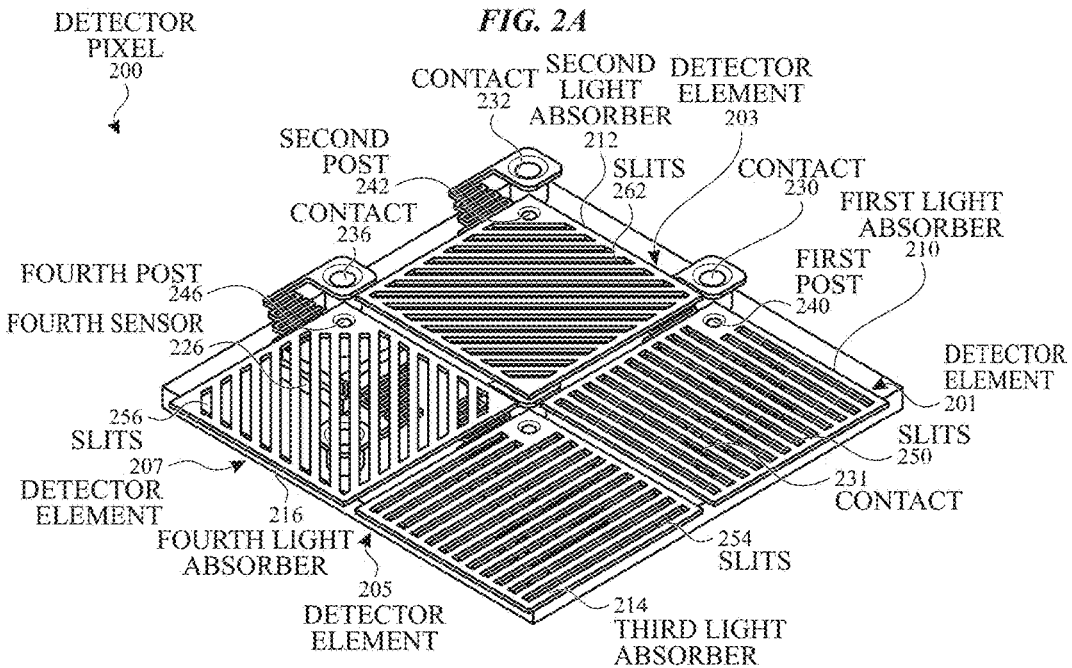
Figure 2C:
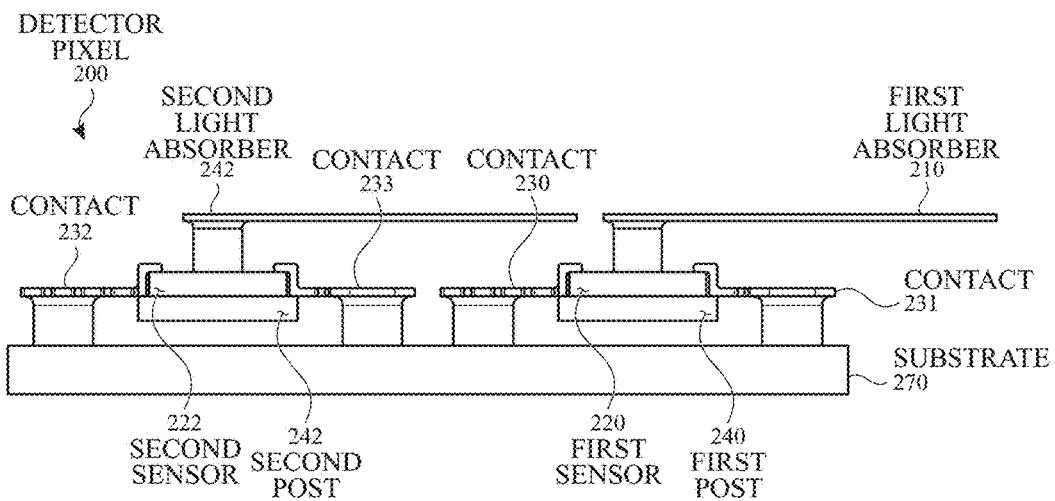

FIGS. 2A-2C illustrate top, plan, and cross-sectional views of an exemplary polarization selective light detector according to examples of the disclosure. Detector pixel 200 can include a plurality of detector elements, such as detector element 201, detector element 203, detector element 205, and detector element 207. Detector element 201 can include a first light absorber 210. First light absorber 210 can include any material capable of absorbing light. Exemplary materials for light absorbers can include, but are not limited to, Nickel Chrome (NiCr), Phosphor Bronze, Vanadium Oxide ($V_xO_y$), and amorphous Silicon (a-Si). In some examples, first light absorber 210 can have a large temperature coefficient of resistance (TCR). The TCR can be a measure of the change in resistance in response to a change in temperature. Therefore, a light absorber with a large TCR can detect small or minute changes in temperature induced by the incident radiation. For example, light impinging on first light absorber 210 can cause an increase in the temperature of the first light absorber 210. First light absorber 210 can include $V_xO_y$, where a small increase in temperature can lead to a large decrease in the resistance. Detector element 201 can include a first sensor 220 mounted on substrate 270. First sensor 220 can be a temperature sensor or any type of sensor capable of measuring a change in temperature, such as a thermistor. In some examples, first sensor 220 can be a resistor capable of changing a resistance in relation to changes in temperature experienced by first light absorber 210.

First light absorber 210 can be coupled to a first post 240. First post 240 can include any type of material capable of conducting heat from first light absorber 210 to first sensor 220. Any change in temperature of first light absorber 210 due to the absorbed incident light can be experienced and detected by first sensor 220. In some examples, first light absorber 210 can be coupled to one post. In some examples, first light absorber 210 can be coupled to multiple posts. In some examples, first sensor 220 can be thermally coupled to first light absorber 210 by a direct or indirect physical connection through which heat can conduct. For example, first light absorber 210 can be directly coupled to first sensor 220, or heat may conduct through one or more intervening structures located between first light absorber 210 and first sensor 220 that are directly physically coupled to first light absorber 210 and first sensor 220. In some examples, the indirect physical connection can be a material used to alter the thermal conduction between first light absorber 210 and first sensor 220.

Substrate 270 can include contact 230 and contact 231. Contact 230 and contact 231 can be coupled to an integrated circuit, such as a read-out integrated circuit (ROIC). The integrated circuit can be coupled to a processor or controller. In some examples, the processor can bias the detector with a constant current or constant voltage and can measure the change in resistance due to light impinging on the light absorber. Since an integrated circuit can be coupled to first sensor 220 through contact 230 and contact 231, the integrated circuit can transmit the information to a processor (or controller) for determining the properties of incident light.

First light absorber 210 can comprise a plurality of slits 250 oriented in first polarizing direction 260. The configuration of plurality of slits 250 can be such that detector element 201 can be configured to selectively absorb a specific polarization of light, while allowing other polarizations of light to transmit through. The orientation of plurality of slits 250 in first polarizing direction 260 can allow first light absorber 210 to absorb light with first polarizing direction 260. Although not as strongly absorbed as light polarized in the same direction as first polarizing direction 260, light polarized in other polarizing directions (e.g., second polarizing direction 262 and fourth polarizing direction 266) can still be absorbed. For example, first light absorber 210 can absorb greater than 90% of light polarized in the same direction as first polarizing direction 260, while absorbing about 50% of light oriented 45° relative to first polarizing direction 260 (e.g., light with second polarizing direction 262) and absorbing 0% of light oriented orthogonally relative to first polarizing direction 260 (e.g., third polarizing direction 264). Therefore, first light absorber 210 can absorb different polarizations of light, and as a result, may not be able to differentiate between a change in the magnitude of incident light and a change in the angle of polarization of incident light.

Detector element 203 can include a second light absorber 212. Second light absorber 212 can be coupled to a second post 242. Second post 242 can include any type of material capable of conducting heat from second light absorber 212 to second sensor 222. In some examples, second light absorber 212 can be coupled to one post. In some examples, second light absorber 212 can be coupled to multiple posts. In some examples, second sensor 222 can be thermally coupled to second light absorber 212 by a direct or indirect physical connection through which heat can conduct. For example, second light absorber 212 can be directly coupled to second sensor 222, or heat may conduct through one or more intervening structures located between second light absorber 212 and second sensor 222 that are directly physically coupled to second light absorber 212 and second sensor 222. Substrate 270 can include contact 232 and contact 233. Contact 232 and contact 233 can be coupled to an integrated circuit, such as a ROIC, and information about the change in temperature or change in resistance measured by second sensor 222 can be transmitted to the processor through the contact 232, contact 233, and ROIC.

By utilizing a plurality of light absorbers, the processor can differentiate between a change in the magnitude of incident light and a change in the angle of polarization of incident light. Second light absorber 212 can comprise a plurality of slits 252 oriented in second polarizing direction 262. In some examples, the polarizing direction (e.g., second polarizing direction 262) of one light absorber can be different from the polarizing direction (e.g., first polarizing direction 260) of another light absorber. For example, second polarizing direction 262 can be oriented 45° relative to first polarizing direction 260. Similar to first light absorber 210, second light absorber 212 can absorb light polarized in a plurality of directions, where light polarized in the same direction as polarizing direction can be absorbed more strongly. Generally, the amount of light absorbed by a light absorber can be proportional to the difference between the orientation of the polarized light and the direction of the plurality of slits. Therefore, the larger difference between the orientation of the polarized light and the direction of the plurality of slits, the lower the amount of light absorbed.

Using the information extracted from the plurality of slits, the processor can determine an angle of polarization of incident light. Any unpolarized light can be absorbed equally by each light absorber, and thus, any variation due to the absorption of unpolarized light can be canceled out based on information from the detected polarized light. The angle of polarization of light can be determined by:

$$\theta_L = \frac{x_A(90° - \theta_B) - x_B(90° - \theta_A)}{-x_A - x_B} \quad (1)$$

where $x_A$ is the absorption from first light absorber 210, $x_B$ is the absorption from second light absorber 212, $\theta_A$ is the polarizing direction of first light absorber 210 (e.g., first polarization direction 260), and $\theta_B$ is the polarizing direction of second light absorber 212 (e.g., second polarization direction 262).

Detector element 205 can include third light absorber 214, coupled to third sensor 224, and fourth light absorber 216, coupled to fourth sensor 226. Each of light absorbers 210, 212, 214, and 216 can include a plurality of slits oriented in different polarizing directions. For example, second polarizing direction 262 can be 45° degrees relative to first polarizing direction 260. Third light absorber 214 can include a plurality of slits 254 oriented in a third polarizing direction 264, where third polarizing direction 264 can be orthogonal or close to orthogonal to first polarizing direction 260 (e.g., the third polarizing direction can be oriented 90°±5° relative to first polarizing direction 260). Fourth light absorber 216 can include a plurality of slits 256 oriented in a fourth polarizing direction 266, where fourth polarizing direction 266 can be oriented 90°±5° relative to second polarizing direction 262. A processor can calculate an angle of polarization of light absorbed by first light absorber 210, second light absorber 212, third light absorber 214, and fourth light absorber 216 based on information (e.g., light absorption values) obtained from the plurality of sensors (e.g., first sensor 220, second sensor 222, third sensor 224, and fourth sensor 226).

FIGS. 2A-2B illustrate an exemplary configuration of first light absorber 210 and second light absorber 212 located in a first row, third light absorber 214 and fourth light absorber 216 located in a second row, first light absorber 210 and third light absorber 214 located in a first column, and second light absorber 212 and fourth light absorber 216 located in a second column of detector pixel 200. In some examples, detector pixel 200 can include first light absorber 210 and second light absorber 212, but may not include third light absorber 214, fourth light absorber 216, nor the corresponding third sensor 224 and fourth sensor 226. For example, detector pixel 200 can include first light absorber 210 and second light absorber 212, where second polarizing direction 262 of second light absorber 212 can be orthogonal to first polarizing direction 260 of first light absorber 210 (e.g., second polarizing direction 262 can be oriented 90°±5° relative to first polarizing direction 260).

In some examples, the plurality of slits in the light absorber and/or the dimensions of the light absorber can be configured based on the wavelength or range of wavelengths of interest. For example, the spacing of the slits in the light absorber and the dimensions of the light absorber itself can be adjusted to absorb light with one or more specific wavelengths. Absorbed light can reach maximum amplitude when its distance from the point of reflection (e.g., surface of the light absorber) is equal to a quarter of the wavelength of the light (or a multiple of the quarter of the wavelength of light). Accordingly, a light absorber having a given length can absorb more strongly any light having a wavelength equal to four times the length of outer edge of the light absorber. Conversely, light having a given wavelength can be more strongly absorbed by a light absorber when having a length equal to a quarter of the given wavelength. To benefit from the maximum amplitude, the light absorber can be configured with a length that is four times the wavelength of light, thereby enhancing the amount of absorption by the light absorber.

The light absorber can be configured to absorb a range of wavelengths defined by a low or short-end wavelength and a high or long-end wavelength. For example, the length (e.g., 10-17 μm for a wavelength of 2.5-4.25 μm) of the outer edge of a light absorber (e.g., the length of the longest edge of an absorbing surface of the light absorber) can define the long-end wavelength (of the range) of light to be absorbed by the light absorber, and the distance (e.g., 0.65 μm) between adjacent slits in the light absorber can define the short-end wavelength (of the range). For example, the light absorber may not strongly absorb light having a wavelength that is longer than four times the length of its outer edge. In addition, for example, the light absorber may not strongly absorb light having a wavelength that is shorter than four times the distance between adjacent slits in the light absorber. In some examples, the light absorber can be configured to absorb at least a specific wavelength of light (e.g., light in the infrared spectrum), and the plurality of slits in a light absorber can be spaced apart a first distance equal to a quarter of the specific wavelength of light. In some examples, the plurality of slits of each of the four light absorbers can be spaced the same distance. One skilled in the art would appreciate that the same distance can include tolerances that result in a 15% deviation.

The post, such as first post 240 coupled to first light absorber 210, can be located at a corner of the light absorber, and the light absorber can be thermally coupled to the sensor, such as first sensor 220, through the post. As illustrated in FIGS. 2A-2C, this configuration can offset each light absorber from its corresponding sensor. Examples of the disclosure can include other configurations. For example, the post can be located at the center of each light absorber, instead of at the corner of each light absorber, or the post can include an offset from the center of each light absorber while not being located at the corner. In some examples, each post can be located at the same corner (e.g., upper-left) of the corresponding light absorber, as illustrated in FIGS. 2A-2B. In other examples, each post can be located at a different corner of a corresponding light absorber (e.g., the posts can be located at different corners of the light absorbers), and the posts can be grouped together such that the light absorbers fan out from the center of the detector, like petals in a four-petal configuration.

Figure 2D:
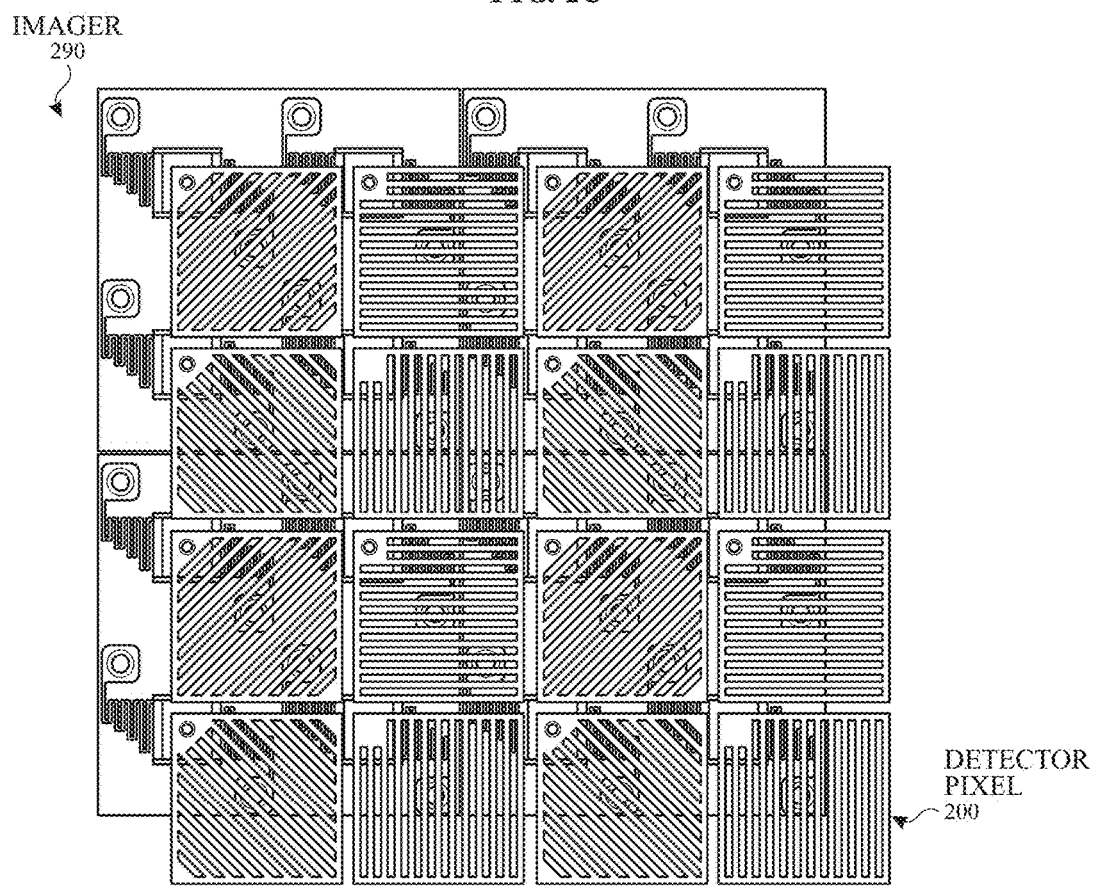
FIG. 2D illustrates an exemplary focal plane array or imager comprising an array of light sensing detector pixels according to examples of the disclosure.

FIG. 2D illustrates an exemplary focal plane array or imager comprising an array of light sensing detector pixels according to examples of the disclosure. Detector pixel 200 can be included in a focal plane array (FPA) or imager 290. An FPA can be an image-sensing device comprising an array of optical sensors. In some examples, imager 290 can be an infrared imager. In some examples, the other detector pixels in the array of detector pixels or imager 290 can be configured with four light absorbers in each detector pixel. Imager 290 can include a plurality of detector pixels coupled to an integrated circuit, such as a ROIC. Each detector pixel can be biased individually or can be coupled to the same biasing circuitry. Each detector pixel can be coupled to a different circuit on the ROIC. Each circuit on the ROIC can store charge corresponding to the detected light (or photons of light) on the corresponding detector pixel in an integrating capacitor to be sampled and read out by the processor to generate an image. In some examples, one contact for the plurality of detector pixels can be coupled to a common electrode, such as Vdetcom (not shown), while the other contact can be coupled to different electrode or voltage source. Although the figure illustrates four light absorbers, examples of the disclosure can include any number of light absorbers. Additionally, although four detector pixels in a 2×2 row-column arrangement are illustrated in the figure, examples of the disclosure can include any number of detector pixels and can be configured in any arrangement. Although FIG. 2D illustrates arrays of the same or repeated configuration of detector pixels, examples of the disclosure are not limited to detectors comprising arrays of the same or repeated configuration of detector pixels. In some examples, an array can include any combination of light detectors described herein, including any and/or all of the detectors illustrated in and described with respect to the other figures.

Figure 3A:
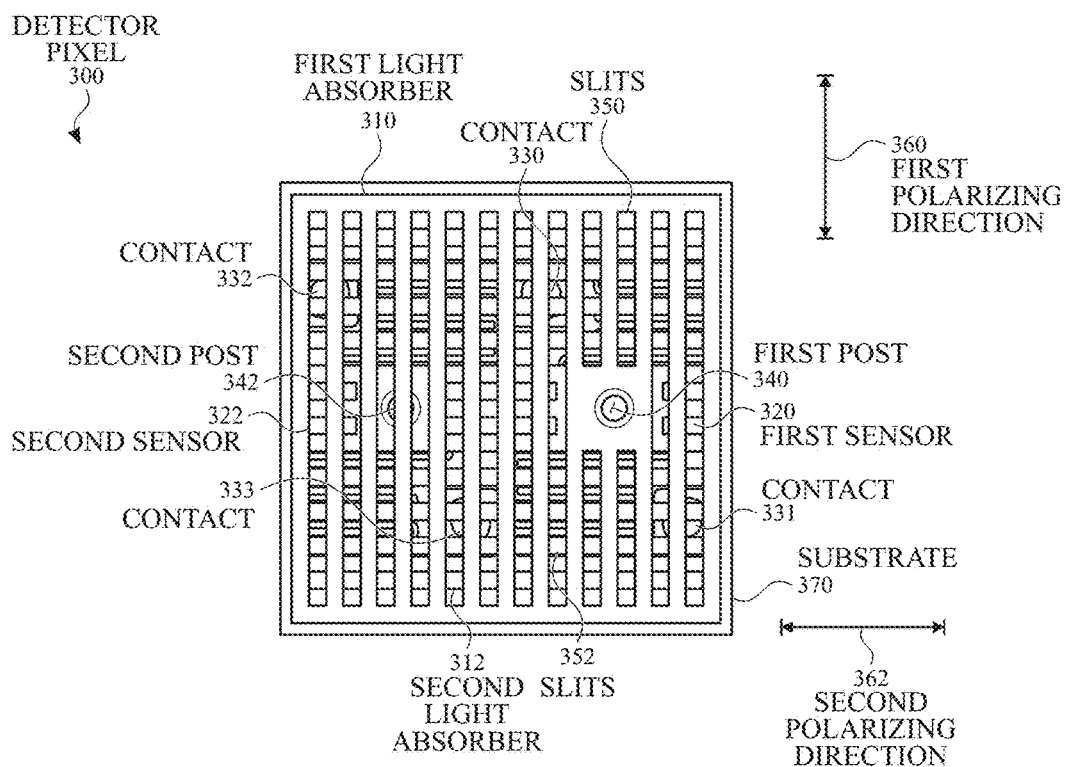
FIGS. 3A-3C illustrate top, plan, and cross-sectional views of an exemplary detector including a plurality of light absorbers located on different layers according to examples of the disclosure.
Figure 3B:
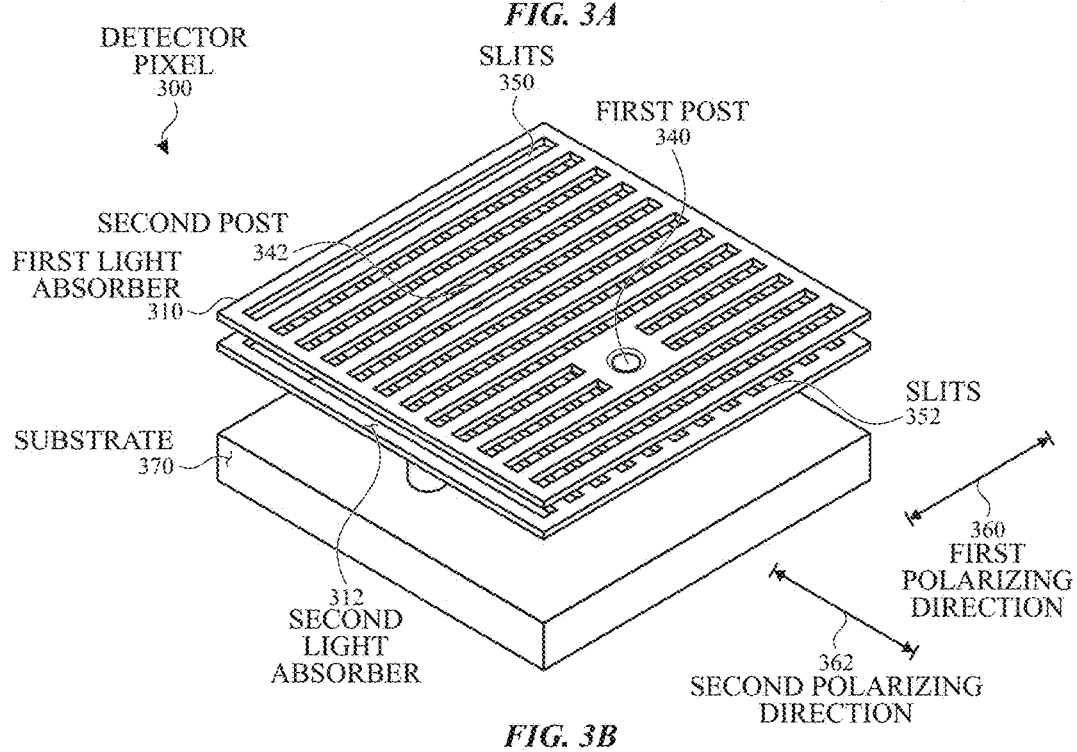
Figure 3C:
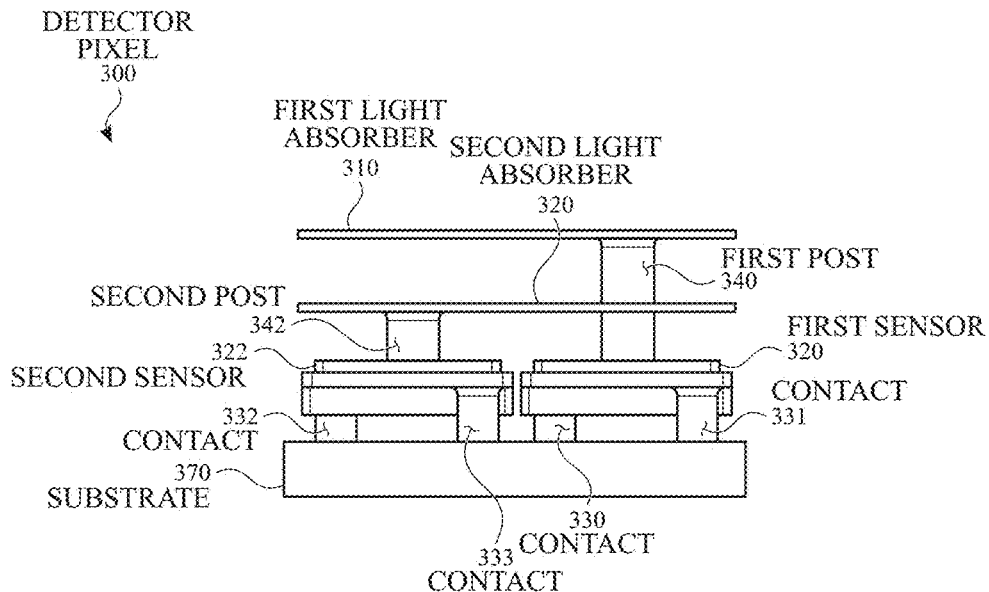

FIGS. 3A-3C illustrate top, plan, and cross-sectional views of an exemplary detector including a plurality of light absorbers located on different layers according to examples of the disclosure. Detector pixel 300 can include a first light absorber 310 and a second light absorber 312. First light absorber 310 and second light absorber 312 can be any material capable of absorbing light, including, but not limited to, NiCr, Phosphor Bronze, $V_xO_y$, and a-Si. In some examples, first light absorber 310 and second light absorber 312 can be include materials of the same composition. One skilled in the art would appreciate that the same material composition can include tolerances that result in a 15% deviation. In some examples, first light absorber 310 can be located closer to incident light than second light absorber 312. In some examples, second light absorber 312 can be located closer to substrate 370 than first light absorber 310. In some examples, first light absorber 310, second light absorber 312, or both can have a large TCR and can be capable of detecting small or minute changes in temperature (e.g., a large resistance change per change in material temperature).

First light absorber 310 can include a plurality of slits 350 oriented in first polarizing direction 360. First light absorber 310 can be thermally coupled to a first sensor 320 through first post 340. First sensor 320 can be any type of sensor capable of measuring a change in temperature, such as a thermistor. In some examples, first sensor 320 can be a resistor capable of changing a resistance in relation to changes in temperature experienced by first light absorber 310.

First post 340 can include any type of material capable of conducting heat from first light absorber 310 to first sensor 320. In some examples, first light absorber 310 can be coupled to one post. In some examples, first light absorber 310 can be coupled to multiple posts. In some examples, first sensor 320 can be thermally coupled to first light absorber 310 by a direct or indirect physical connection through which heat can conduct. For example, first light absorber 310 can be directly coupled to first sensor 320, or heat may conduct through one or more intervening structures located between first light absorber 310 and first sensor 320 that are directly coupled to first light absorber 310 and first sensor 320.

Substrate 370 can include contact 330 and contact 331 coupled to first light absorber 310, first sensor 320, and first post 340. Contact 330 and contact 331 can also be coupled to an integrated circuit, such as a ROIC. The integrated circuit can be coupled to a processor or controller. In some examples, the processor can bias the detector with a constant current or constant voltage and can measure the change in resistance due to light impinging on the light absorber.

Second light absorber 312 can include a plurality of slits 352 oriented in second polarizing direction 362. In some examples, second polarizing direction 362 can be different from first polarizing direction 360. For example, second polarizing direction 362 can be oriented 90°±5° or 45°±5° relative to first polarizing direction 360.

Second light absorber 312 can be thermally coupled to a second sensor 322 through second post 342. Second sensor 322 can be mounted on substrate 370 and can be any type of sensor capable of measuring a change in temperature, such as a thermistor. In some examples, second sensor 322 can be a resistor capable of changing a resistance in relation to changes in temperature experienced by second light absorber 312.

Second light absorber 312 can be thermally coupled to second post 342. Second post 342 can include any type of material capable of conducting heat from second light absorber 312 to second sensor 322. In some examples, second light absorber 312 can include one post. In some examples, second light absorber 312 can include multiple posts. In some examples, second sensor 322 can be thermally coupled to second light absorber 312 by a direct or indirect physical connection through which heat can conduct. For example, second light absorber 312 can be directly coupled to second sensor 322, or heat may conduct through one or more intervening structures located between second sensor 322 and second light absorber 312 that are directly coupled to second sensor 322 and second light absorber 312. In some examples, first post 340 and second post 342 can have the same electrical properties. One skilled in the art would appreciate that the same electrical properties can include tolerances that result in a 15% deviation.

Substrate 370 can include contact 332 and contact 333 coupled to second light absorber 312, second sensor 322, and second post 342. Contact 332 and contact 333 can be coupled to an integrated circuit, such as a ROIC. The integrated circuit can be coupled to a processor or controller, which can bias the detector with a constant current or constant voltage and can measure the change in resistance due to light impinging on the light absorber. In some examples, the processor can bias the detector with a constant current or constant voltage and can measure the change in resistance due to light impinging on the light absorber. In some examples, at least one contact (e.g., contact 330 or contact 331) coupled to first light absorber 310 and at least one contact (e.g., contact 332 or contact 333) coupled to second light absorber 312 can be coupled to a common voltage, such as Vdetcom. In some examples, contact 330 or contact 331 and contact 332 or contact 333 can be coupled to the same biasing voltage source. In some examples, contact 330 or contact 331 and contact 332 or contact 333 can be coupled to the same circuitry on the integrated circuit (e.g., ROIC).

Plurality of slits 350 of first light absorber 310 can overlap plurality of slits 352 of second light absorber 312, as illustrated in FIGS. 3A-3B, such that first light absorber 310 and second light absorber 312 can be co-located in a configuration with visually overlapping slits. For example, plurality of slits 350 of first light absorber 310 can visually overlap plurality of slits 352 of second light absorber 312 such that light transmitting through plurality of slits 350 of first light absorber 310 may be absorbed by second light absorber 312. Further, an angle of polarization of light absorbed can be calculated based on light absorption values obtained from first light absorber 310 and second light absorber 312, similar to the example described above with reference to FIGS. 2A-2C. As illustrated in FIGS. 3A-3C, first light absorber 310 and second light absorber 312 can have the same dimensions and can be aligned such that the footprint of the detector pixel on substrate 370 is no larger than the footprint of a light absorber. One skilled in the art would appreciate that the same dimensions can include tolerances that result in a 15% deviation.

In some examples, first light absorber 310 and second light absorber 312 can absorb light in a range of wavelengths, where the range of wavelengths can be determined by the spacing of the slits in each respective light absorber and the dimensions of each respective light absorber. As discussed above, a light absorber with a given length can more strongly absorb light with a wavelength that is four times that given length, and light having a given wavelength can be absorbed most strongly by a light absorber having a length equal to (or within 10% from) a quarter of the given wavelength.

First light absorber 310, second light absorber 312, or both can be configured to absorb a range of wavelengths defined by a low or short-end wavelength and a high or long-end wavelength. For example, the length (e.g., 10-17 µm) of the outer edge of the light absorber (e.g., the length of the longest edge of an absorbing surface of the light absorber) can define the long-end wavelength (of the range) of light to be absorbed by the light absorber (e.g., the light absorber may not strongly absorb light having a wavelength that is longer than four times the length of its outer edge), and the distance (e.g., 0.65 µm) between adjacent slits in the light absorber can define the short-end wavelength (of the range) (e.g., the light absorber may not strongly absorb light having a wavelength that is shorter than four times the distance between adjacent slits in the light absorber). In some examples, first light absorber 310 and second light absorber 312 can be configured to absorb at least a first wavelength of light (e.g., light in the infrared spectrum), and plurality of slits 350 oriented in first polarization direction 360 can be spaced apart a first distance equal to (or within 10% from) a quarter of the wavelength of light. In some examples, plurality of slits 352 oriented in second polarizing direction 362 in second light absorber 312 can be spaced apart a quarter of the wavelength of light.

In some examples, first light absorber 310 can be spaced a distance from second light absorber 312, and the distance can be, for example, a quarter of the wavelength of light to be absorbed by first light absorber 310 and second light absorber 312. The distance between the first and second light absorbers being a quarter of a wavelength of light can create a resonant cavity effect between first light absorber 310 and second light absorber 312 for light of that wavelength. The resonant cavity effect can increase the efficiency of light absorption for both light absorbers.

In some examples, first light absorber 310 can include a first post 340 that transmits through second light absorber 312, while first light absorber 310 and second light absorber 312 can remain thermally isolated from each other. In some examples, first post 340 can transmit through one or more of plurality of slits 352 in second light absorber 312. In some examples, first post 340 and second post 342 can be coupled to the same sensor. In some examples, as illustrated in FIGS. 3A-3C, first post 340 (coupled to first light absorber 310) can be at a first position, and second post 342 (coupled to second light absorber 312) can be at a second position. The first position and the second position can be symmetric with respect to a center position halfway between first light absorber 310 and second light absorber 312. In such a configuration, first post 340 and second post 342 can obscure the configuration of the slits symmetrically for both first polarizing direction 360 and second polarizing direction 362, such that the polarizing sensitivity of detector pixel 300 may not be biased towards one polarizing direction or the other. In some examples, first post 340 and second post 342 can be located at the corners of detector pixel 300.

Figure 3D:
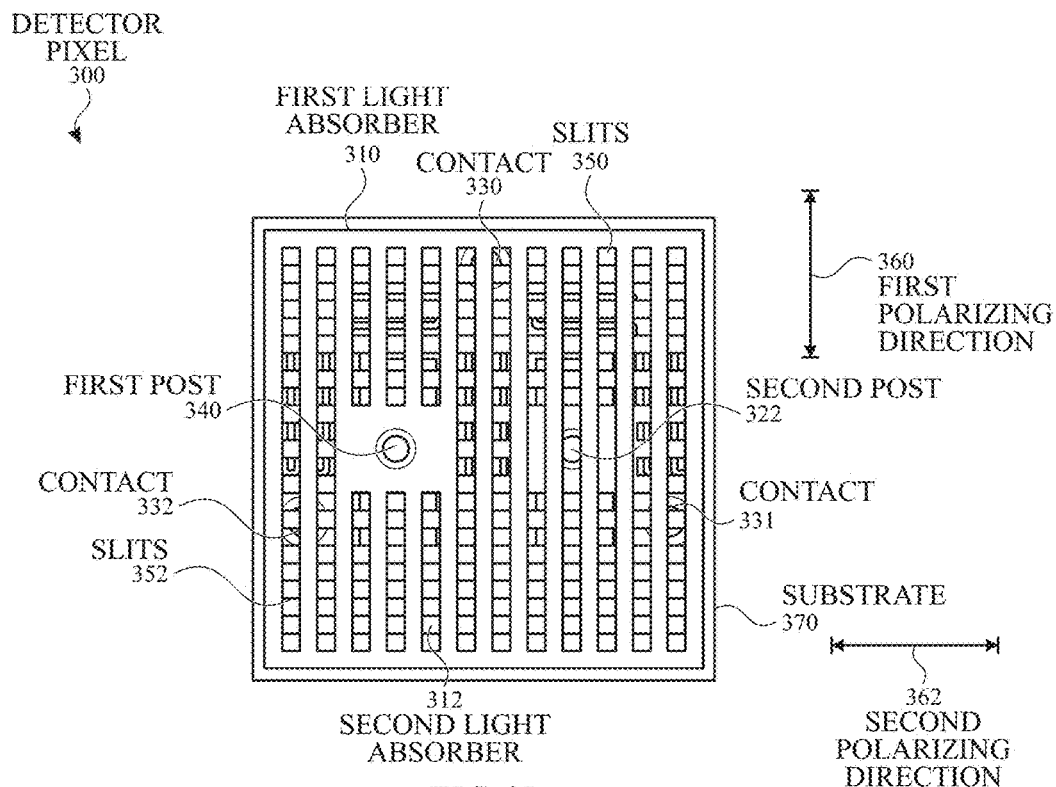
FIGS. 3D-3F illustrate top, plan, and cross-sectional views of an exemplary detector including a plurality of light absorbers located on different layers and capable of determining an angle of polarization of incident light using a differential reading according to examples of the disclosure.
Figure 3E:
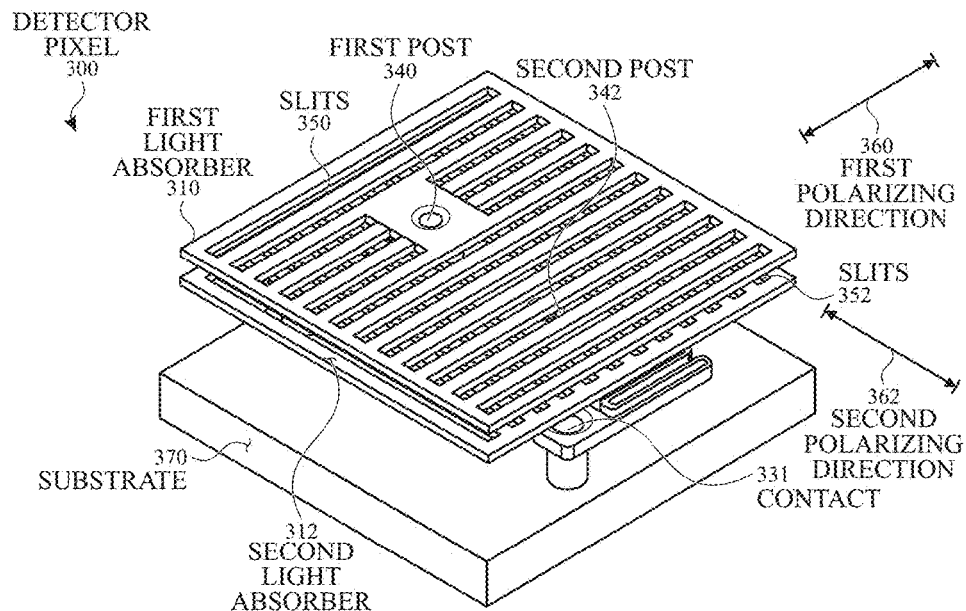
Figure 3F:
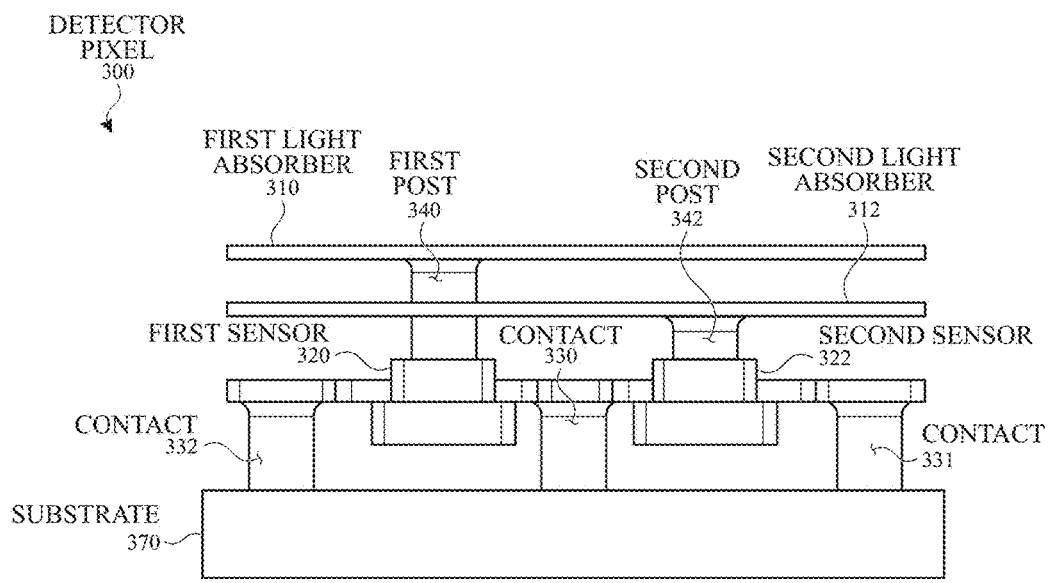

FIGS. 3D-3F illustrate top, plan, and cross-sectional views of an exemplary detector including a plurality of light absorbers located on different layers and capable of determining an angle of polarization of incident light using a differential reading according to examples of the disclosure. Detector pixel 300 can include a first light absorber 310 and a second light absorber 312. First light absorber 310 and second light absorber 312 can be any material capable of absorbing light, including, but not limited to, NiCr, Phosphor Bronze, $V_xO_y$, and a-Si. In some examples, first light absorber 310 and second light absorber 312 can be include materials of the same composition. One skilled in the art would appreciate that the same material composition can include tolerances that result in a 15% deviation. In some examples, first light absorber 310 can be located closer to incident light than second light absorber 312. In some examples, second light absorber 312 can be located closer to substrate 370 than first light absorber 310. First light absorber 310 can include a plurality of slits 350 oriented in first polarizing direction 360. First light absorber 310 can be thermally coupled to a first sensor 320 through first post 340. First sensor 320 can be any type of sensor capable of measuring a change in temperature, such as a thermistor. In some examples, first sensor 320 can be a resistor capable of changing a resistance in relation to changes in temperature experienced by first light absorber 310. First post 340 can include any type of material capable of conducting heat from first light absorber 310 to first sensor 320. In some examples, first light absorber 310 can be coupled to one post. In some examples, first light absorber 310 can be coupled to multiple posts.

Second light absorber 312 can include a plurality of slits 352 oriented in second polarizing direction 362. In some examples, second polarizing direction 362 can be different from first polarizing direction 360. For example, second polarizing direction 362 can be oriented 90°±5° or 45°±5° relative to first polarizing direction 360. Second light absorber 312 can be thermally coupled to a second sensor 322 through second post 342. Second post 342 can include any type of material capable of conducting heat from second light absorber 312 to second sensor 322. In some examples, second light absorber 312 can include one post. In some examples, second light absorber 312 can include multiple posts. In some examples, second sensor 322 can be thermally coupled to second light absorber 312 by a direct or indirect physical connection through which heat can conduct. For example, second light absorber 312 can be directly coupled to second sensor 322, or heat may conduct through one or more intervening structures between second sensor 322 and second light absorber 312 that are directly coupled to second sensor 322 and second light absorber 312.

First sensor 320 can be coupled to a contact 331, and second sensor 322 can be coupled to a contact 332. Detector pixel 300 can include another contact 330 located on substrate 370. Contact 330 can be coupled to both first sensor 320 and second sensor 322 (i.e., both first sensor 320 and second sensor 322 can be coupled to the same contact 330). This configuration can allow an angle of polarization of light absorbed by first light absorber 310 and second light absorber 312 to be determined based on a differential reading between first sensor 320 and second sensor 322. By determining the angle of polarization based on a differential reading, the processor may no longer be needed to perform the calculation based on light absorption values from each light absorber as described above with respect to FIGS. 3A-3C.

Figure 3G:
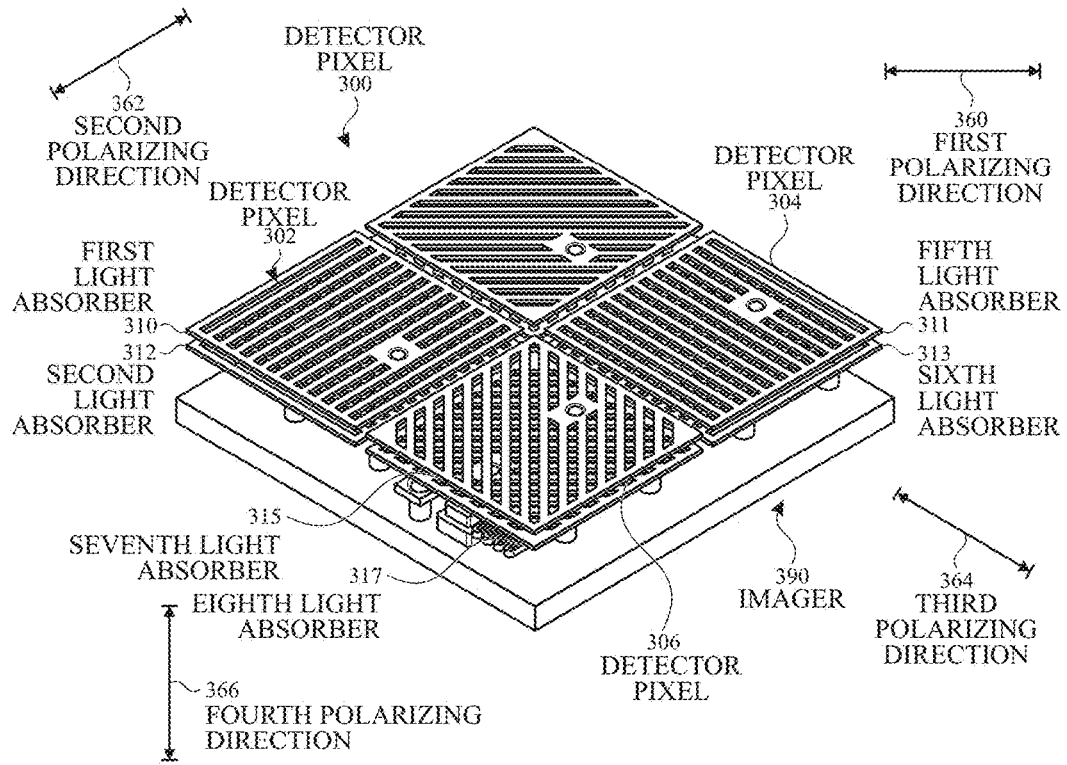
FIG. 3G illustrates a plan view of an exemplary focal plane array (FPA) or imager comprising an array of light sensing detector pixels according to examples of the disclosure.

FIG. 3G illustrates a plan view of an exemplary FPA or imager comprising an array of light sensing detector pixels according to examples of the disclosure. Detector pixel 300 can be included in FPA or imager 390. An FPA can be an image-sensing device comprising an array of optical sensors. Detector pixel 300 can be incorporated as a first light sensing detector pixel (e.g., an infrared light sensing detector pixel) including a first light absorber and a second light absorber. In some examples, imager 390 can be an infrared imager. In some examples, the imager can comprise an array of detector pixels, where each detector pixel can be configured with a first light absorber and a second light absorber. In some examples, imager 390 can be arranged as two rows and two columns (i.e., a 2×2 arrangement). For example, the first light absorber and second light absorber of detector pixel 300 can be co-located in a first column of a first row, while detector pixel 302 (including first light absorber 310 and second light absorber 312) can be co-located in a second column of the first row. The 2×2 arrangement can include a total of eight light absorbers and four detector pixels. In some examples, the light absorbers of detector pixel 300 can have different polarizing directions or orientations than the light absorbers of detector pixel 302. For example, detector pixel 300 can have a plurality of slits oriented in first polarizing direction 360 that is oriented 45° relative to plurality of slits in detector pixel 302, which is oriented in second polarizing direction 362. In some examples, the other detector pixels (e.g., detector pixel 304 and detector pixel 306) included in imager 390 can each be oriented with polarizing directions different from each other and/or different from detector pixel 300 and detector pixel 302.

In some examples, a first row of light absorbers (e.g., first, second, third, and fourth light absorbers) can be included in a light sensing detector pixel along with a second row of light absorbers (fifth, sixth, seventh, and eighth light absorbers). The fifth and sixth light absorbers (e.g., fifth light absorber 311 and sixth light absorber 313) can be co-located in a first column of the second row of the detector pixel, and the seventh and eighth light absorbers (e.g., seventh light absorber 315 and eighth light absorber 317) can be co-located in a second column of the second row of the detector pixel. Each of the light absorbers in the second row can share a polarizing direction with a light absorber from the first row. For example, fifth light absorber 311 included in detector pixel 304 located in the second row can be oriented with the same polarization direction as second light absorber 312 included in detector pixel 302 located in the first row. In some examples, the arrangement of the second row can be different from the arrangement of the first row to account for minute differences that may occur from having one light absorber located above the other. For example, in the first row, a light absorber (e.g., second light absorber 312) can have slits oriented in a third polarizing direction 364 and can be located further away from incident light than another light absorber (e.g., first light absorber 310), whose slits are oriented in second polarizing direction 362. On the other hand, in the second row, a light absorber (e.g., fifth light absorber 311) having the same third polarizing direction 364 can be closer to incident light than another light absorber (e.g., sixth light absorber 313) oriented in the same second polarizing direction 362. In some examples, sixth light absorber 313 can be located closer to substrate 370 than the fifth light absorber 311. Similarly, in the first row, a light absorber including slits oriented in first polarizing direction 360 can be located closer to incident light (or further away from substrate 370) than another light absorber including slits oriented in a fourth polarizing direction 366, whereas, in the second row, a light absorber including slits oriented in first polarizing direction 360 can be located further away from incident light (or closer to substrate 370) than another light absorber including slits oriented in a fourth polarizing direction 366.

In some examples, the other detector pixels in the array of detector pixels or imager 390 can be configured with two (or more) light absorbers in each detector pixel. The plurality of detector pixels can be coupled to an integrated circuit, such as a ROIC. Each detector pixel can be biased individually or can be coupled to the same biasing circuitry. Each detector pixel can be coupled to a different circuit on the ROIC. Each circuit on the ROIC can store charge corresponding to the detected light (or photons of light) on the corresponding detector pixel in an integrating capacitor to be sampled and read out by the processor to generate an image. In some examples, one contact for the plurality of detector pixels can be coupled to a common electrode, such as Vdetcom (not shown), while the other contact can be coupled to different electrode or voltage source. Although the figures illustrate two light absorbers per detector pixel, examples of the disclosure can include any number of light absorbers per detector pixel. Additionally, although four detector pixels in a 2×2 row-column arrangement are illustrated in the figures, examples of the disclosure can include any number of detector pixels and can be configured in any arrangement. Although FIG. 3G illustrates arrays of the same or repeated configuration of detectors or detector pixels, examples of the disclosure are not limited to detectors comprising arrays of the same or repeated configuration of detector pixels. In some examples, an array can include any combination of light detectors described herein, including any and/or all of the detectors illustrated in and described with respect to the other figures.

Figure 4A:
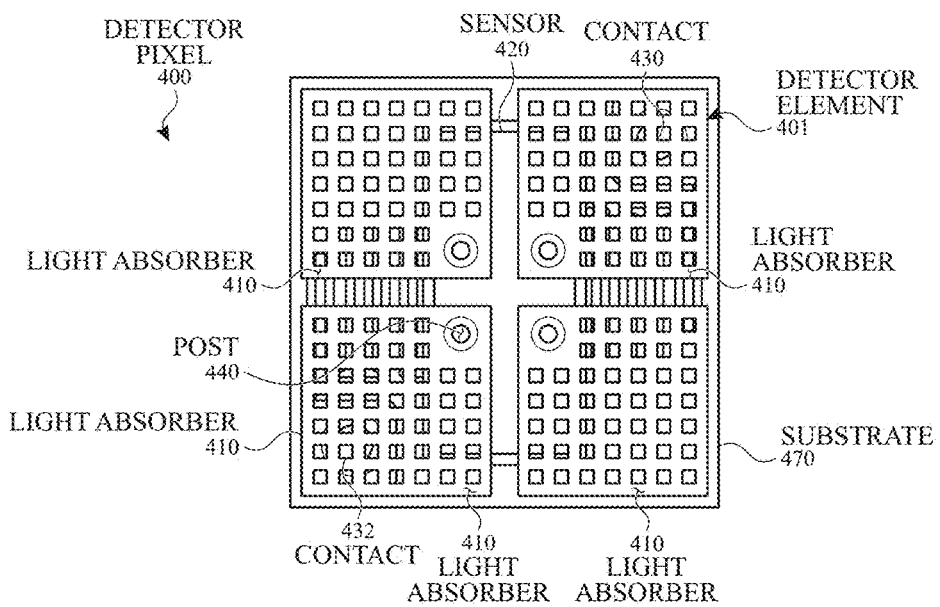
FIGS. 4A-4C illustrate top, plan, and cross-section views of an exemplary frequency selective light detector capable of detecting light in one or more selected bands of wavelengths according to examples of the disclosure.
Figure 4B:
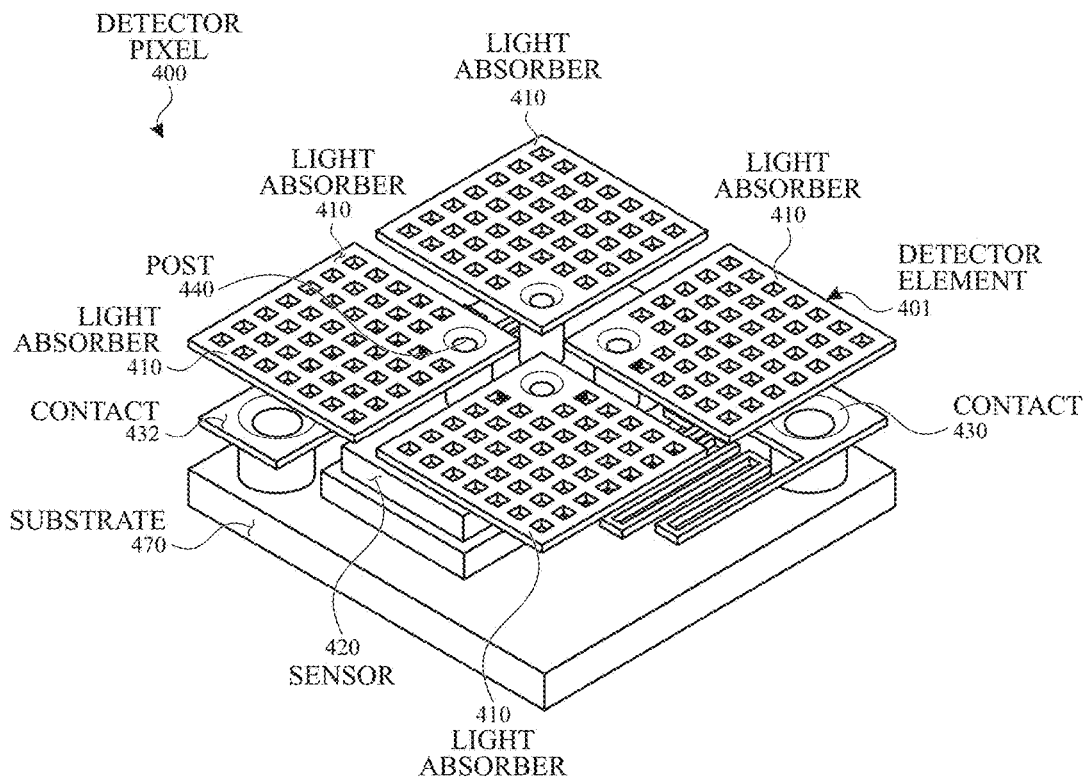
Figure 4C:
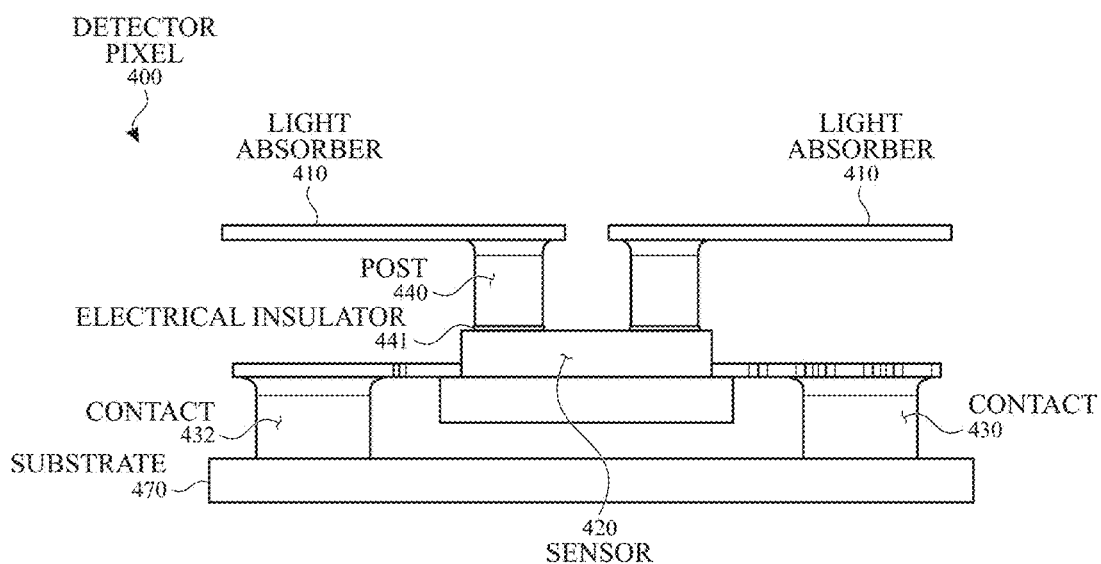

FIGS. 4A-4C illustrate top, plan, and cross-section views of an exemplary frequency selective light detector capable of detecting light in one or more selected bands of wavelengths according to examples of the disclosure. Detector pixel 400 can include a plurality of detector elements, such as detector element 401, and a plurality of light absorbers, such as light absorbers 410. Light absorbers 410 can include any material, such as NiCr, Phosphor Bronze, $V_xO_y$, and a-Si, capable of absorbing light. Detector pixel 400 can include a sensor 420 mounted on substrate 470, where each light absorber 410 can be coupled to sensor 420. Sensor 420 can be a temperature sensor or any type of sensor capable of measuring a change in temperature, such as a thermistor. In some examples, sensor 420 can be a resistor capable of changing a resistance in relation to changes in temperature experienced by the light absorbers 410. In some examples, sensor 420 can have a large TCR, and can be capable of detecting small or minute changes in the temperature in light absorbers 410.

Detector pixel 400 can include a plurality of posts 440, where each light absorber 410 can be coupled to a post 440. Post 440 can include any type of material capable of conducting heat from the corresponding light absorber 410 to sensor 420. In some examples, sensor 420 can be thermally coupled to light absorbers 410 by a direct or indirect physical connection through which heat can conduct. For example, light absorbers 410 can be directly coupled to the sensor 420, or heat may conduct through one or more intervening structures located between light absorbers 410 and sensor 420 that are directly physically coupled to light absorber 410 and sensor 420.

In some examples, one or more of the plurality of posts 440 can include an electrical insulator 441. Through post 440 and electrical insulator 441, a light absorber 410 can be thermally coupled (e.g., a physical connection through which heat can conduct) to sensor 420. For example, as illustrated in FIGS. 4A-4C, each light absorber 410 can be coupled to an electrical insulator 441. The electrical insulator 441 can be thermally coupled to sensor 420, which can allow heat to transmit between the corresponding light absorber 410 and sensor 420, while electrically isolating light absorbers 410 from sensor 420. In turn, the electrical insulator 441 can electrically isolate each light absorber 410 from other light absorbers included in the plurality of light absorbers 410, while the plurality of light absorbers 410 can be thermally coupled to each other through sensor 420.

As illustrated in FIGS. 4A-4C, each respective light absorber 410 can have a corresponding electrical insulator 441 that thermally couples the respective light absorber to sensor 420. In some examples, a single electrical insulator, such as electrical insulator 441, can thermally couple the plurality of light absorbers 410 to sensor 420, while electrically isolating the plurality of light absorbers 410 from each other. That is, the plurality of light absorbers 410 can share electrical insulator 441. In some examples, detector pixel 400 can include multiple electrical insulators, one or more of which have multiple light absorbers directly coupled thereto, and each of the multiple electrical insulators can be directly coupled to sensor 420.

Substrate 470 can include contact 430 and contact 431. Contact 430 and contact 431 can be coupled to an integrated circuit, such as a ROIC. The integrated circuit can be coupled to a processor or controller. In some examples, the processor can bias the detector with a constant current or constant voltage and can measure the change in resistance due to the light impinging on the light absorber.

In some examples, each of the plurality of light absorbers 410 can be a mesh, and the plurality of light absorbers 410 can form a capacitive resonant mesh. In some examples, each light absorber 410 can include a grid of wires forming the mesh. For example, as illustrated in FIGS. 4A-4C, the light absorbers can be coplanar and can form a capacitive resonant mesh such that the plurality of light absorbers 410 only absorb light in a range of wavelengths determined by the spacing of the wires in the metal mesh and the dimensions of light absorbers 410.

The plurality of light absorbers 410 can be configured to absorb a range of wavelengths defined by a low or short-end wavelength and a high or long-end wavelength. For example, the length (e.g., 10-17 μm) of the outer edge of light absorber 410 (e.g., the length of the longest edge of an absorbing surface of light absorber 410) can define the long-end wavelength (of the range) of light to be absorbed by light absorber 410, and the distance (e.g., 0.65 μm) between adjacent holes in the mesh included in light absorbers 410 can define the short-end wavelength (of the range). In some examples, light absorbers 410 may not strongly absorb light having a wavelength that is longer than four times the length of its outer edge. In some examples, light absorber 410 may not strongly absorb light having a wavelength that is shorter than four times the distance between adjacent holes in the mesh included in light absorbers 410. In some examples, light absorbers 410 can be configured to absorb light having wavelengths shorter than the length of its longest outer edge and longer than the length of an edge of a hole in the mesh included in light absorbers 410. Although FIGS. 4A-4C illustrate each of the plurality of light absorbers as a mesh, examples of the disclosure can include a plurality of plate light absorbers (as illustrated in FIGS. 4D-4F) or a mix of mesh light absorbers and plate light absorbers.

In some examples, detector pixel 400 can further include a plurality of posts (e.g., post 440). Each light absorber of the plurality of light absorbers can include its own post, and the plurality of posts can be disposed at adjacent locations. For example, as illustrated in FIGS. 4A-4C, the plurality of posts 440 can couple to sensor 420 through one or more electrical insulators 441 located at adjacent locations on a surface of sensor 420. Further, post 440 coupled to each respective light absorber 410 can be disposed at a corner of light absorber 410, and the plurality of light absorbers 410 can fan out in a four-petal configuration, as illustrated in FIGS. 4A-4B.

Figure 4D:
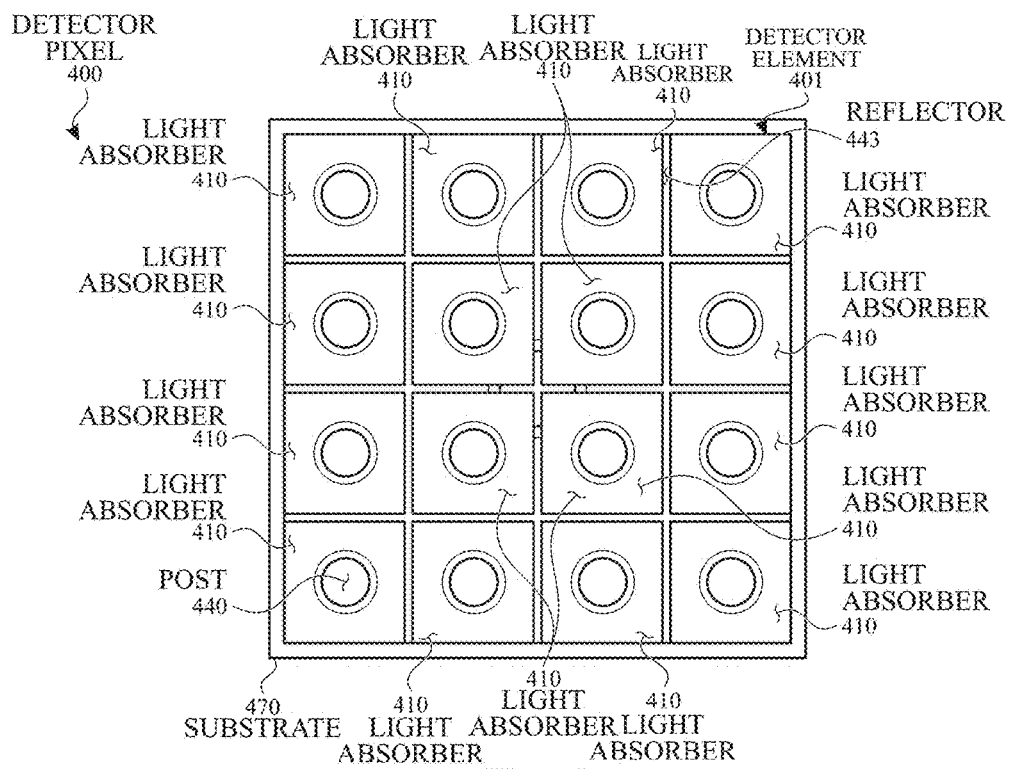
FIGS. 4D-4F illustrate top, plan, and cross-sectional views of an exemplary light detector including a reflector located between the light absorber and the sensor according to examples of the disclosure.
Figure 4E:
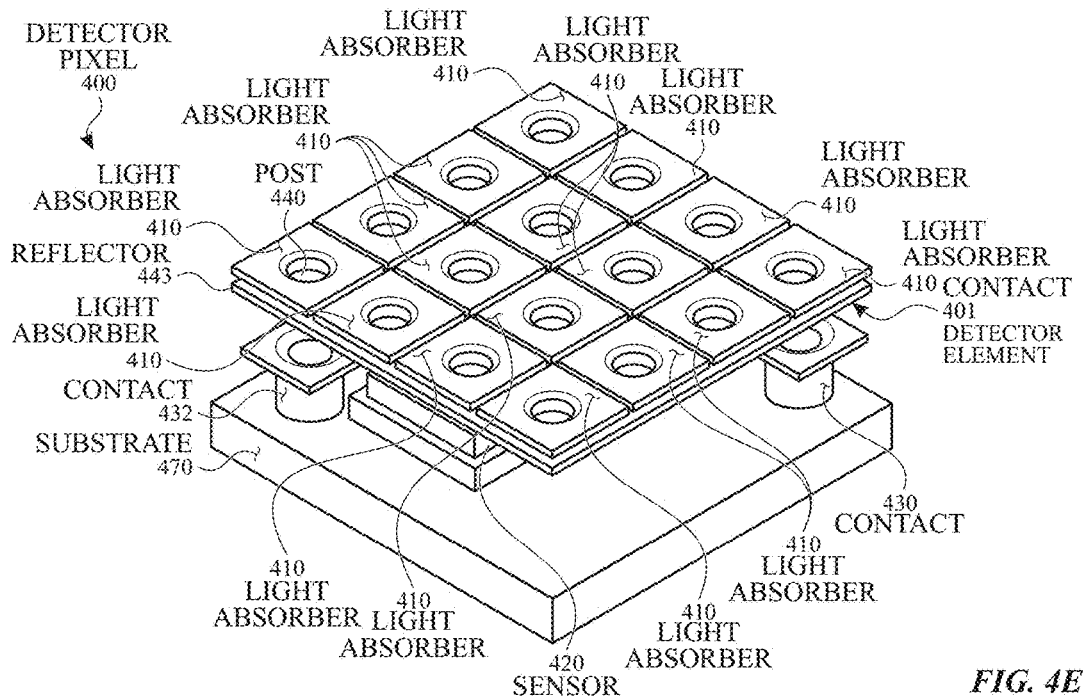
Figure 4F:
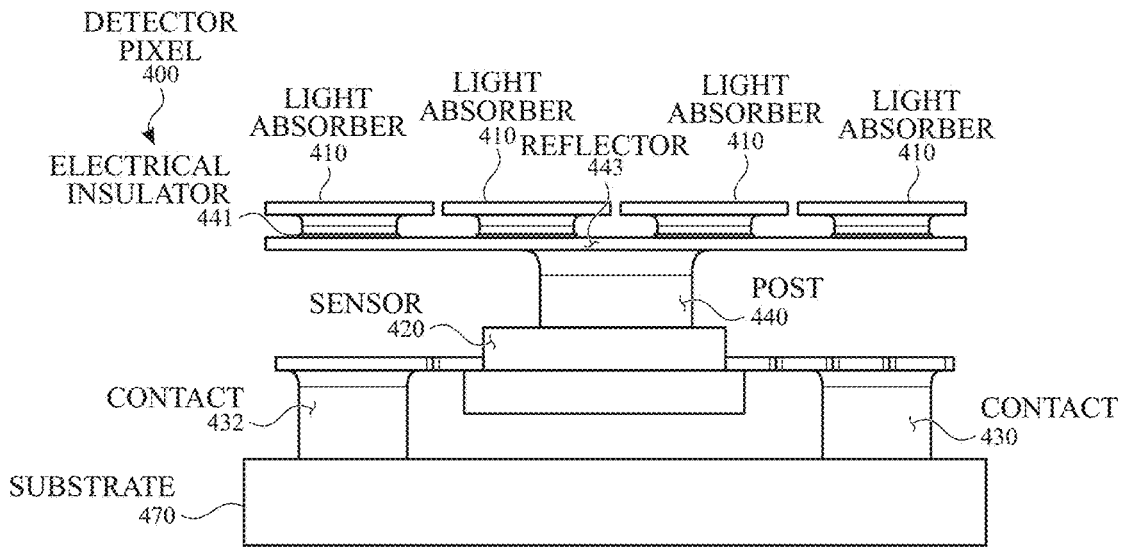

FIGS. 4D-4F illustrate top, plan, and cross-sectional views of an exemplary detector pixel 400 including a reflector 443 located between the light absorber and the sensor according to examples of the disclosure. Detector pixel 400 can be the same as the detector disclosed in FIGS. 4A-4C. Detector pixel 400 can include a plurality of light absorbers, similar to detector pixel 400 illustrated in FIGS. 4A-4C, but illustrated as plate absorbers. Detector pixel 400 can include a reflector 443. Reflector can be any material configured to reflect a substantial amount (e.g., greater than 50%) of non-absorbed and/or incident light. Exemplary reflector materials can include, but are not limited to, Aluminum (Al) and Titanium (Ti). Reflector 443 can be configured as a mirror. In some examples, some of incident light transmits through light absorbers 410 (i.e., light not absorbed by light absorbers 410). Reflector 443 can redirect light back to light absorbers 410 to increase the amount of absorption of incident light by light absorbers 410.

The plurality of light absorbers 410 can be thermally coupled to reflector 443 through a plurality of electrical insulators 441, and reflector 443 can be thermally coupled to one or more sensors, such as sensor 420. In some examples, a light absorber 410 can be configured to absorb at least a wavelength of light (e.g., light in the infrared spectrum). For example, as illustrated in FIGS. 4D-4F, light absorber 410 can have a surface that faces reflector 443. In some examples, the surface of light absorber 410 can be a distance from reflector 443, such as a quarter of the wavelength of light to be absorbed by light absorber 410 (e.g., the first distance is a quarter of a wavelength of infrared light). In some examples, the distance between light absorbers 410 and reflector 443 being a quarter of a wavelength of light can create a resonant cavity effect between light absorbers 410 and reflector 443 for light of that wavelength.

Although FIGS. 4D-4F illustrate the plurality of absorbers as plate absorbers, examples of the disclosure are not so limited to plate absorbers, but can include any type of the absorber, such as the mesh absorbers illustrated in FIGS. 4A-4C and/or the polarized absorbers described with respect to FIGS. 3A-3G. In some examples, detector pixel 400 can include a plurality of reflectors coupled to different light absorbers 410.

Figure 4G:
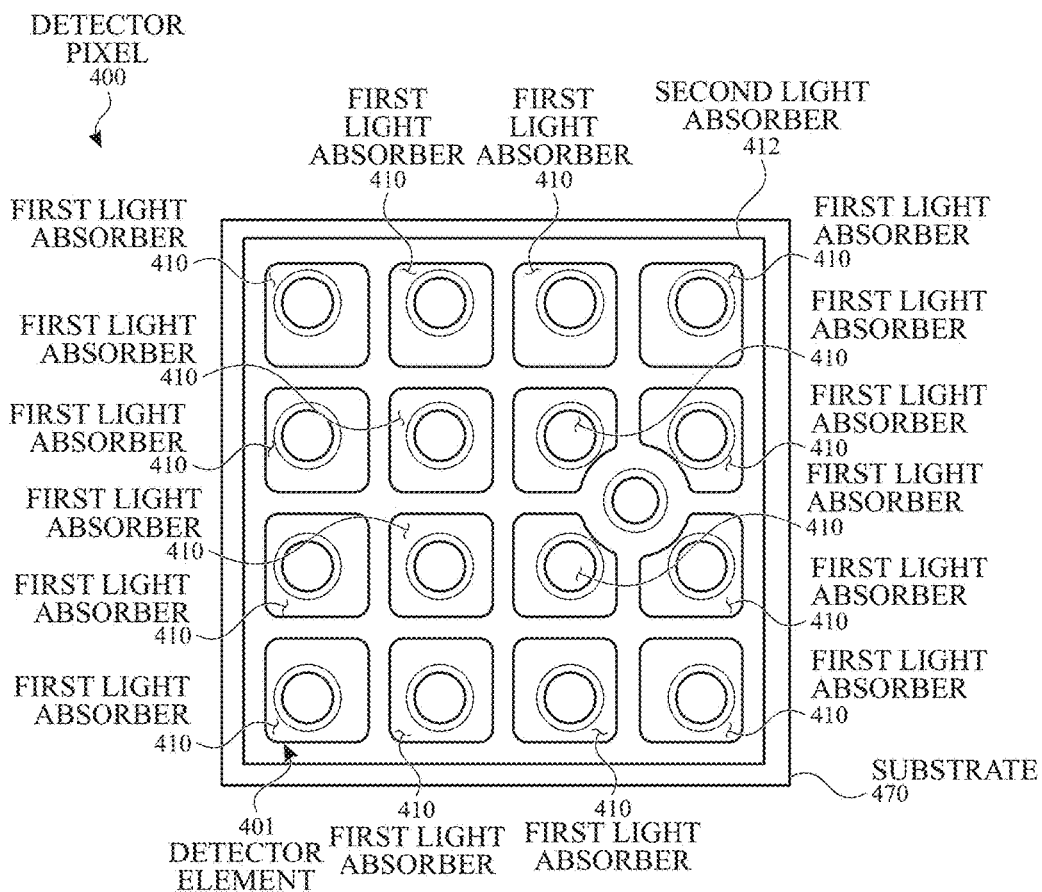
FIGS. 4G-4I illustrate top, plan, and cross-sectional views of an exemplary light detector including a reflector and multiple light absorbers according to examples of the disclosure.
Figure 4H:
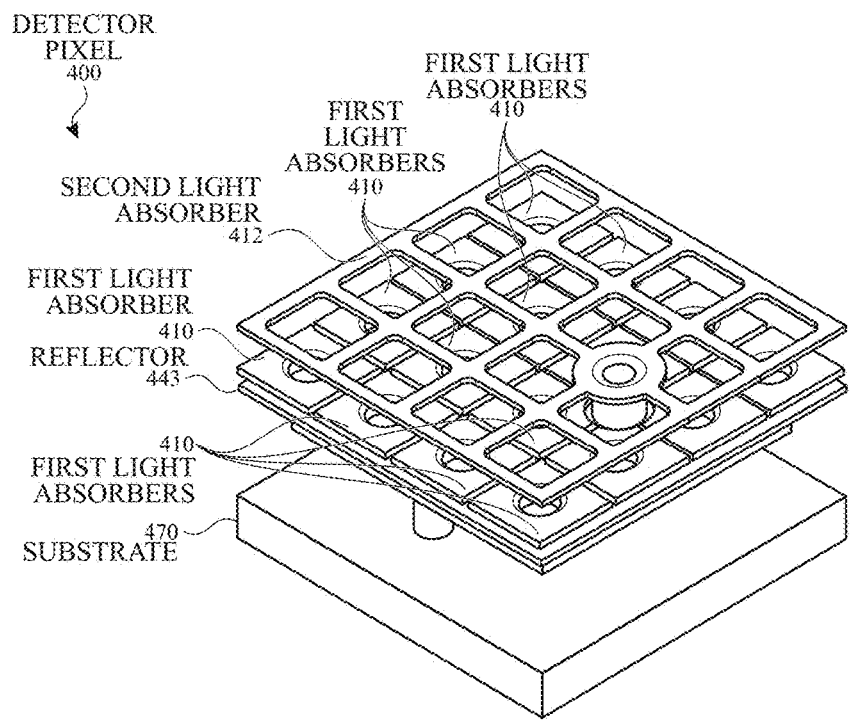
Figure 4I:
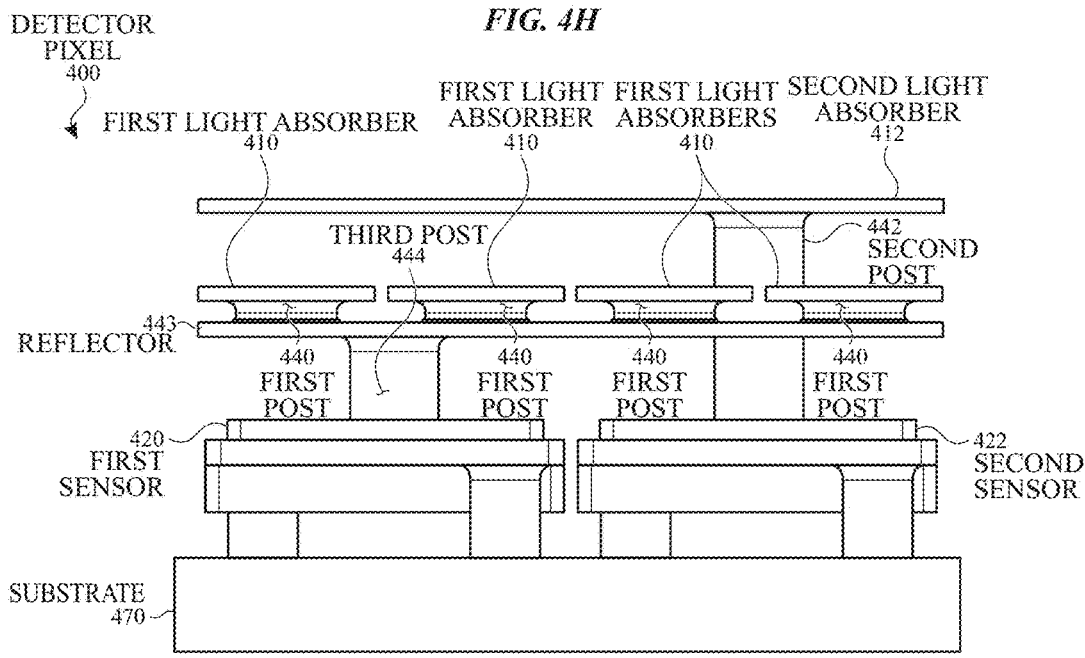

FIGS. 4G-4I illustrate top, plan, and cross-sectional views of an exemplary light detector including a reflector and multiple light absorbers according to examples of the disclosure. Detector pixel 400 can include a plurality of first light absorbers 410 and a second light absorber 412. First light absorbers 410 and second light absorber 412 can be any material capable of absorbing light, including, but not limited to, NiCr, Phosphor Bronze, $V_xO_y$, and a-Si. In some examples, first light absorbers 410 and second light absorber 412 can include materials of the same composition. One skilled in the art would appreciate that the same material composition can include tolerances that result in a 15% deviation. In some examples, second light absorber 412 can be located closer to incident light than first light absorbers 410. In some examples, first light absorbers 410 can be located closer to substrate 470 than second light absorber 412. In some examples, light absorber 410, second light absorber 412, or both can have a large TCR and can be capable of detecting small or minute changes in temperature (e.g., a large resistance change per change in material temperature).

First light absorbers 410 can be thermally coupled to a sensor 420 through a plurality of posts 440. Sensor 420 can be any type of sensor capable of measuring a change in temperature, such as a thermistor. In some examples, sensor 420 can be a resistor capable of changing a resistance in relation to changes in temperature experienced by first light absorbers 410.

Posts 440 can include any type of material capable of conducting heat from first light absorbers 410 to sensor 420. In some examples, posts 440 can be coupled to a third post 444, which can couple to sensor 420. In some examples, sensor 420 can be thermally coupled to first light absorbers 410 by a direct or indirect physical connection through which heat can conduct. For example, first light absorbers 410 can be directly coupled to sensor 420, or heat may conduct through one or more intervening structures (e.g., third post 444) located between first light absorbers 410 and sensor 420 that are directly coupled to first light absorbers 410 and sensor 420.

Detector pixel 400 can include a second light absorber 412. In some examples, second light absorber 412 may not be included in the plurality of first light absorbers 410 that are thermally coupled to each other through sensor 420. Second light absorber 412 can be thermally coupled to a second sensor 422 through second post 442. Second sensor 422 can be mounted on substrate 470 and can be any type of sensor capable of measuring a change in temperature. In some examples, second sensor 422 can be a thermistor or a resistor. In some examples, sensor 420 and second sensor 422 have the same TCR. One skilled in the art would appreciate that the same TCR can include tolerances that result in a 15% deviation. In some examples, sensor 420 and second sensor 422 can be located on the same plane.

Second post 442 can include any type of material capable of conducting heat from second light absorber 412 to second sensor 422. In some examples, second post 442 can transmit through one or more of the plurality of first light absorbers 410. In some examples, as illustrated in FIGS. 4A-4C, third post 444 (coupled to light absorbers 410 and posts 440) can be at a first position, and second post 442 (coupled to second light absorber 412) can be at a second position. The first position and the second position can be symmetric with respect to a center position halfway between first light absorbers 410 and second light absorber 412. In some examples, second post 442 and third post 444 can be located at the corners of detector pixel 400.

Second light absorber 412 can be configured to absorb at least a second wavelength of light longer than the first wavelength of light to be absorbed by first light absorbers 410 (and first light absorbers 410 can be configured not to absorb the second wavelength of light). For example, an outer edge of second light absorber 412 can be longer than an outer edge of first light absorbers 410, and as a result, second light absorber 412 can absorb different or longer wavelengths of light than first light absorbers 410.

In some examples, second light absorber 412 can have a surface that faces a reflector 443, and the surface of second light absorber 412 can be a second distance (e.g., 2.5 um) from reflector 443. In some examples, the second distance can be equal to (or within 10% from) a quarter of the second wavelength of light to be absorbed by second light absorber 412. In some examples, the first distance (e.g., 0.65 um) being a quarter of the first wavelength of light (e.g., infrared or SWIR light) can create a resonant cavity effect between first light absorbers 410 and reflector 443 for light of that first wavelength. Similarly, the second distance being a quarter of the second wavelength of infrared light (e.g., extended SWIR or long-wave infrared (LWIR) light) may create a resonant cavity effect between second light absorber 412 and reflector 443 for light of that second wavelength. Although FIGS. 4H-4I illustrate the plurality of first light absorbers 410 thermally coupled to sensor 420 through reflector 443, examples of the disclosure are not limited to thermally coupling sensor 420 through reflector 443, but can also include examples where reflector 443 is omitted. In some examples, the plurality of first light absorbers 410 can be coupled to one or more electrical insulators, such as electrical insulator 441. In some examples, the one or more electrical insulators 441 can be directly coupled to sensor 420 (similar to the configuration illustrated in FIGS. 4A-4C).

In some examples, second light absorber 412 can be included in an additional plurality of light absorbers. In some examples, the additional plurality of light absorbers can be different from the plurality of first light absorbers 410. In some examples, each of the additional plurality of light absorbers can be electrically isolated from each other and can be thermally coupled to second sensor 422 to detect light of the second wavelength, as described above, longer than the first wavelength of light to be absorbed by first light absorbers 410.

Figure 4J:
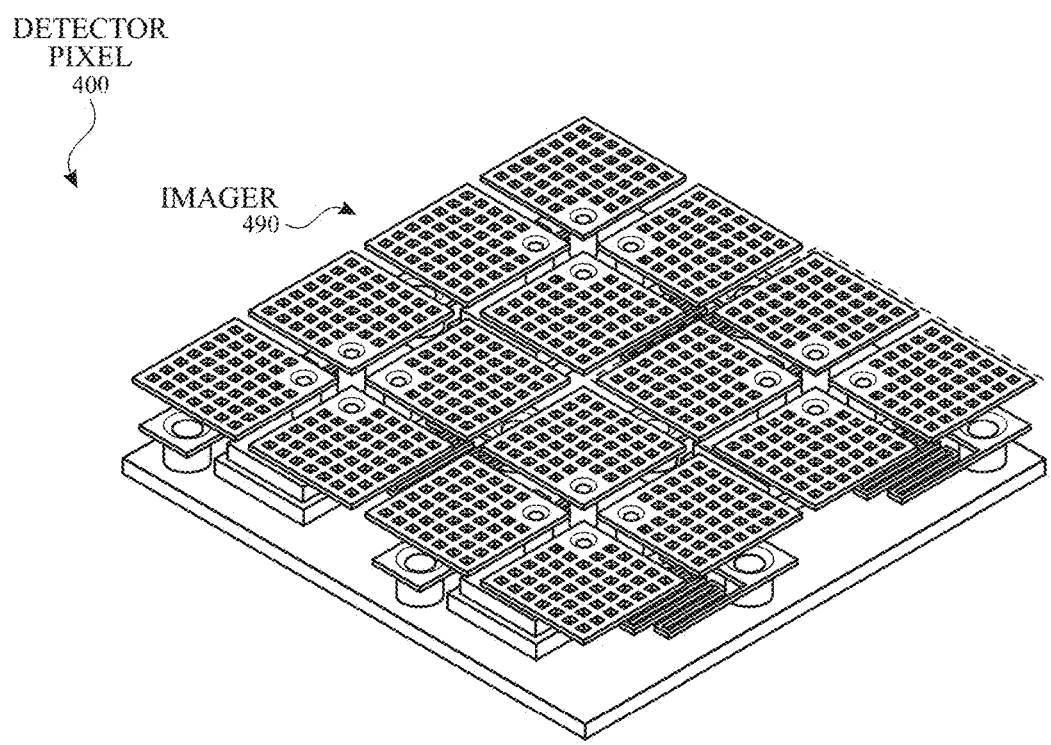
FIG. 4J illustrates a plan view of an exemplary FPA or imager comprising an array of light sensing detector pixels according to examples of the disclosure.

FIG. 4J illustrates a plan view of an exemplary FPA or imager comprising an array of light sensing detector pixels according to examples of the disclosure. Detector pixel or detector pixel 400 can be included in FPA or imager 490. An FPA can be an image-sensing device comprising an array of optical sensors. Detector pixel 400 can be incorporated as a first light sensing detector pixel (e.g., an infrared light sensing detector pixel) including a first light absorber, a second light absorber, a reflector, or any combination. In some examples, imager 490 can be an infrared imager. In some examples, the imager can comprise an array of detector pixels, where each detector pixel can be configured with a first light absorber and a second light absorber located on different layers. In some examples, imager 490 can be arranged as two rows and two columns. For example, detector pixel 400 can be co-located in a first column of a first row, while another detector pixel or detector pixel 400 can be co-located in a second column of the first row. Although FIG. 4J illustrates arrays of the same or repeated configuration of detectors or detector pixels, examples of the disclosure are not limited to detectors comprising arrays of the same or repeated configuration of detectors or detector pixels. In some examples, an array can include any combination of light detectors described herein, including any and/or all of the detectors illustrated in and described with respect to the other figures.

Figure 4K:
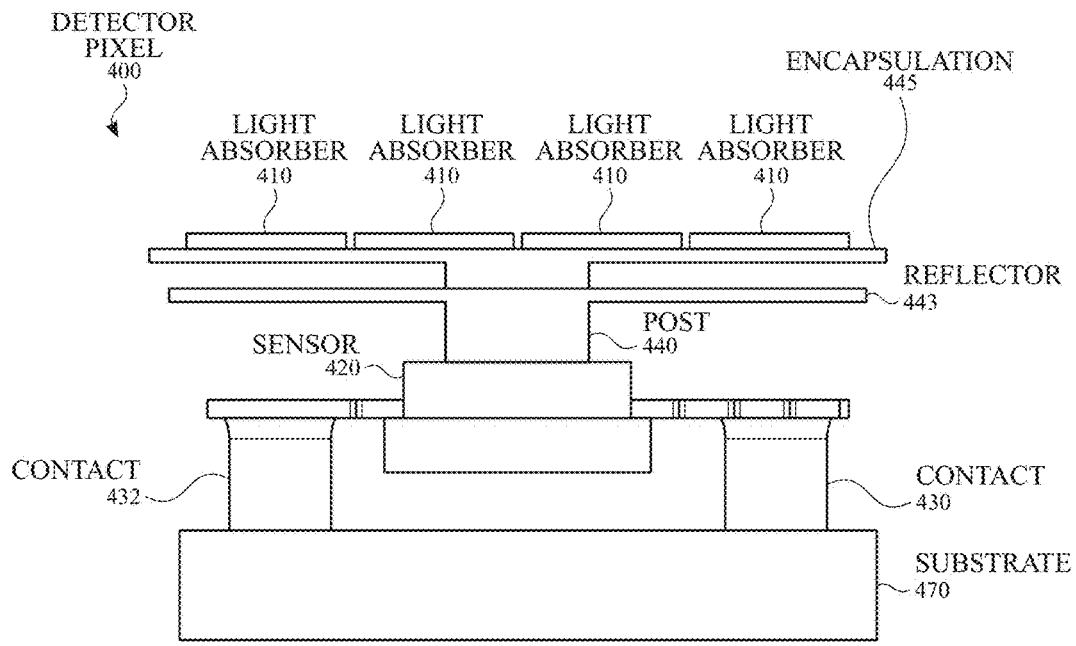
FIG. 4K-4M illustrate cross-sectional views of exemplary light detectors including encapsulated light absorbers according to examples of the disclosure.
Figure 4L:
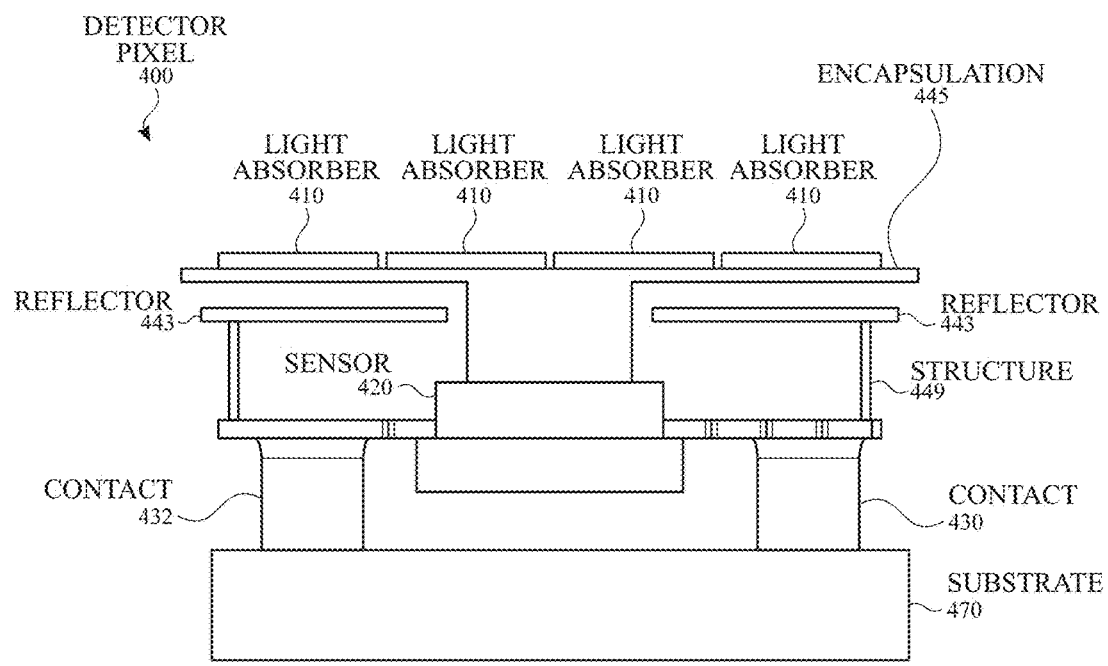
Figure 4M:
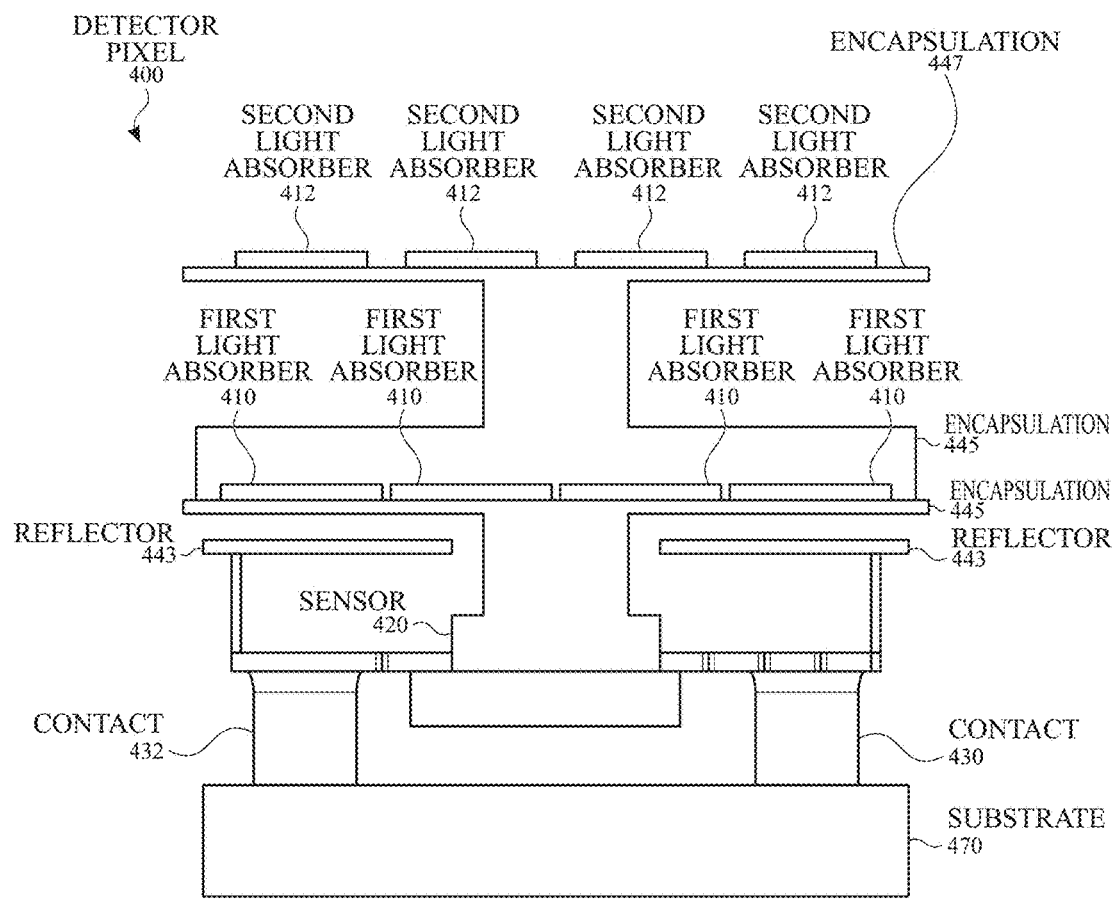

Any of the light absorbers describe here can be supported by and/or enclosed within an encapsulation layer. For example, FIG. 4K-4M illustrate cross-sectional views of exemplary detector pixels including encapsulation according to examples of the disclosure. Detector pixel 400 can include a plurality of light absorbers 410 (also labeled first light absorbers 410 in FIG. 4M). One or more of light absorbers 410 can include any of the light absorbers as discussed above, such as a mesh absorber (described above with respect to FIGS. 4A-4C), a plate absorber (described above with respect to FIGS. 4D-4F), or a polarizing absorber (similar to the absorbers described above with respect to FIGS. 2A-2D and 3A-3G). Plurality of light absorbers 410 can be at least partially encapsulated by encapsulation 445. In some examples, plurality of light absorbers 410 can be fully encapsulated by encapsulation 445. Encapsulation 445 can be configured for thermally coupling light absorbers 410 while also electrically isolating the light absorbers 410. In some examples, encapsulation 445 can include a material transparent in the desired measurement wavelength(s). For example, the desired measurement wavelengths can include SWIR, and encapsulation 445 can include silicon dioxide $SiO_2$, silicon nitride $Si_3N_4$, or both. In some examples, encapsulation 445 can be configured to prevent thermal expansion issues. For example, encapsulation 445 can have the same thermal expansion coefficient as the light absorbers 410. Detector pixel 400 can further include reflector 443. In some examples, any light (if any) absorbed by reflector 443 can be measured by sensor 420.

When reflector 443 is thermally coupled to the plurality of light absorbers 410, the sensitivity of detector pixel 400 can decrease. FIG. 4L illustrates a cross-sectional view of an exemplary detector pixel 400 including reflector 443 that can be thermally isolated from the plurality of light absorbers 410. Thermal isolation can prevent light absorption or heat generated by the plurality of light absorbers from affecting reflector 443. Reflector 443 can be coupled to structure 449. Structure 449 can be configured to provide support to reflector 443. In some examples, structure 449 can be coupled to contact 430 and contact 432. In some examples, structure 449 can be decoupled from contact 430 and contact 432. In some examples, structure 449 can be configured to act as a heat sink to prevent reflector 443 from changing temperature due to any absorbed light.

In some examples, a detector pixel can include multiple layers of absorbers. FIG. 4M illustrates a cross-sectional view of an exemplary detector pixel 400 including a first layer including a plurality of first light absorbers 410 encapsulated by encapsulation 445. Detector pixel 400 can also include a second layer including a plurality of second light absorbers 412 encapsulated by encapsulation 447. In some examples, the plurality of first light absorbers 410 can be located closer to substrate 470 than the plurality of second light absorbers 412. The plurality of first light absorbers 410 can optionally include encapsulation 445 disposed on or around the plurality of first light absorbers 410. Although not illustrated in the figure, the plurality of second light absorbers 412 can include encapsulation 447 disposed on or around the plurality of first light absorbers 412. In some examples, encapsulation 447 and encapsulation 445 can comprise the same materials. In some examples, the encapsulation disposed on or surrounding the light absorbers can comprise a different material than the encapsulation disposed closer to the substrate than the light absorbers.

In some examples, the plurality of second light absorbers 412 can be configured to absorb one or more longer wavelengths than the plurality of first light absorbers 410. In some examples, the plurality of first light absorbers 410 can be configured to absorb one or more shorter wavelengths than the plurality of second light absorbers 412. In some examples, the layer including the plurality of first light absorbers 410 can be spaced a distance equal to a quarter of the absorption wavelength away from reflector 443. In some examples, the layer including the plurality of second light absorbers 412 can be spaced a distance equal to a quarter of the absorption wavelength away from the layer including the plurality of first light absorbers 410.

In some examples, the properties (e.g., size) of the light absorbers can be configured based on the desired measurement (e.g., absorption) wavelength range. As discussed earlier, one or more of the light absorbers can be configured with an outer edge equal to four times the long-end wavelength of the desired measurement wavelength range. In some examples, the plurality of first light absorbers 410 can be configured with a desired measurement wavelength range that is longer than the desired measurement wavelength range of the plurality of second light absorbers 412 by configuring the outer edge of the plurality of first light absorbers to be longer than the outer edge of the plurality of second light absorbers 412 (as illustrated in FIG. 4M). In this manner, the overall desired measurement wavelength range of detector pixel 400 can be extended.

In some examples, light absorbers (e.g., plurality of light absorbers 412) on a first layer can have a size different from light absorbers (e.g., plurality of light absorbers 410) on a second layer. Although FIGS. 4K-4M illustrate detector pixels including reflector 443, examples of the disclosure can include detectors without a reflector. Although FIG. 4M illustrates a detector pixel including two layers of light absorbers, examples of the disclosure can include any number of layers, including, but not limited to, three layers.

Figure 4N:
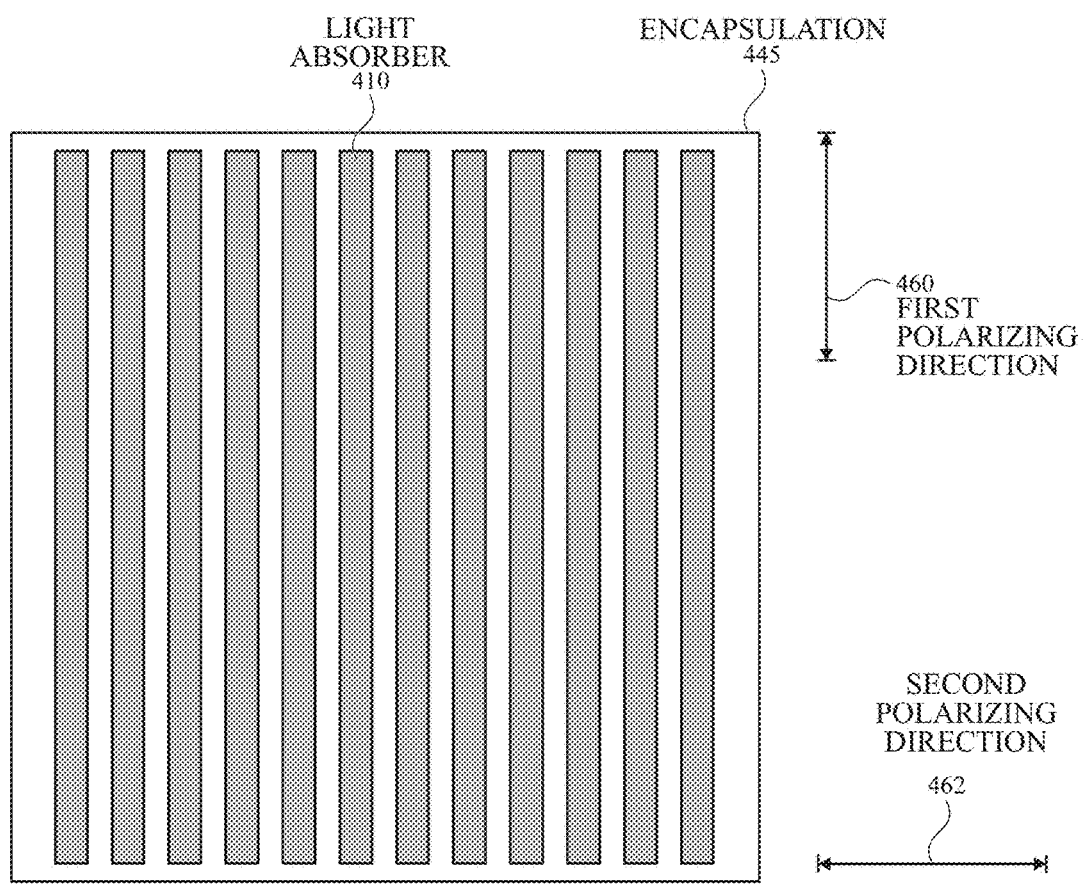
Figure 40:
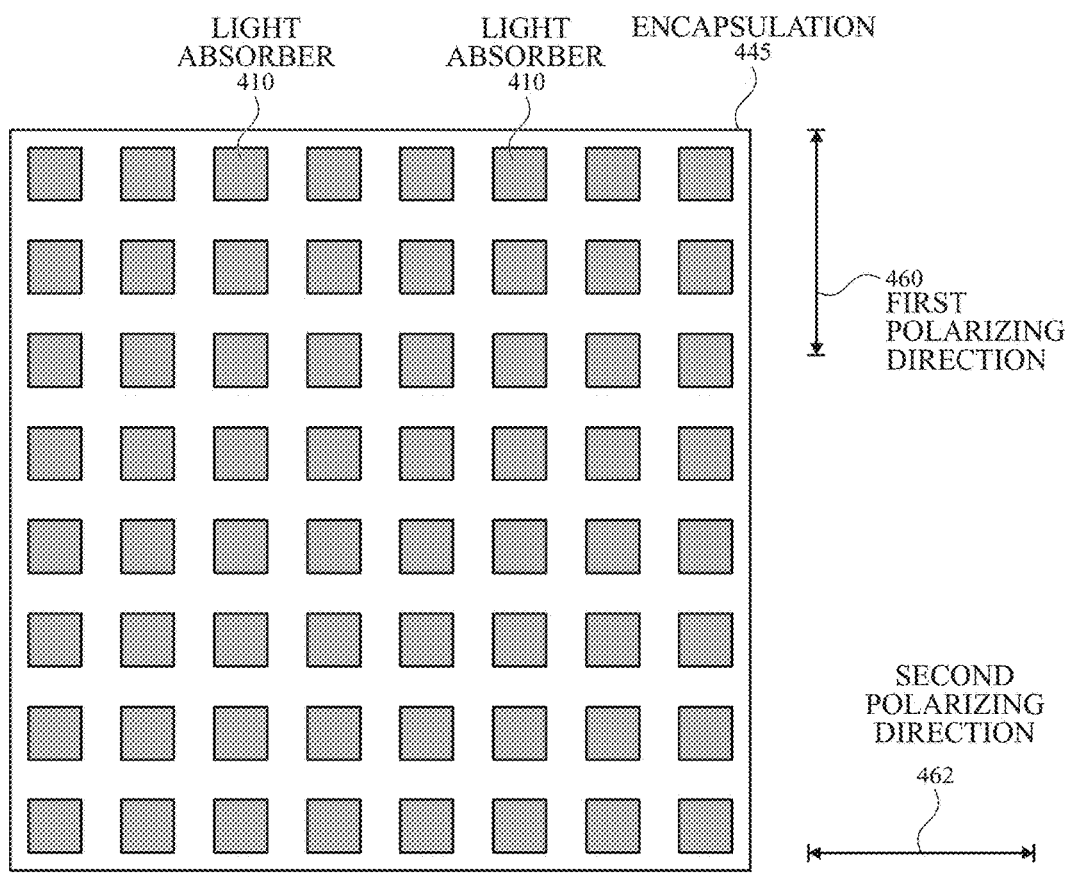

In some examples, the encapsulation can provide support to a polarization-sensitive light absorber such as those shown in FIGS. 2A-2D and 3A-3G. FIG. 4N illustrates a top view of an exemplary detector pixel according to examples of the disclosure. In some examples, encapsulation 445 can support a plurality of light absorbers 410 that can be collectively configured to absorb light in a given polarizing direction. In some examples, light absorber 410 can be linear. In some examples, the light absorbers 410 can be spaced at intervals (e.g., equivalent to slits 250 illustrated in FIGS. 2A-2D and slits 350 illustrated in FIGS. 3A-3G). Light absorber 410 can be supported by encapsulation 445. Due to the encapsulation providing support, ends of the plurality of light absorbers 410 can be configured closer to the edges of encapsulation 445 (in contrast to ends of slit 350 included in first light absorber 310 illustrated in FIG. 3D, for example). In some examples, a length of light absorber 410 can be equal to a length of encapsulation 445. In some examples, at least one edge of light absorber 410 can be aligned with at least one edge of encapsulation 445. By configuring the ends of plurality of light absorber 410 closer to edges of encapsulation 445 (e.g., the material on two opposite edges of the absorber is less than the material on the other two opposite edges), less light can be absorbed in other polarizing directions, such as second polarizing direction 462, and thus, the measurement from the plurality of light absorbers 410 can include less light absorbed from different polarization directions.

Although the figure illustrates the plurality of light absorbers 410 as rectangular, examples of the disclosure can include any shape, such as, but not limited to, squares, hexagons, heptagons, and circles. FIG. 4O illustrates a top view of an exemplary detector pixel according to examples of the disclosure. In some examples, the detector pixel can include square light absorbers 410. In some examples, encapsulation 445 can provide support to the material forming the light absorber 410, such that one or more edges of light absorbers 410 can be aligned with at least one edge of encapsulation 445.

As discussed above, a detector capable of operating at, near, or above room temperature may be desired. Depending on the application or use, the detector can be incorporated into a system that is exposed to different environmental conditions, such as environments with temperatures above room temperature. As the temperature increases, the sensitivity of the detector and/or associated ROIC can decrease. Accordingly, a detector and/or ROIC can be optimized for a specific operation range, where performance of the sensor system (i.e., a system including at least a detector and a ROIC) can worsen for detection outside of that operation range.

One figure of merit for sensor systems can be the dynamic range. The dynamic range can be the maximum light or photon flux that can be sensed by the ROIC in the sensor system. A system whose performance is not limited by its sensitivity while operating throughout the dynamic range can be desired. Related to the sensitivity can be the TCR. As discussed above, the TCR can be a measure of the change in resistance in response to a change in temperature. The TCR can be related to the resistance by:

$$R = Ae^{TCR \times T} \quad (2)$$

where R is the resistance, A is a coefficient, and T is the operating temperature. Alternatively, the TCR can be determined by:

$$TCR = \frac{1}{R}\frac{dR}{dT} \quad (3)$$

Equation 2 illustrates that the TCR is not constant, and instead, is a function of the operating temperature. For example, a $V_xO_y$-based bolometer can be a good candidate for room temperature operation because the TCR can have a maximum or an absolute value (e.g., $-0.003K^{-1}$) at or near room temperature (e.g., 300K). However, as the operating temperature increases, the change in resistance can decrease. As a result, under high flux light conditions, the bolometer or detector and its integrated circuit or ROIC can be less sensitive to temperature or resistance changes. Accordingly, a sensory system (e.g., bolometer and integrated circuit or ROIC) capable of a wide dynamic range and capable of adjusting its sensitivity to account for both low flux light (i.e., incident light less than a flux threshold value) and high flux light (i.e., incident light greater than or equal to a flux threshold value) conditions can be desired.

Figure 5:
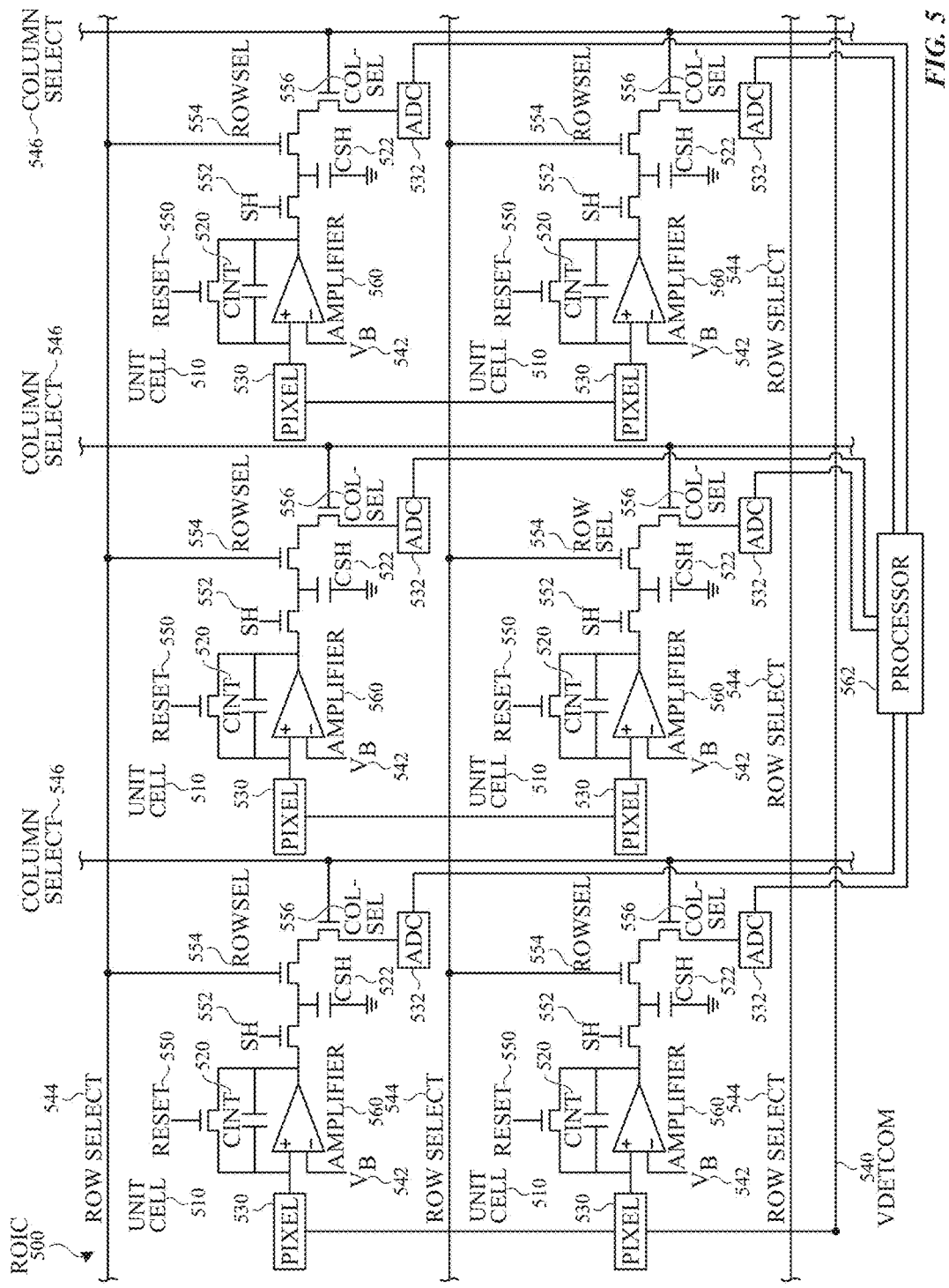
FIG. 5 illustrates an exemplary ROIC according to examples of the disclosure.

FIG. 5 illustrates an exemplary ROIC according to examples of the disclosure. ROIC 500 can comprise a plurality of unit cells 510. Each unit cell 510 in ROIC 500 can be coupled to a detector pixel 530 included in a detector array. A unit cell 510 can convert a photocurrent generated by each detector pixel 530 (coupled to Vdetcom 540) to a voltage indicative of the properties of detected light. A unit cell 510 can comprise an integrator, a preamplifier, a sample & hold (SH) circuit, and an analog-to-digital converter (ADC). In some examples, the current from detector pixel 530 can be weak or small, incremental current. One way to generate a large measurable output from the small, incremental current can be to integrate the photocurrent using an integrating capacitor $C_{int}$ 520. Integrating capacitor $C_{int}$ 520 can be coupled to a detector pixel 530 in the detector array. The integrating capacitor $C_{int}$ 520 can be configured to store charge associated with the photocurrent or light detected by the corresponding detector pixel 530. The integrating capacitor $C_{int}$ 520 can be coupled to an amplifier 560. An integration time can be set to determine the fixed period of time when the photocurrent from detector pixel 530 can be integrated. At the end of the integration time, $C_{int}$ can be proportional to the current and can represent incident light on detector pixel 530. A reset transistor 550 can be coupled to the integrating capacitor $C_{int}$ 520 to discharge the capacitor. At the end of the integration time, the integrated voltage can be sampled and held on a hold capacitor $C_{SH}$ 522 through transistor SH 552. The hold capacitor $C_{SH}$ 522 can be configured to store the integrated charge.

The ROIC can have a row-column arrangement where each unit cell 510 in a row can be coupled to the same row select lines 544, and each unit cell 510 in a column can be coupled to the same column select lines 546. Row select lines 544 can be coupled to RowSel 554 transistor, and column select lines 546 can be coupled to ColSel 556 transistor. The outputs of unit cells 510 can be swept row-by-row and/or column-by-column to be converted to a serial stream of bits. The sequence of row and column selection can be enabled and varied depending on the type of mode of integration (e.g., Integrate-While-Read or Integrate-Then-Read). If a unit cell 510 is selected (through a row select line 544 turning on a corresponding RowSel 554 transistor and column select line 546 turning on a corresponding ColSel 556 transistor), the integrated charge stored on the hold capacitor $C_{SH}$ can be input into ADC 532. ADC 532 can digitize the integrating current and can transmit this information to processor 562.

In some examples, the ROIC can be optimized with a specific gain or specific mode of operation. However, when imaging a scene, for example, the scene can include both bright (e.g., high photon flux) objects of interest and dim (e.g., low photon flux) objects of interest. Therefore, a specific gain or specific mode of operation optimized for the bright objects of interest can prevent sufficient detection of the dim objects of interest. Additionally, a specific gain or specific mode of operation optimized for dim objects can lead to saturation of the integrating capacitors $C_{int}$ 520 and/or ADCs 532 in ROIC 500. In some examples, the bright objects of interest can include the reflection of light due to one or more properties in the object. In some examples, the dim objects of interest can include the reflection of light due to other properties in the object. For a given dynamic range for the detector, the ROIC, or both, the sensor system's performance can be compromised when operating outside this given dynamic range. The dynamic range can limit how fast the data or stored charge can be read by the processor, which can be important especially when imaging moving objects. Therefore, a detector and ROIC capable of a wide or ultra-wide dynamic range can be desired.

Figure 6A:
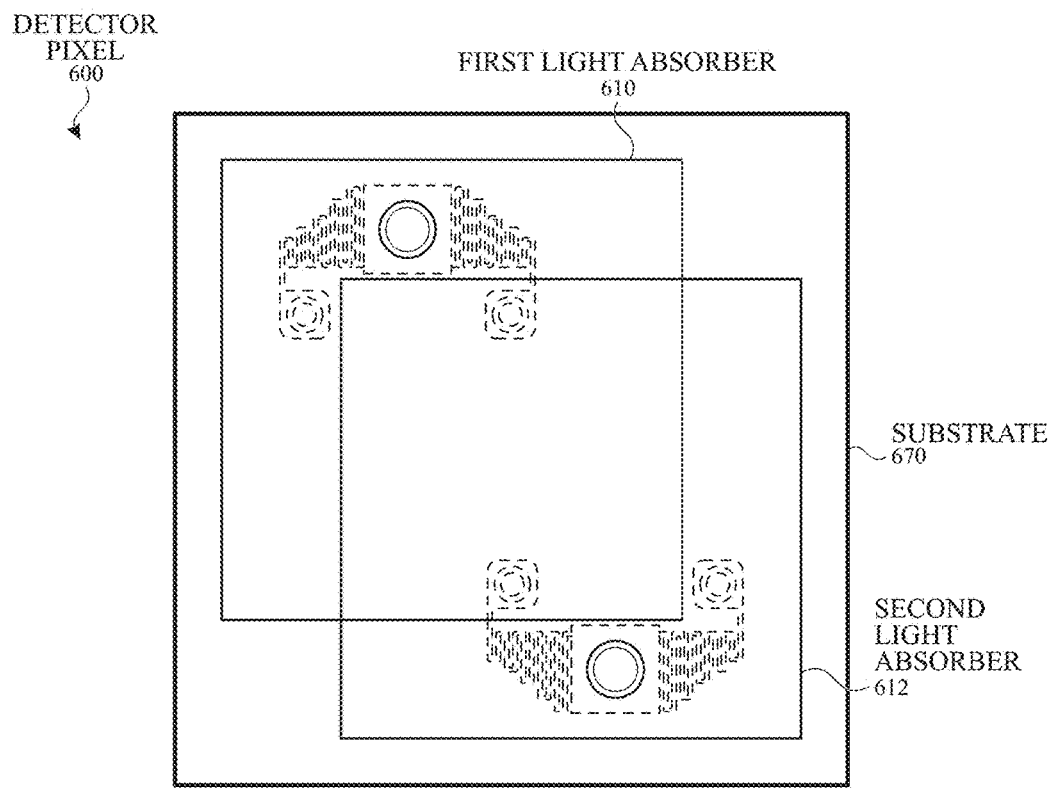
FIGS. 6A-6C illustrate top and cross-sectional views of an exemplary detector pixel including multiple absorbers according to examples of the disclosure.
Figure 6B:
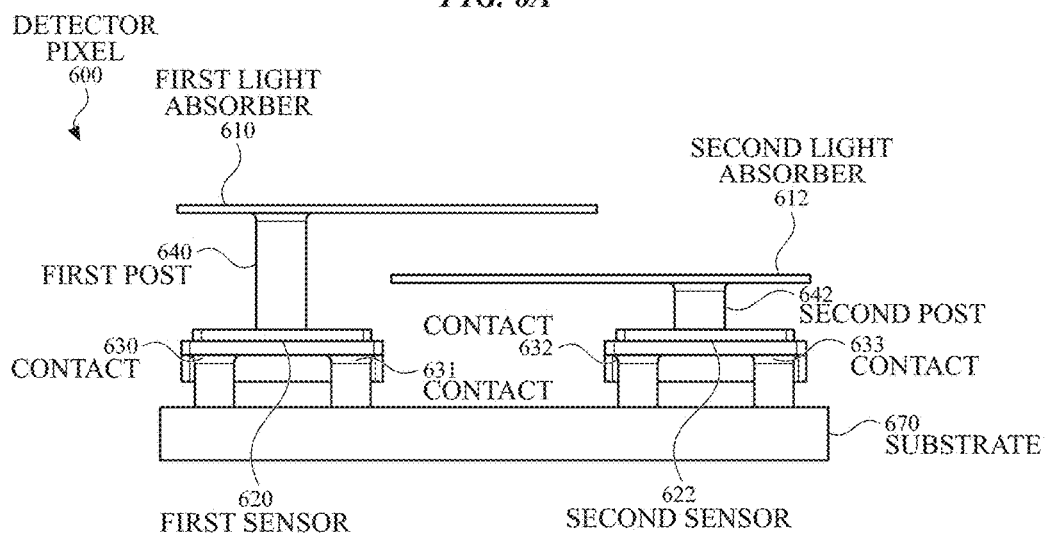

FIGS. 6A-6B illustrate top and cross-sectional views of an exemplary detector pixel including multiple absorbers according to examples of the disclosure. Detector pixel 600 can be a detector pixel including a first light absorber 610. In some examples, detector pixel 600 can be a bolometer. First light absorber 610 can include any material capable of absorbing light, including, but not limited to, NiCr, Phosphor Bronze, $V_xO_y$, and a-Si. First light absorber 610 can be exposed to the electromagnetic radiation or light, and any light absorbed by first light absorber 610 can produce heat within the light absorber, changing its temperature. The change in temperature in first light absorber 610 can be proportional to the amount of light absorbed by first light absorber 610. In some examples, first light absorber 610 can have a large TCR and can be capable of detecting small or minute changes in incident radiation (e.g., a large resistance change per change in material temperature). First light absorber 610 can be thermally coupled to a first sensor 620 through first post 640. First sensor 620 can be mounted on a substrate 670 and can be any type of sensor capable of measuring a change in temperature, such as a thermistor. In some examples, first sensor 620 can be a resistor capable of changing a resistance in relation to changes in temperature experienced by first light absorber 610.

First post 640 can include any type of material capable of conducting heat from first light absorber 610 to first sensor 620. In some examples, first light absorber 610 can be coupled to one post. In some examples, first light absorber 610 can be coupled to multiple posts. In some examples, first sensor 620 can be thermally coupled to first light absorber 610 by a direct or indirect physical connection through which heat can conduct. For example, first light absorber 610 can be directly coupled to first sensor 620, or heat may conduct through one or more intervening structures located between first light absorber 610 and first sensor 620 that are directly coupled to first light absorber 610 and first sensor 620.

Substrate 670 can include contact 630 and contact 631. Contact 630 and contact 631 can be coupled to an integrated circuit, such as a ROIC. The integrated circuit can be coupled to a processor or controller. In some examples, the processor can bias the detector with a constant current or constant voltage and can measure the change in resistance through contact 630 and contact 631 due to light impinging on first light absorber 610.

Detector pixel 600 can further include a second light absorber 612. Second light absorber 612 can include any material capable of absorbing light, including, but not limited to, NiCr, Phosphor Bronze, $V_xO_y$, and a-Si. In some examples, the material of second light absorber 612 can include the same material composition as the material of first light absorber 610. One skilled in the art would appreciate that the same material composition can include tolerances that result in a 15% deviation. Second light absorber 612 can be located further away from the incident radiation or light than first light absorber 610. Second light absorber 612 can be exposed to light, and any light absorbed by second light absorber 612 can produce heat within the light absorber, changing its temperature. The change in temperature in second light absorber 612 can be proportional to the amount of light absorbed by second light absorber 612. Second light absorber 612 can be thermally coupled to a second sensor 622 mounted on substrate 670. The change in temperature in second light absorber 612 can cause a change in the resistance of second sensor 622. In some examples, second sensor 622 can be a resistor that changes resistance as its temperature changes. Second sensor 622 can be electrically coupled to an integrated circuit (not shown) through contact 632 and contact 633. Second sensor 622 can be coupled to the same unit cell in the integrated circuit that first sensor 620 is coupled to. The integrated circuit can be coupled to a processor, computer, or controller, which can bias the detector pixel with a constant current or constant voltage and can measure the change in resistance through contact 632 and contact 633 due to the light impinging on second light absorber 612.

In some situations, a detector may not include a second light absorber 612 located further away from incident light than first light absorber 610 (i.e., the first light absorber can be located between incident light and the second light absorber). In such situations, the intensity of incident light on first light absorber 610 can be outside the dynamic range of first light absorber 610. Without second light absorber 612, the capabilities of the sensor system can be limited to the dynamic range of first light absorber 610. First light absorber 610 may only be capable of absorbing an amount less than 100% of incident light, which can saturate the sensor system and can leave the remaining unabsorbed incident light undetected. While saturation of the sensor system can be avoided by reducing the intensity of incident light, for example, reducing the intensity of the emitted light from the light source can lead to a compromise in the capability of detecting low flux light. That is, reducing the intensity of the emitted light from the light source can cause reflection or transmission of very low flux light that may not be detected by the detector.

Detector pixel 600 can be capable of measuring both low flux light and high flux light by including a second light absorber 612 that can "shadow" first light absorber 610 or can be exposed to any incident radiation or incident light not absorbed by first light absorber 610. For high flux situations, for example, the flux of incident light can saturate first light absorber 610 and corresponding integrated circuit. The processor coupled to the integrated circuit can ignore the signal (or photocurrent) from first light absorber 610, for example. If incident light saturates first light absorber 610 (i.e., exceeds the absorption capabilities of first light absorber 610) and/or corresponding unit cell (e.g., unit cell 510 of ROIC 500 illustrated in FIG. 5), incident light can still be measured by second light absorber 612 and its corresponding unit cell. For low flux light situations, for example, first light absorber 610 can absorb all or greater than 50% of incident light, while no or small amounts (e.g., less than 50%) of incident light may reach second light absorber 612. If the integrated circuit coupled to first light absorber 610 has not saturated, the processor can ignore the signal (or photocurrent) from second light absorber 612 and determine the measurement based on first light absorber 610.

Any number of configurations for first light absorber 610 and second light absorber can be used for measuring low flux light, high flux light, or both. To "shadow" first light absorber 610, at least a portion of second light absorber 612 can overlap at least a portion of first light absorber 610 and can be located closer to substrate 670 than first light absorber 610. Second light absorber 612 can absorb a portion of the total incident light, where less than the total incident light can reach second light absorber 612 than first light absorber 610. For example, first light absorber 610 can be configured to absorb 80% of the relative absorption (i.e., absorbed incident light or light incident on the surface area of the light absorbers that is absorbed by the light absorbers), whereas second light absorber 612 can be configured to absorb 20% of the relative absorption. In some examples, first light absorber 610 can be the same size and/or same shape as second light absorber 612. One skilled in the art would appreciate that the same size and same shape can include tolerances that result in a 15% deviation. In some examples, first light absorber 610 and second light absorber 612 can be different sizes. In some examples, the size of first light absorber 610 can be greater than second light absorber 612. In some examples, contact 630 and contact 631 (coupled to first light absorber 610) and contact 632 and contact 633 (coupled to second light absorber 612) can couple to a separate unit cell (e.g., unit cell 510) in the integrated circuit (e.g., ROIC), essentially forming two detector pixels having the same footprint as a detector pixel. In some examples, the absorbance of first light absorber 610 can be based on the targeted transmittance of shadowed light to second light absorber 612. In some examples, the sensitivity of first light absorber 610 can differ from the sensitivity of second light absorber 612. For example, a second light absorber 612 (and corresponding unit cell on the ROIC) can be configured with a higher sensitivity than first light absorber 610 (and corresponding unit cell on the ROIC). By configuring different sensitivities, the sensor system can be capable of high sensitivity detection throughout the (wide) dynamic range. In some examples, first light absorber 610 can be coupled to a first post 640 that transmits through second light absorber 612, while first light absorber 610 and second light absorber 612 can remain thermally isolated from each other. First light absorber 610 can be thermally coupled to first sensor 620 through first post 640. Second light absorber 612 can include a second post 642, and second light absorber 612 can be thermally coupled to second sensor 622 through second post 642.

In some examples, as illustrated in FIGS. 6A-6B, first post 640 (coupled to first light absorber 610) can be at a first position, and second post 642 (coupled to second light absorber 612) can be at a second position. The first position can be located at one corner of detector pixel 600, and the second position can be located at another corner of detector pixel 600. In some examples, the first position and the second position can be symmetric with respect to a center position halfway between first light absorber 610, second light absorber 612, or detector pixel 600. In some examples, the heat capacity of first post 640 can be different from the heat capacity of second post 642 and/or can be based on the size, absorbance, or properties of the light absorbers. In some examples, contact 630 and contact 631 (coupled to first light absorber 610) can be directly or indirectly coupled to contact 632 and contact 633 (coupled to second light absorber 612).

In some examples, first post 640 and first sensor 620 (coupled to first light absorber 610) and second post 642 and second sensor 622 can be configured with a low heat capacity such that the temperature greatly increases for a small amount of incident radiation or light flux. In some examples, the signal-to-noise ratio (SNR) of second light absorber 612 can be comparable to the SNR of first light absorber 610. As a result, the signal from second light absorber 612 can be used to improve the SNR of the measurement, especially when the noise on the signal coupled to first light absorber 610 can be averaged and/or is dominated by an element not related to detector pixel 600.

Although FIGS. 6A-6B illustrate the plurality of absorbers as plate absorbers, examples of the disclosure are not so limited to plate absorbers, but can include any type of the absorber, such as the mesh absorbers illustrated in FIGS. 4A-4C and/or the polarized absorbers described with respect to FIGS. 3A-3G. In some examples, each of first light absorber 610 and second light absorber 612 can be a mesh, and can together form a capacitive resonant mesh. In some examples, each light absorber can include a grid of wires forming the mesh. For example, as illustrated in FIGS. 4A-4C, the light absorbers can be coplanar and can form a capacitive resonant mesh such that the light absorbers only absorb light in a range of wavelengths determined by the spacing of the wires in the metal mesh and the dimensions of the light absorber themselves. Although FIGS. 6A-6B illustrate two light absorbers, examples of the disclosure can include any number of light absorbers and corresponding sensors, posts, and contacts. Additionally, examples of the disclosure can include one or more reflectors, one or more electrical insulators coupled to one or more posts, or both.

Figure 6C:
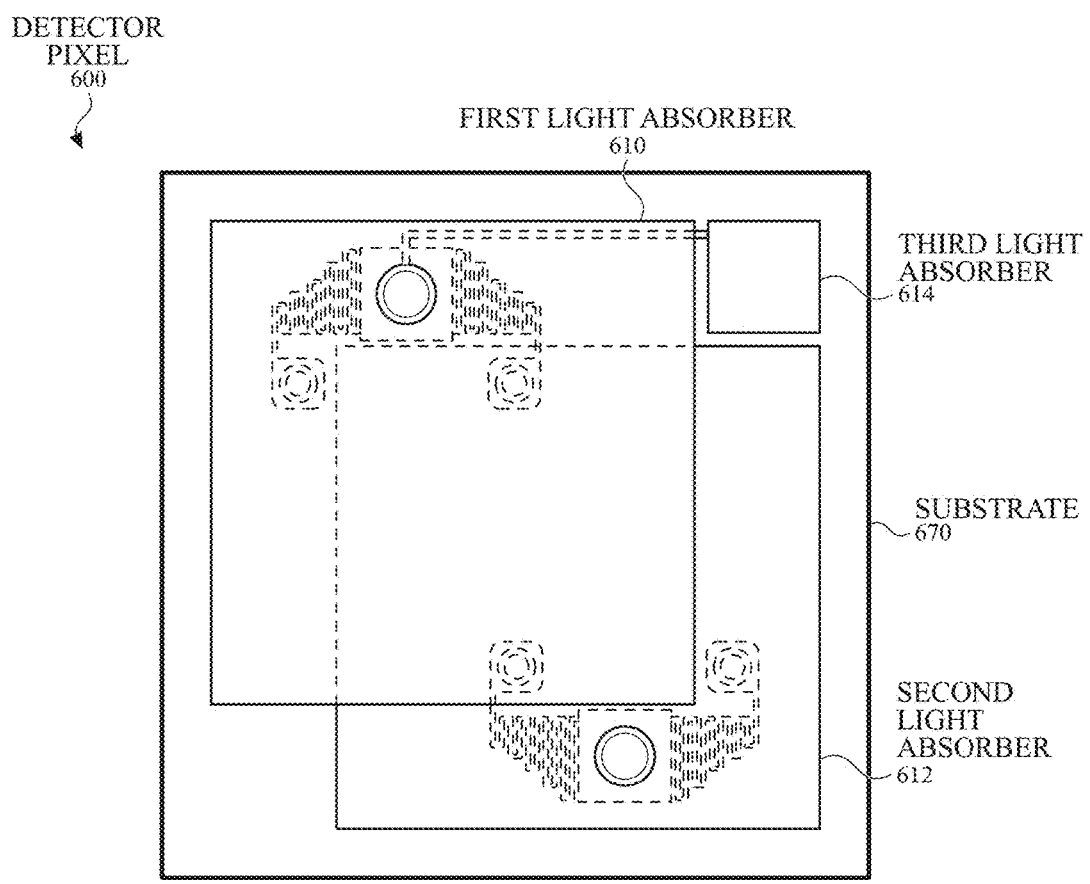

In some examples, detector pixel 600 can include a third light absorber 614, as illustrated in FIG. 6C. Third light absorber 614 can be thermally coupled to first post 640. In some examples, bright objects can lead to bright (i.e., high intensity) incident light on the surface of first light absorber 610, second light absorber 612, or both. The high intensity incident light can lead to a bias current that causes an excessive load (i.e., overload) on the sensor system associated with detector pixel 600. To prevent the bias current from overloading the sensor system, third light absorber 614 can be configured as a heat sink. In some examples, third light absorber 614 can include a material with the same composition as first light absorber 610, second light absorber 612, or both. In some examples, the resistivity of third light absorber 614 can be less than the resistivity of first light absorber 610, second light absorber 612, or both. In some examples, the resistivity of third light absorber can be $\frac{1}{10}^{th}$ the resistivity of first light absorber 610, second light absorber 612, or both. In some examples, third light absorber 614 can be thermally coupled to second post 642. In some examples, inclusion of the third light absorber 614 can lead to a loss of sensitivity, but can also lead to a wider dynamic range.

Figure 7A:
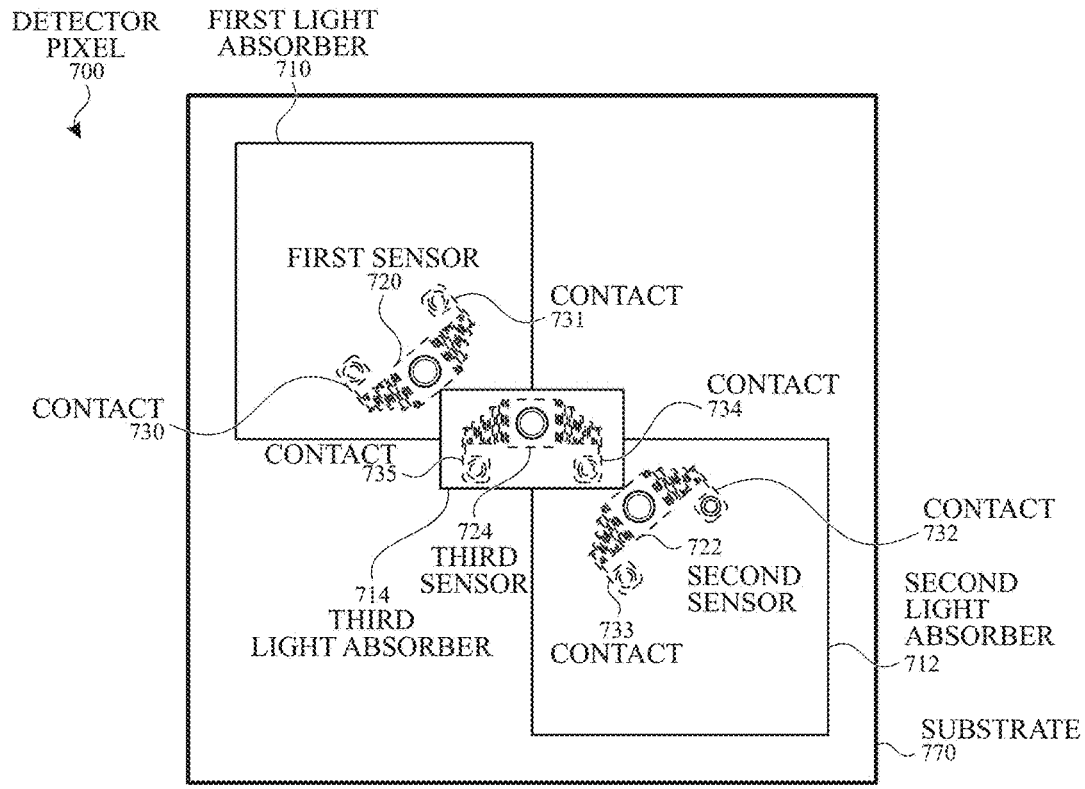
FIGS. 7A-7B illustrate exemplary top and cross-sectional views of a detector pixel including multiple absorbers according to examples of the disclosure.
Figure 7B:
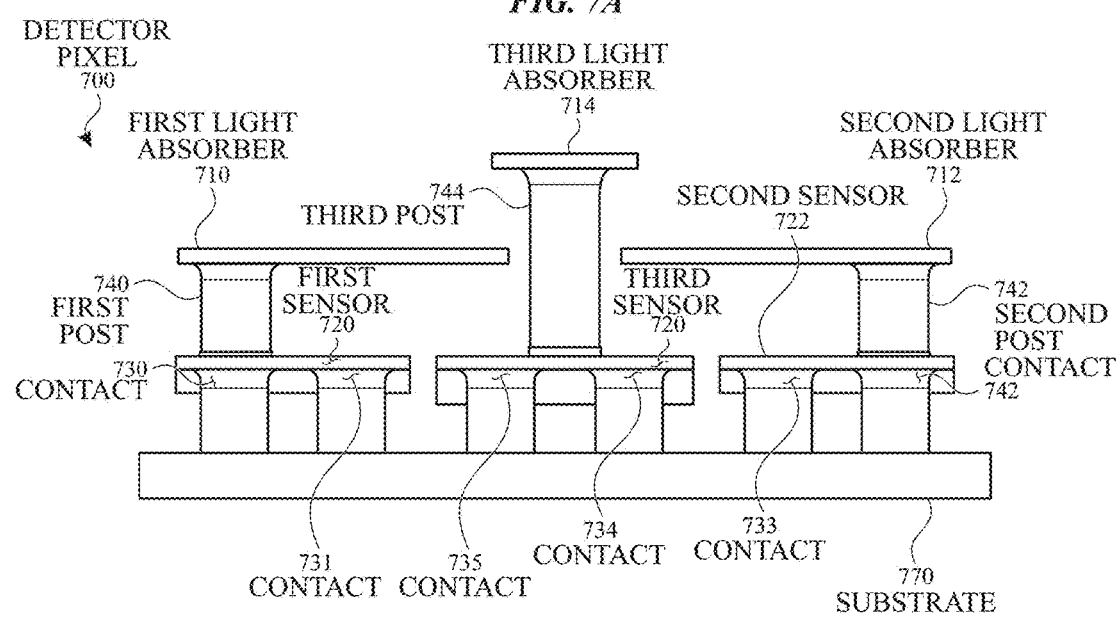

FIGS. 7A-7B illustrate exemplary top and cross-sectional views of a detector pixel including multiple absorbers according to examples of the disclosure. Detector pixel 700 can be a detector pixel including a first light absorber 710 and a second light absorber 712. First light absorber 710 and second light absorber 712 can include any material, such as NiCr, Phosphor Bronze, $V_xO_y$, and a-Si, capable of absorbing light. First light absorber 710 and second light absorber 712 can be exposed to electromagnetic radiation or incident light, and any light absorbed by the light absorber can produce heat within the light absorber, changing its temperature. The change in temperature in first light absorber 710 can be proportional to the amount of light absorbed in first light absorber 710, and the change in temperature in second light absorber 712 can be proportional to the amount of light absorbed in second light absorber 712. In some examples, first light absorber 710 and second light absorber 712 can include materials of the same composition. One skilled in the art would appreciate that the same material composition can include tolerances that result in a 15% deviation. In some examples, first light absorber 710 can be located on the same layer or plane as second light absorber 712. In some examples, third light absorber 714 can be located closer to incident light than first light absorber 710, second light absorber 712, or both. In some examples, first light absorber 710, second light absorber 712, or both can be located closer to substrate 770 than third light absorber 714. In some examples, first light absorber 710, second light absorber 712, or both can have a large TCR and can be capable of detecting small or minute changes in temperature (e.g., a large resistance change per change in material temperature).

First light absorber 710 can be thermally coupled to a first sensor 720 through first post 740. Second light absorber 712 can be thermally coupled to a second sensor 722 through second post 742. Both first sensor 720 and second sensor 722 can be mounted on a substrate 770 and both sensors can be any type of sensor capable of measuring a change in temperature. In some examples, first sensor 720, second sensor 722, or both can be a thermistor. In some examples, first sensor 720, second sensor 722, or both can be a resistor capable of changing a resistance in relation to changes in temperature experienced by the corresponding light absorber.

First post 740 and second post 742 can include any type of material capable of conducting heat from the corresponding light absorber to the corresponding sensor. In some examples, one or more of first light absorber 710 and second light absorber 712 can be coupled to one post. In some examples, one or more of first light absorber 710 and second light absorber 712 can be coupled to multiple posts. In some examples, first sensor 720, second sensor 722, or both can be thermally coupled to first light absorber 710 or second light absorber 712, respectively, by a direct or indirect physical connection through which heat can conduct. For example, first light absorber 710 can be directly coupled to first sensor 720, or heat may conduct through one or more intervening structures located between first light absorber 710 and first sensor 720 that are directly coupled to first light absorber 710 and first sensor 720.

Substrate 770 can include contact 730 and contact 731 coupled to first light absorber 710. Substrate 770 can also include contact 732 and contact 733 coupled to second light absorber 712. Contact 730, contact 731, contact 732, and contact 733 can be coupled to an integrated circuit, such as a ROIC. The integrated circuit can be coupled to a processor or controller. In some examples, the processor can bias the detector with a constant current or constant voltage and can measure the change in resistance through the contacts due to the light impinging on the light absorber. In some examples, at least one contact (e.g., contact 730 or contact 731) coupled to first light absorber 710 and at least one contact (e.g., contact 732 or contact 733) coupled to second light absorber 712 can be coupled to a common voltage, such as Vdetcom. In some examples, contact 730 or contact 731 and contact 732 or contact 733 can be coupled to the same biasing voltage source. In some examples, contact 730 or contact 731 and contact 732 or contact 733 can be coupled to the same circuitry or unit cell on the integrated circuit (e.g., ROIC).

In some examples, first light absorber 710 and second light absorber 712 can have the same optical properties. For example, first light absorber 710 and second light absorber 712 can include the same physical properties (e.g., material compositions, sizes, shapes, or any combination). One skilled in the art would appreciate that the same material compositions, same size, and same shape can include tolerances that result in a 15% deviation. In some examples, first light absorber 710 and second light absorber 712 can be coupled to the same sensor and/or contacts.

In some situations, a detector pixel can include a plurality of light absorbers, where the plurality of light absorbers can have the same dimensions. For example, a detector pixel can include two light absorbers, each occupying 50% of the footprint of detector pixel 700. Such a configuration can prevent saturation in situations of high flux light. However, the fill factor, equal to the area of the light sensitive area of the detector pixel to the total detector pixel area, can be poor or inefficient.

To prevent saturation in the situations of high flux light and to prevent inefficient fill factor, detector pixel 700 can include third light absorber 714. Third light absorber 714 can be different from at least one of first light absorber 710 and second light absorber 712. For example, third light absorber 714 can have different size, form factor, heat capacity, and/or type of material than first light absorber 710, second light absorber 712, or both.

Third light absorber 714 can be thermally coupled to a third sensor 724 through third post 744. Third sensor 724 can be mounted on a substrate 770 and can be any type of sensor, such as a thermistor or resistor, capable of measuring a change in temperature. In some examples, third sensor 724 can have the same optical properties as first sensor 720, second sensor 722, or both. One skilled in the art would appreciate that the same optical properties can include tolerances that result in a 15% deviation. Third post 744 can include any type of material capable of conducting heat from third light absorber 714 to third sensor 724. In some examples, third light absorber 714 can be coupled to one post. In some examples, third light absorber 714 can be coupled to multiple posts. Third sensor 724 can be electrically coupled to an integrated circuit (not shown) through contact 734 and contact 735. The integrated circuit can be coupled to a processor, computer, or controller, which can bias the detector pixel with a constant current or constant voltage and can measure the change in resistance through contact 734 and contact 735 due to light impinging on third light absorber 714.

In some examples, third light absorber 714 can be non-overlapping with first light absorber 710, second light absorber 712, or both. By configuring the light absorbers to be non-overlapping and spatially co-located, the light absorbers can collect all or a substantial amount of the photons from incident light. This can be unlike the situation where overlapping at least a portion of the light absorbers can risk losing photons from being incident on one or more light absorbers. In some examples, third light absorber 714 can be located closer to incident light than first light absorber 710, second light absorber 712, or both. In some examples, first light absorber 710, second light absorber 712, or both can be located closer to substrate 770 than third light absorber 714.

Due to the smaller size, for example, third light absorber 714 can be exposed to a lower percentage of the total incident light than first light absorber 710, second light absorber 712, or both. In some examples, the proportion of the relative sizes of the light absorbers can be equivalent to the proportion of incident light absorbed by each absorber. For example, first light absorber 710 can occupy 40% of the footprint of detector pixel 700, second light absorber 712 can occupy 40% of the footprint, and third light absorber 714 can occupy 20% of the footprint. As a result, first light absorber 710 and second light absorber 712 can each absorb 40% of incident light, and third light absorber 714 can absorb 20% of incident light. In some examples, third light absorber 714 can "shadow" a portion of at least one first light absorber 710 and second light absorber 712. For example, incident light not absorbed by third light absorber 714 can be incident on first light absorber 710 or second light absorber 712.

In some examples, the same configuration can be used to detect both high flux light and low flux light. For high flux light situations, for example, a portion of light can be absorbed by first light absorber 710, a portion of light can be absorbed by second light absorber 712, and a portion of light can be absorbed by third light absorber 714. Since different portions of light can be absorbed by different light absorbers, saturation of any one light absorber can be prevented. For low flux light situations, in some examples, first light absorber 710, second light absorber 712, third light absorber 714, or any combination of light absorbers can absorb light.

Although FIGS. 7A-7B illustrate three light absorbers, examples of the disclosure can include any number of light absorbers. Additionally, although the figures illustrate the three light absorbers as non-overlapping, examples of the disclosure can include one or more light absorbers that overlap (i.e., light not absorbed by one slight absorber can be incident on another light absorber) at least in part. In some examples, first light absorber 710 and second light absorber 712 can be concentric with third light absorber 714 shadowing or overlapping a portion of first light absorber 710 and second light absorber 712. In some examples, detector pixel 700 can include a fourth light absorber thermally coupled to first post 740 or second post 742 to prevent overloading of the sensor system due to a high bias current.

Figure 8A:
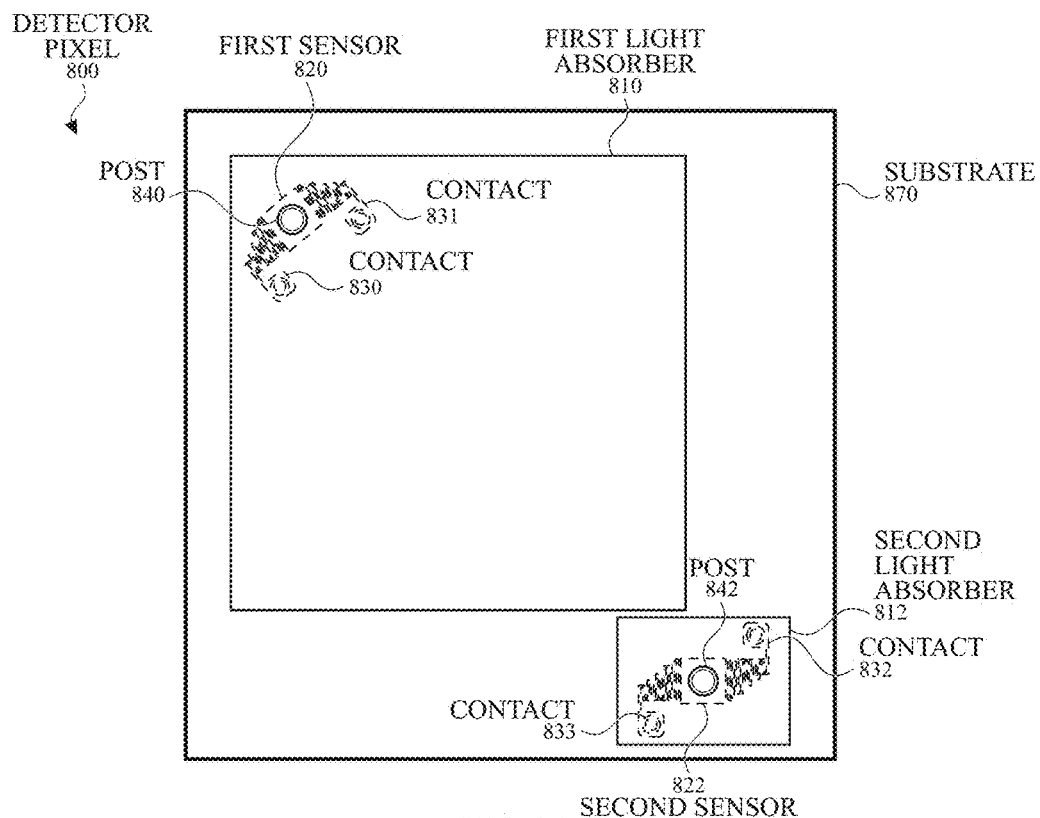
FIGS. 8A-8B illustrate exemplary top and cross-sectional views of a detector pixel including multiple absorbers with different sizes according to examples of the disclosure.
Figure 8B:
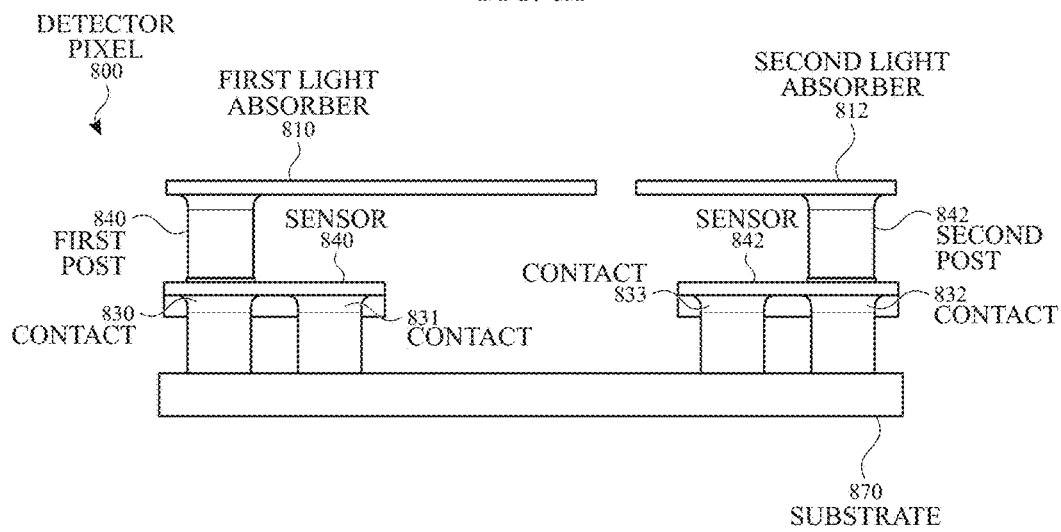

FIGS. 8A-8B illustrate exemplary top and cross-sectional views of a detector pixel including multiple absorbers with different sizes according to examples of the disclosure. Detector pixel 800 can include a first light absorber 810 and a second light absorber 812. First light absorber 810 and second light absorber 812 can be any material capable of absorbing light, including, but not limited to, NiCr, Phosphor Bronze, $V_xO_y$, and a-Si. In some examples, first light absorber 810 and second light absorber 812 can include materials of the same composition. One skilled in the art would appreciate that the same material composition can include tolerances that result in a 15% deviation. In some examples, first light absorber 810, second light absorber 812, or both can have a large TCR and can be capable of detecting small or minute changes in temperature. Although FIGS. 8A-8B illustrate two light absorbers, examples of the disclosure can include any number of light absorbers.

First light absorber 810 can be thermally coupled to a first sensor 820 through first post 840. Second light absorber 812 can be thermally coupled to a second sensor 822 through second post 842. First sensor 820 and second sensor 822 can be any type of sensor capable of measuring a change in temperature, such as a thermistor. In some examples, first sensor 820, second sensor 822, or both can be a resistor capable of changing a resistance in relation to changes in temperature experienced by the corresponding light absorber.

First post 840 can include any type of material capable of conducting heat from first light absorber 810 to first sensor 820. Second post 842 can include any type of material capable of conducting heat from second light absorber 812 to second sensor 822. In some examples, first light absorber 810, second light absorber 812, or both can be coupled to one post. In some examples, first light absorber 810, second light absorber 812, or both can be coupled to multiple posts. In some examples, first sensor 820 can be thermally coupled to first light absorber 810 by a direct or indirect physical connection through which heat can conduct. Similarly, second sensor 822 can be thermally coupled to second light absorber 812 by a direct or indirect physical connection through which heat can conduct. For example, first light absorber 810 can be directly coupled to first sensor 820, or heat may conduct through one or more intervening structures located between first light absorber 810 and first sensor 820 that are directly coupled to first light absorber 810 and first sensor 820.

Substrate 870 can include contact 830, contact 831, contact 832, and contact 833. Contact 830 and contact 831 can be configured to couple first sensor 820 to an integrated circuit, such as a ROIC. Similarly, contact 832 and contact 833 can be configured to couple second sensor 822 to the integrated circuit. The integrated circuit can be coupled to a processor or controller. In some examples, the processor can bias the detector with a constant current or constant voltage and can measure the change in resistance due to light impinging on the light absorber. In some examples, at least one contact (e.g., contact 830 or contact 831) coupled to first light absorber 810 and at least one contact (e.g., contact 832 or contact 833) coupled to second light absorber 812 can be coupled to a common voltage, such as Vdetcom. In some examples, contact 830 or contact 831 and contact 832 or contact 833 can be coupled to the same biasing voltage source. In some examples, contact 830 or contact 831 and contact 832 or contact 833 can be coupled to the same circuitry or unit cell on the integrated circuit (e.g., ROIC).

In some examples, first light absorber 810 and second light absorber 812 can have the same optical properties and/or physical properties. One skilled in the art would appreciate that the same optical properties can include tolerances that result in a 15% deviation. For example, first light absorber 810 and second light absorber 812 can include materials of the same composition and/or can have the same sizes. In some examples, first light absorber 810 and second light absorber 812 can be located on the same layer or plane. In some examples, first light absorber 810 and second light absorber 812 can be located on different layers or planes.

To prevent saturation (e.g., in situations of high flux light), first light absorber 810 can have one or more properties different from second light absorber 812. In some examples, first light absorber 810 can be greater in size than second light absorber 812. In some examples, first light absorber 810 and second light absorber 812 can occupy at least 80% of a full area of detector pixel 800, while maintaining electrical isolation and/or thermal isolation between the first light absorber and the second light absorber. Due to the smaller size, second light absorber 812 can be exposed to a lower percentage of the total incident light than first light absorber 810. In some examples, the proportion of the relative sizes of the light absorbers can be equivalent to the proportion of incident light absorbed by each absorber. For example, first light absorber 810 can occupy 80% of the footprint of detector pixel 800, and second light absorber 812 can occupy 20% of the footprint. First light absorber 810 can absorb 80% of the relative absorption (i.e., absorbed incident light or light incident on the surface area of the light absorbers that is absorbed by the light absorbers), and second light absorber 812 can absorb 20% of the relative absorption. In some examples, first light absorber 810 and second light absorber 812 are located such that neither absorber shadows (e.g., blocks from direct incident light) the other absorber, which can reduce number of steps in the fabrication process. Other exemplary properties that may be different between the light absorbers can include, but are not limited to, heat capacity, form factors, and type of material.

In some examples, the same configuration can be used to detect both high flux light and low flux light. For high flux situations, for example, a portion of light can be absorbed by first light absorber 810, and a portion of light can be absorbed by second light absorber 812. Since the absorption of light can be distributed among multiple light absorbers instead of being concentrated onto one light absorber, saturation of any one light absorber can be prevented. For low flux light situations, in some examples, first light absorber 810, second light absorber 812, or both can absorb light.

In some examples, the integrated circuit can read the photocurrent from first light absorber 810 at a different time from reading the photocurrent from second light absorber 812. In some examples, the integrated circuit can read the photocurrent from first light absorber 810 and second light absorber 812 at the same time, especially utilizing the total photocurrent from both light absorbers. In some examples, detector pixel 800 can include a third light absorber thermally coupled to first post 840 or second post 842 to prevent overloading of the sensor system due to a high bias current.

Although the exemplary detectors illustrated in the figures are illustrated as a single layer or two layer light absorbers, examples of the disclosure can include any number of layers and any number of absorbers. Furthermore, any or all of the detectors illustrated in the figures (e.g., detector pixel 600, detector pixel 700, and detector pixel 800) can be included in an imager.

Conventionally, bolometers have been tuned for a pre-determined flux range or time constant at the time of manufacture. However, without knowledge of the flux level beforehand, the pre-determined time constant may not be optimal for a given application. Therefore, tuning the time constant of the detector, which can affect the sensitivity, can be ideal, even for detectors with a wide dynamic range. The time constant of the detector can be an indication of how fast the detector can respond to incident light. The time constant can be a thermal time constant equal to the ratio of the heat capacity (i.e., ratio of the difference in heat from incident light to the resultant change in heat of the light absorber) of the light absorber to the thermal conductance (i.e., the rate of heat conduction). A faster time constant can result from a high thermal conductance, which can lead to a decrease in sensitivity and a slower response time. Conversely, a slower time constant can result from a low thermal conductance, which can lead to an increase in sensitivity and a faster response time. By tuning the time constant of the detector, the detector can be optimized after manufacture for different flux levels, or the detector can be electrostatically tuned for the range or level of flux that it is receiving.

Figure 9A:
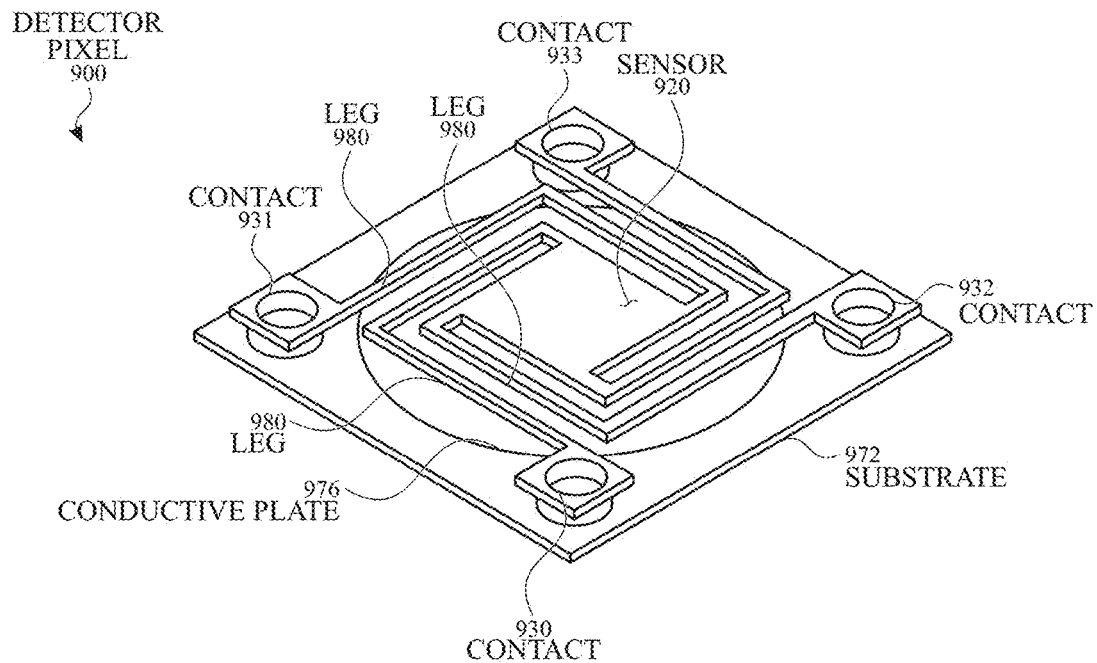
FIG. 9A illustrates a plan view of a portion of an exemplary detector capable of electrostatically tuning according to examples of the disclosure.

FIG. 9A illustrates a plan view of a portion of an exemplary detector capable of electrostatically tuning according to examples of the disclosure. Detector pixel 900 can include a sensor 920 can be coupled to a plurality of structures or legs 980. Sensor 920 and plurality of structures or legs 980 can be referred to as the body. Structures or legs 980 can be any material capable of supporting sensor 920. In some examples, structures or legs 980 can be electrically conductive. In some examples, plurality of structures or legs 980 can be electrically conductive spring structures or legs. In some examples, plurality of structures or legs 980 can be coupled to a plurality of contacts, such as contact 930, contact 931, contact 932, and contact 933. In some examples, sensor 920 can include four structures or legs coupled to four contacts. Two of the contacts (e.g., contact 930 and contact 932) can be coupled to an integrated circuit, such as a ROIC. One of the contacts (e.g., contact 931 or contact 933) can be coupled to a voltage or current source to electrically charge the body, as will be discussed below. Another contact can be used as another electrical conductor and/or can be used for mechanical support. The four structures or legs 980 can be used to maintain sensor 920 on the same plane (i.e., sensor 920 does not tilt, turn, or flip) as sensor 920 (or body) is electrostatically attracted to conductive plate 976, as will be discussed below.

Figure 9B:
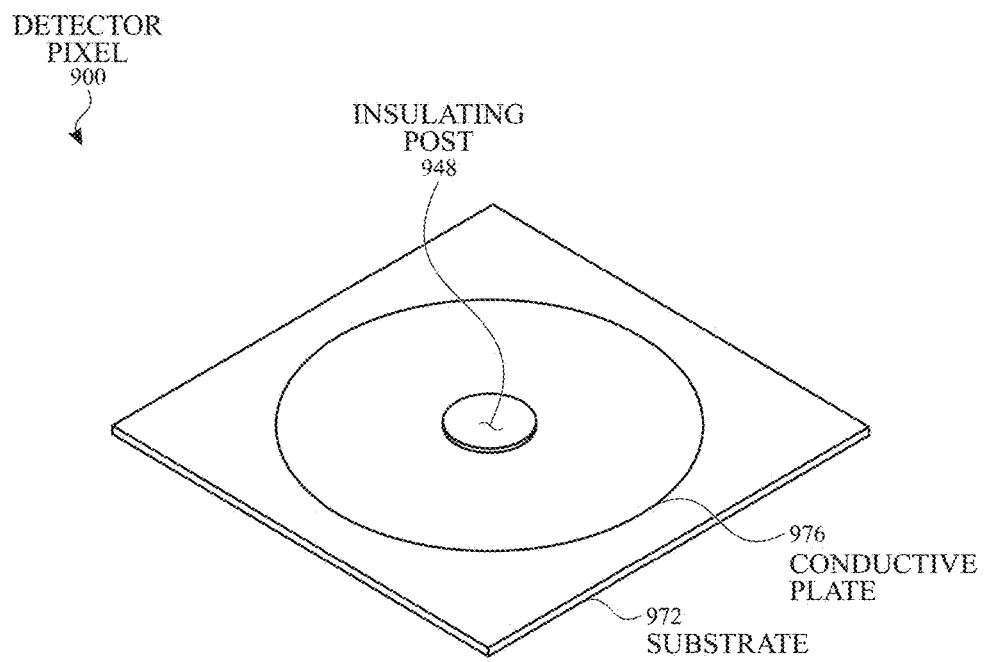
FIG. 9B illustrates a plan view of a portion of an exemplary detector illustrating a substrate configured as an electrostatic capacitor plate according to examples of the disclosure.

Detector pixel 900 can further include a substrate 972. FIG. 9B illustrates a plan view of a portion of an exemplary detector illustrating a substrate configured as an electrostatic capacitor plate according to examples of the disclosure. Conductive plate 976 can be disposed on or included in substrate 972. Conductive plate 976 can include any conductive material, including, but not limited to, gold (Au) and aluminum (Al). Conductive plate 976 can be any shape or size as long it is electrically insulated from the portions of the contacts carrying an electrical signal. For example, conductive plate 976 can be electrically insulated from contacts (e.g., contact 930 and contact 932) coupled to the integrated circuit and the contact configured to electrically charge the body (e.g., contact 931 or contact 933). In some examples, conductive plate 976 can include a plurality of conductive structures, where each conductive structure can be independently associated with a detector pixel in the detector array. In some examples, conductive plate 976 can be coupled to a voltage or current source (not shown). The voltage or current source can electrically charge conductive plate 976.

Substrate 972 can further include an insulating post 948. Insulating post 948 can include any material capable of electrically insulating conductive plate 976 and the body. Exemplary materials for insulating post 948 can include, but are not limited to, Silicon Dioxide ($SiO_2$) and Silicon Nitride ($Si_3N_4$). In some examples, the body can include a conductive material, such as gold or aluminum, facing conductive plate 976 and insulating post 948. In some examples, the conductive material on the body can be disposed on a side of sensor 920 opposite incident light. In some examples, sensor 920 can be disposed on a silicon substrate that is doped and conductive.

As discussed above, the body, which can include sensor 920 and the structures or legs 980, can be coupled to a voltage source, and conductive plate 976 can be coupled to another voltage source. A voltage difference can be applied across the body and conductive plate 976 such that an electrostatic attraction causes the gap between the body and insulating post 948 to decrease. In some examples, the voltage difference can be applied such that the electrostatic attraction causes the body and insulating post 948 to come into contact. Although the body and insulating post 948 can be touching or in contact, insulating post 948 can be configured with a height to prevent the body and conductive plate 976 from shorting. In some examples, insulating post 948 can be used to eliminate thermal runaway by acting as a heat sink to dissipate the heat from light absorbers 910.

The electrostatic attraction can vary with the applied voltage difference to change the pressure of the body against insulating post 948. The pressure of the body against insulating post 948 can be related to the thermal conductance of detector pixel 900. For example, a higher voltage difference can lead to a higher electrostatic attraction between the body and conductive plate 976. The higher electrostatic attraction can lead to a higher pressure or more contact of the body against insulating post 948. Higher pressure can lead to a higher thermal mass and therefore, a higher thermal conductance. As discussed above, a higher thermal conductance can lead to a decrease in sensitivity and a faster response time.

Conversely, a lower voltage difference applied between the body (e.g., the voltage applied to contact 931 coupled to the body and configured to electrically charge the body) and conductive plate 976 can lead to a lower electrostatic attraction between the body and conductive plate 976. The lower electrostatic attraction can lead to a lower pressure or less contact between the body and insulating post 948. Lower pressure can lead to a lower thermal mass, and therefore, a lower thermal conductance. Because of the lower thermal conductance, detector pixel 900 can have an increased sensitivity and a slower response time.

Optimization of detector pixel 900 for a given application can exploit the capabilities of a wide dynamic range that detector pixel 900 can offer. As discussed above, an image or a scene can include both bright (e.g., high photon flux) objects of interest and dim (e.g. low photon flux) objects. For the bright objects, detector pixel 900 can apply a large voltage difference between the body and conductive plate 976 to achieve a higher thermal conductance. While there may be a compromise in the sensitivity (e.g., lower sensitivity), the higher thermal conductance can outweigh the compromise by allowing detector pixel 900 to have a faster response time due to the higher dissipation of the heat generated in light absorbers 910. For the dim objects, detector pixel 900 can apply a small voltage difference between the body and conductive plate 976 to achieve a higher sensitivity (and lower thermal conductance). Although there may be a compromise in the response time (e.g., slower response time), the capability of higher sensitivity for detecting low flux light may be more advantageous because the low flux light may otherwise not be detected if the sensitivity is too low.

Figure 9C:
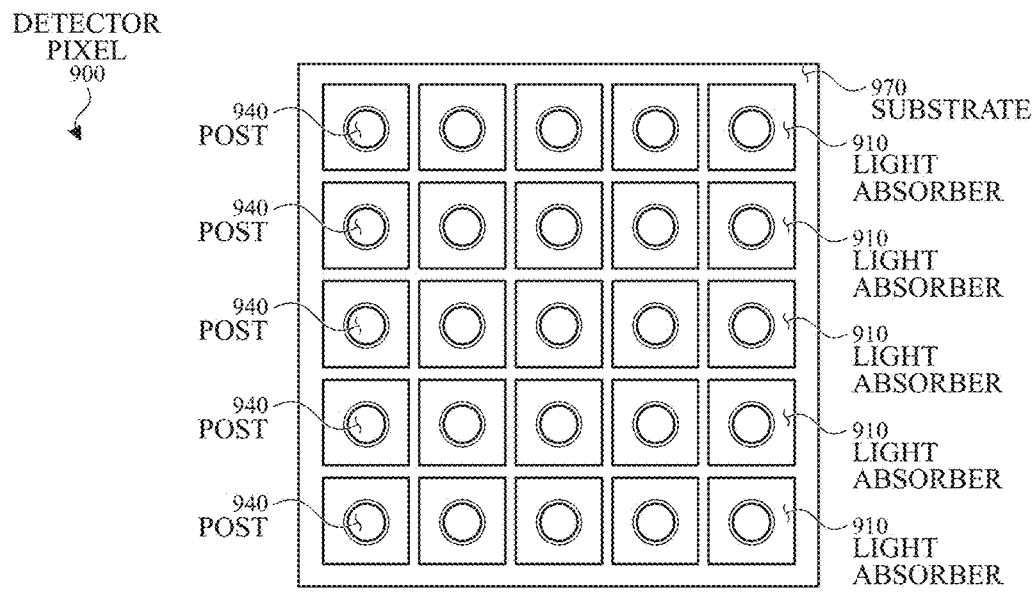
FIGS. 9C-9E illustrate top, plan, and cross-sectional views of an exemplary detector capable of electrostatically tuning for one or more flux levels according to examples of the disclosure.
Figure 9D:
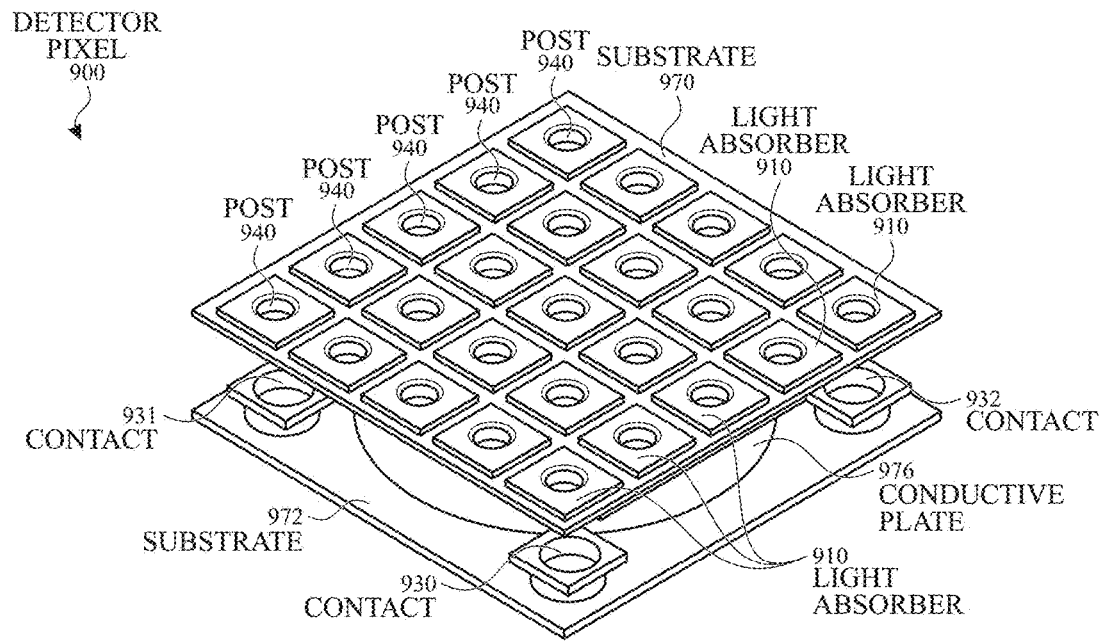
Figure 9E:
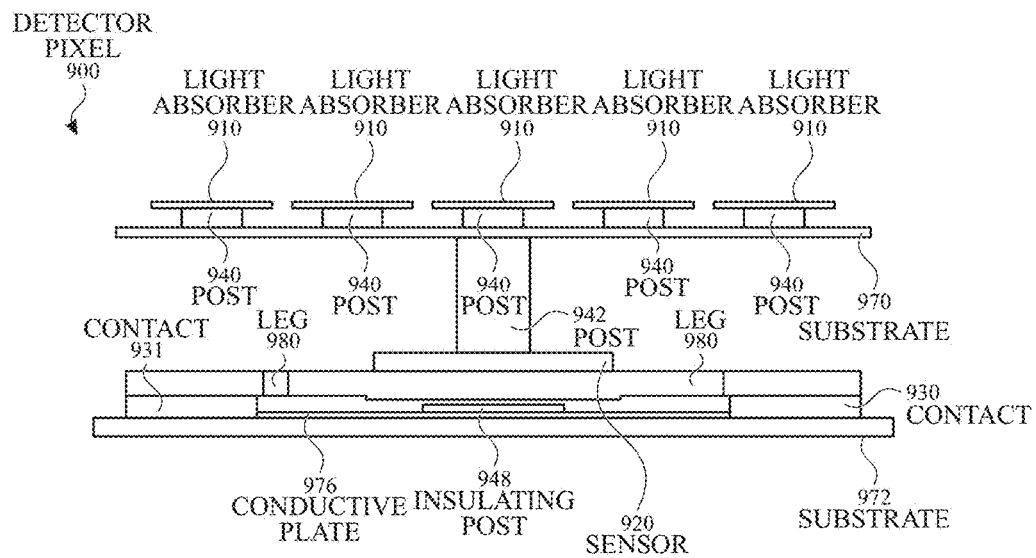

Conductive plate 976, legs 980, and sensor 920 can be included in any of the above disclosed detectors. FIGS. 9C-9E illustrate top, plan, and cross-sectional views of an exemplary detector capable of electrostatically tuning for one or more flux levels according to examples of the disclosure. In some examples, the same object can reflect or transmit bright light (e.g., high flux light) at some wavelengths, but dim light (e.g., low flux light) at other wavelengths. Detector pixel 900 can be capable of adjusting the thermal conductance, and therefore, can shift the dynamic range for a given wavelength. To detect the low flux light, detector pixel 900 can be configured for a slower response time, higher sensitivity, and a low thermal conductance. At other wavelengths, the object can have a high absorbance relative to a reference, and incident light on light absorbers 910 can be high flux light. The high flux light can lead to a large signal, so detector pixel 900 can be configured for a faster response time and a high thermal conductance. Without the capability of varying the response time or sensitivity, a detector may only be capable of operating at wavelengths with high flux light (e.g., around 2.2 µm) or at wavelengths with low flux light (e.g., around 1.9 µm), but not both which would limit the capabilities of the system and the measurement accuracy.

Although FIGS. 9A-9E illustrate sensor 920 coupled to four structures or legs 980, examples of the disclosure can include any number of structures or legs 980. For example, sensor 920 can include three structures or legs 980 coupled to three contacts. Two of the contacts (e.g., contact 930 and contact 931) can be coupled to an integrated circuit and a third contact (e.g., contact 932) can be coupled to a voltage or current source to electrically charge the body. In some examples, a fourth leg can be excluded or not utilized for mechanical support so that sensor 920 can tilt a small degree when electrostatically attracted to conductive plate 976. The small degree of tilt can be used to achieve a higher level of granularity in the contact pressure of sensor 920 (or body) against conductive plate 976. For example, the small degree of tilt can be 0.5-1°.

Figure 10:
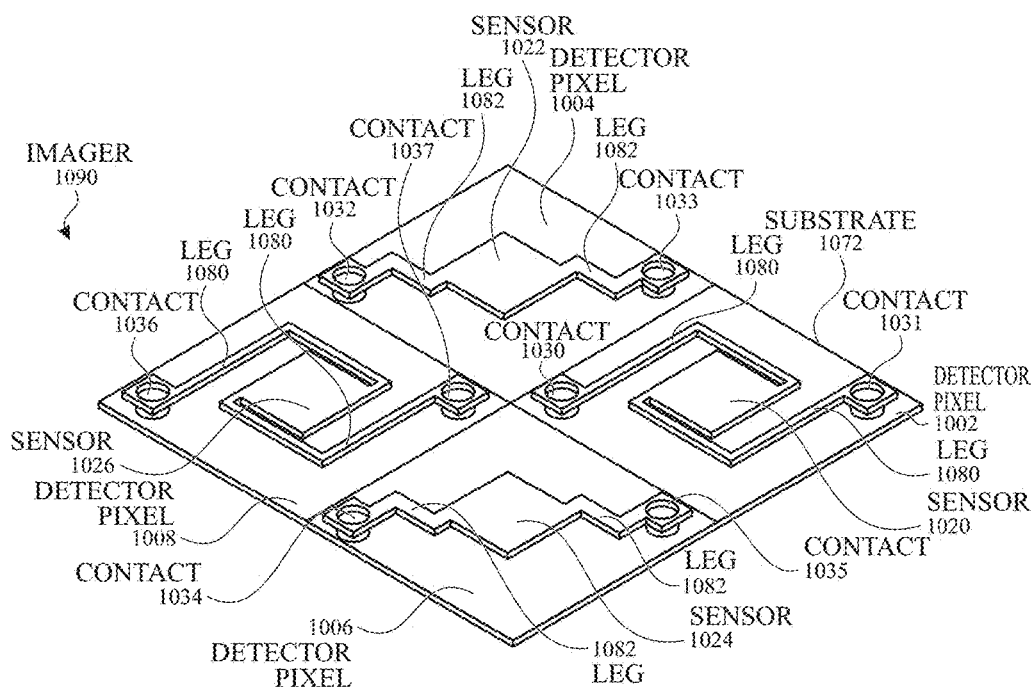
FIG. 10 illustrates plan view of a portion of an exemplary detector illustrating a plurality of detector pixels with intermixed time constants according to examples of the disclosure.

In some examples, due to the small size of the detector pixels in a detector array, two adjacent detector pixels can be sampling the same area of a scene. Instead of having redundant signal values from the two adjacent detector pixels sampling the same area of a scene, the detector can achieve a wide dynamic range by intermixing detector pixels with different time constants. FIG. 10 illustrates a plan view of a portion of an exemplary detector illustrating a plurality of detector pixels with intermixed time constants according to examples of the disclosure. Imager 1090 can include a plurality of detector pixels, such as detector pixel 1002, detector pixel 1004, detector pixel 1006, and detector pixel 1008. Each detector pixel can be coupled to a different light absorber through a post. Each detector pixel can include a sensor disposed on substrate 1072. Sensor 1020 can be included in detector pixel 1002, sensor 1022 can be included in detector pixel 1004, sensor 1024 can be included in detector pixel 1006, and sensor 1026 can be included in detector pixel 1008. Sensor 1020, sensor 1022, sensor 1024, and sensor 1026 can be any type of sensor, such as a thermistor or resistor, capable of measuring a change in temperature.

Substrate 1072 can include a plurality of contacts. Contact 1030 and contact 1031 can be included in detector pixel 1002 and can be coupled to sensor 1020. Contact 1032 and contact 1033 can be included detector pixel 1004 and can be coupled to sensor 1022. Contact 1034 and contact 1035 can be included in detector pixel 1006 and can be coupled to sensor 1024. Contact 1036 and contact 1037 can be included in detector pixel 1008 and can be coupled to sensor 1026. The contacts can be configured to couple the corresponding sensor to a unit cell in an integrated circuit. The integrated circuit can be coupled to a processor or controller. In some examples, the processor can bias each detector pixel of the detector array with a constant current or constant voltage and can measure the change in resistance due to light impinging on the corresponding light absorber. In some examples, at least two contacts can be coupled to a common voltage, such as Vdetcom. In some examples, at least two contacts can be coupled to the same biasing voltage source. In some examples, at least two sets of contacts can be coupled to the same circuitry or unit cell on the integrated circuit (e.g., ROIC).

Sensor 1020 of detector pixel 1002 can be coupled to contact 1030 and contact 1031 through structures or legs 1080. Similarly, sensor 1026 of detector pixel 1008 can be coupled to contact 1036 and contact 1037 through structures or legs 1080. Structures or legs 1080 can be any electrically conductive material capable of supporting sensor 1020 or sensor 1026. In some examples, structures or legs 1080 can be electrically conductive. In some examples, structures or legs 1080 can be conductive spring structures or legs. In some examples, structures or legs 1080 included in detector pixel 1002 can have the same electrical properties to structures or legs 1080 included in detector pixel 1008. One skilled in the art would appreciate that the same electrical properties can include tolerances that result in a 15% deviation.

Sensor 1022 of detector pixel 1004 can be coupled to contact 1032 and contact 1033 through structures or legs 1082. Similarly, sensor 1024 of detector pixel 1006 can be coupled to contact 1034 and contact 1035 through structures or legs 1082. Structures or legs 1082 can be any electrically conductive material capable of supporting sensor 1022 or sensor 1024. In some examples, structures or legs 1082 can be electrically conductive. In some examples, structures or legs 1082 can be conductive spring structures or legs. In some examples, structures or legs 1082 included in detector pixel 1004 can have the same electrical properties as structures or legs 1082 included in detector pixel 1004. In some examples, the total length of structures or legs 1080 can be greater than the total length of structures or legs 1082. Because of having a longer length, detector pixels (e.g., detector pixel 1002 and detector pixel 1008) including structures or legs 1080 can have a slow time constant. Additionally, as a result of a shorter length, detector pixels (e.g., detector pixel 1004 and detector pixel 1006) including structures or legs 1082 can have a faster time constant. In some examples, structures or legs 1080 and 1082 can have other different properties, such as resistance or thermal conductivity, which can create a difference in time constant.

The arrangement of the detector array can be such that the time constant of the detector pixels can alternate between a fast time constant using structures or legs, such as structures or legs 1082, having a shorter length and a slow time constant using structures or legs, such as structures or legs 1080, having a longer length. Detector pixels (e.g., detector pixel 1004 and detector pixel 1006) with a fast time constant and detector pixels (e.g., detector pixel 1002 and detector pixel 1008) with a slow time constant can absorb incident light of the same wavelength, but the response can be different due to the differences in the understructure (e.g., the length of the structures or legs). In some examples, the alternating detector pixel types can form a checkerboard-type pattern. By alternating between detector pixels with a fast time constant and detector pixels with a slow time constant, imager 1090 can have a wide dynamic range because adjacent detector pixels, which can share the same image information (i.e., adjacent detector pixels can sample the same area of the scene), can have the capability of both fast time constant, high flux light detection and slow time constant, low flux light detection.

Although imager 1090 can be coupled to a conventional ROIC or the one illustrated in FIG. 5, the response of the sensor system can be limited by the frame rate of the ROIC. The frame rate can be the frequency or speed that the integrated charge or voltage can be sampled and read out to processor 562. ROIC 500 can have a single frame rate where each row select line 544 and each column select line 546 can be activated at the same speed. As a result, the detector pixels in imager 1090 with fast time constant can be limited by the frame rate of the ROIC, which can negate any benefits of having a detector array with intermixed time constants.

Figure 11A:
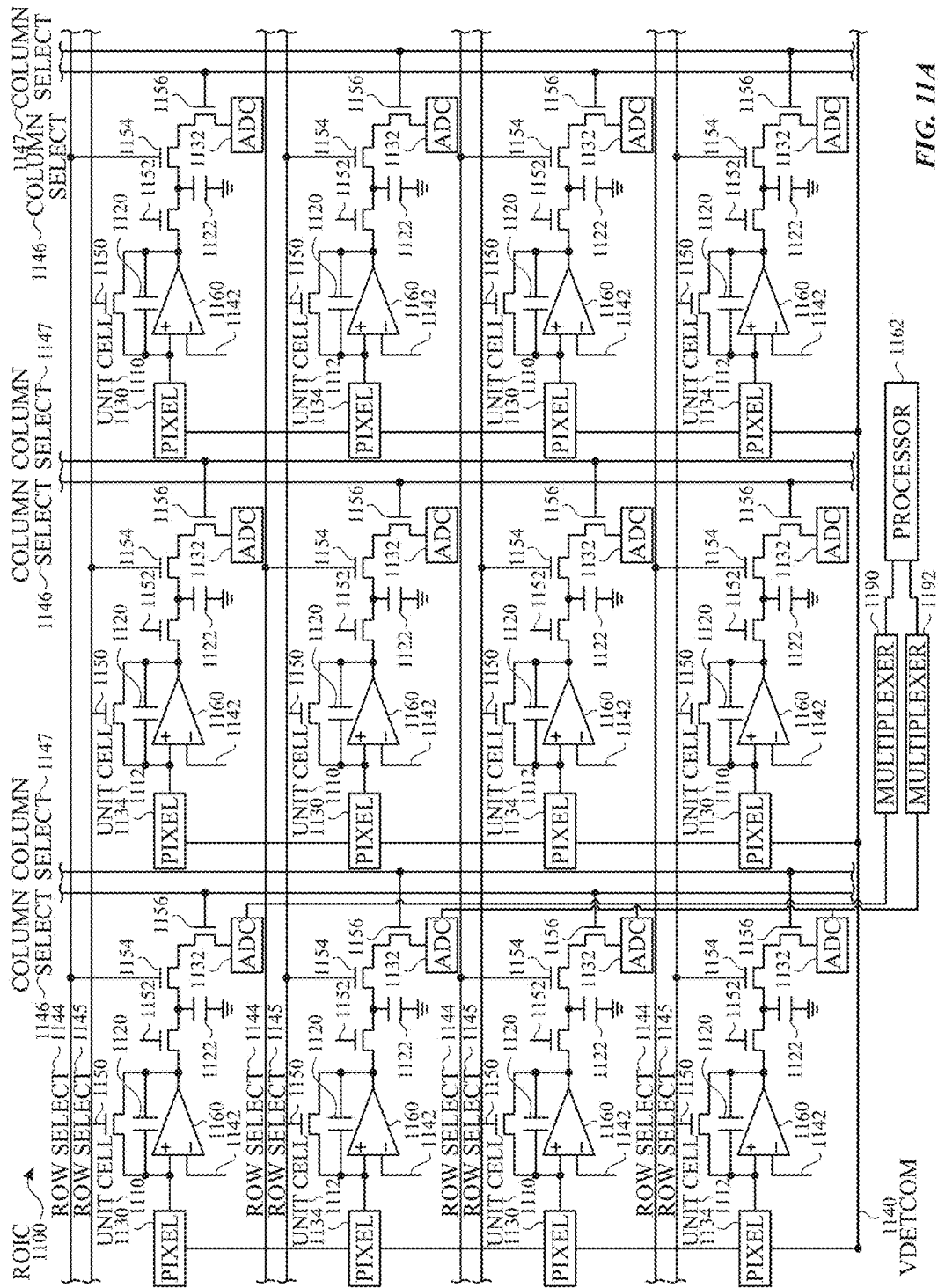
FIG. 11A illustrates an exemplary ROIC capable of multiple frame rates according to examples of the disclosure.

FIG. 11A illustrates an exemplary ROIC capable of multiple frame rates according to examples of the disclosure. ROIC 1100 can comprise a plurality of unit cells 1110 and a plurality of unit cells 1112. Each unit cell 1110 and unit cell 1112 in ROIC 1100 can be coupled to a detector pixel 1130 or detector pixel 1134, respectively, included in a detector array. Unit cell 1110 can convert a photocurrent generated by each detector pixel 1130 (coupled to Vdetcom 1140) to a voltage indicative of the properties of detected light. Unit cell 1112 can convert a photocurrent generated by each detector pixel 1134 (coupled to Vdetcom 1140) to a voltage indicative of the properties of detected light.

Unit cell 1110 and unit cell 1112 can comprise an integrator, a preamplifier, a SH circuit, and an ADC 1132. In some examples, the current from detector pixel 1130 (or detector pixel 1134) can be weak or small, incremental current. One way to generate a large measurable output from the small, incremental current can be to integrate the photocurrent using an integrating capacitor $C_{int}$ 1120. Integrating capacitor 1120 can be coupled to a detector pixel 1130 (or detector pixel 1134) in the detector array. Integrating capacitor $C_{int}$ 1120 can be configured to store charge associated with light detected by the corresponding detector pixel 1130 (or detector pixel 1134). Integrating capacitor $C_{int}$ 1120 can be coupled to an amplifier 1160. An integration time can be set to determine the fixed period of time when the photocurrent from detector pixel 1130 (or detector pixel 1134) can be integrated. At the end of the integration time, $C_{int}$ can be proportional to the current, and should represent incident light on detector pixel 1130 (or detector pixel 1134). A reset transistor 1150 can be coupled to the integrating capacitor $C_{int}$ 1120 to discharge the capacitor. At the end of the integration time, the integrated voltage can be sampled and held on a hold capacitor $C_{SH}$ 1122 through transistor SH 1152. The hold capacitor $C_{SH}$ 1122 can be configured to store the integrated charge.

ROIC 1100 can include two independent image state machines. Unit cells 1110 can be coupled to row select lines 1144, whereas unit cells 1112 can be coupled to row select lines 1145. Unit cells 1112 can be coupled to column select lines 1146, whereas unit cells 1112 can be coupled to column select lines 1147. Row select lines 1144 and column select lines 1146 coupled to unit cells 1110 can be activated (i.e., the integrated charge from unit cells 1110 can be sampled) at a first frame rate. Row select lines 1145 and column select lines 1147 coupled to unit cells 1112 can be activated (i.e., the integrated charge from unit cells 1112 can be sampled) at a second frame rate. In some examples, the first frame rate can be different from the second frame rate. In some examples, the second frame rate can be equal to (or within 10% from) a multiple of the first frame rate, where the multiple can be equal to (or within 10% from) the ratio of the thermal conductivities of the structures or legs of the corresponding adjacent detector pixels. For example, unit cell 1110 can be coupled to detector pixel 1004 of imager 1090, and unit cell 1112 can be coupled to detector pixel 1002 of imager 1090. Detector pixel 1004 can have a thermal conductance that is ten times greater than the thermal conductance of detector pixel 1002 due to structures or legs 1082 having a higher thermal conductance and longer length than structures or legs 1080. The second frame rate can be 60 Hz, and due to the ten times greater thermal conductance, the first frame rate can be 600 Hz. As a result, the response of the two different detector pixels (e.g., detector pixel 1002 and detector pixel 1004) can differ by the same multiple (e.g., 10×).

Figure 11B:
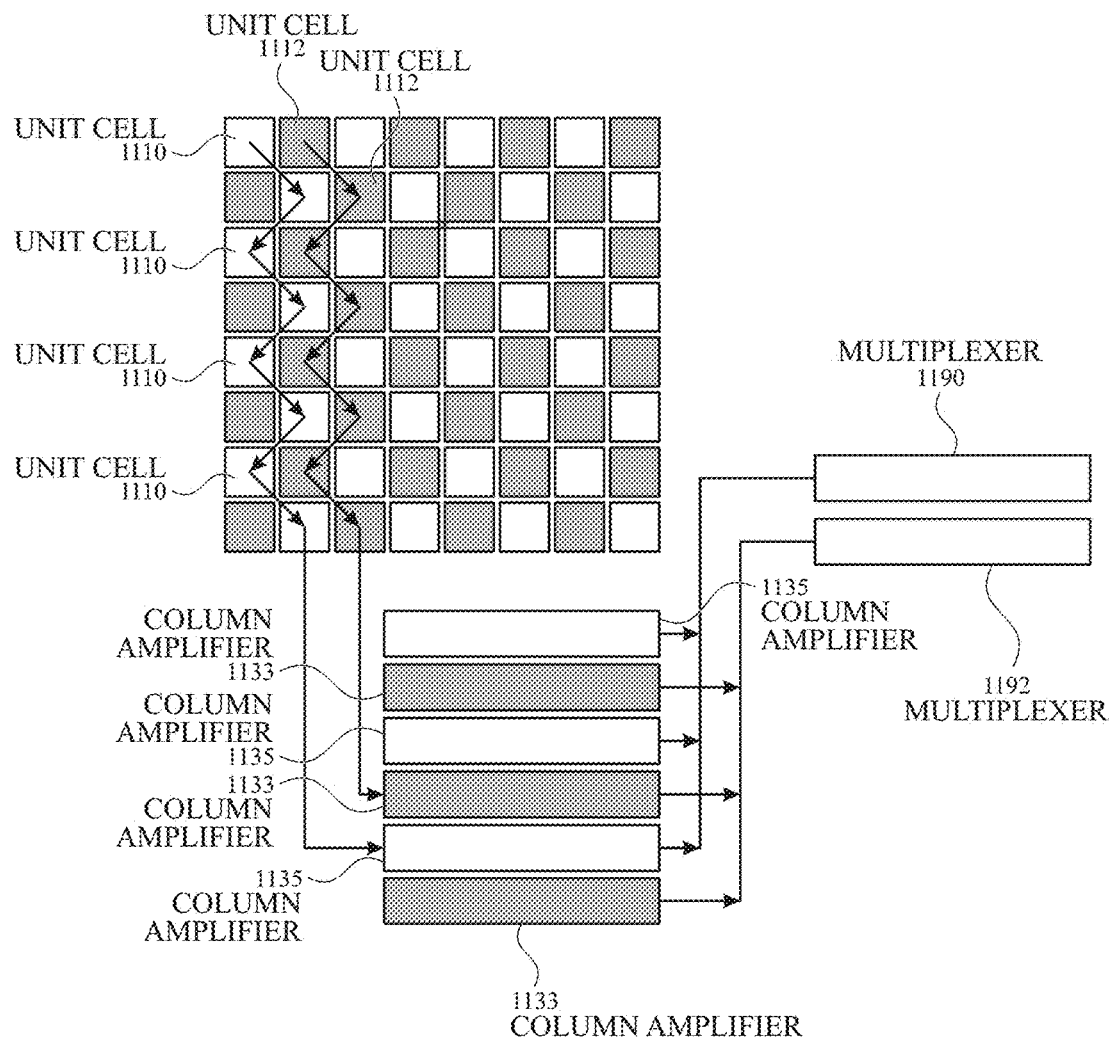
FIG. 11B illustrates an exemplary ROIC capable of multiple frame rates with unit cells arranged in a checkboard-pattern according to examples of the disclosure.

ROIC 1100 can further include a plurality of multiplexers. Unit cells 1110 can be coupled to a multiplexer 1190, and unit cells 1112 can be coupled to a multiplexer 1192. FIG. 11B illustrates an exemplary ROIC capable of multiple frame rates with unit cells arranged in a checkboard-pattern according to examples of the disclosure. ROIC 1100 can be arranged such that unit cells 1110 and unit cells 1112 are interleaved in an alternating pattern (i.e., checkerboard-pattern). As illustrated, unit cells 1110 can be coupled to column amplifier 1135 and multiplexer 1190, and unit cells 1112 can be coupled to column amplifier 1133 and multiplexer 1192.

Although FIGS. 11A-11B illustrate two independent image state machines, two sets of row select lines (e.g., row select lines 1144 and row select lines 1145), two sets of column select lines (e.g., column select lines 1146 and column select lines 1147), two multiplexers (e.g., multiplexer 1190 and multiplexer 1192), and two different frame rates (e.g., 60 Hz and 600 Hz), examples of the disclosure are not limited to two, but can include any number of state machines, sets of row select lines, sets of column select lines, multiplexers, and frame rates. Furthermore, although FIGS. 11A-11B illustrate ROIC 1100 arranged in a checkerboard-pattern, examples of the disclosure can include any arrangement suitable for incorporating multiple frame rates.

As discussed above, the photocurrent from a detector can be integrated using an integrating capacitor (e.g., integrating capacitor Cint 520 in FIG. 5 or integrating capacitor 1120 in FIG. 11A). The integrating capacitor can store charge related to both the photocurrent and the dark current. The dark current can be leakage current generated in response to the bias voltage applied to the detector. The dark current can be based on several factors such as the bandgap of the material, the quality of the material growth, and the size of the active area of the detector. A larger dark current can lead to a lower SNR and a higher output current stored in the integrating capacitor. In some examples, the dark current can saturate the integrating capacitor.

Saturation of the integrating capacitor due to dark current can be prevented by lower the temperature or actively cooling the detector, for example. In general, the dark current can increase when the temperature of the detector increases. However, actively cooling the detector may not be feasible for certain applications. Active cooling can require higher power consumption and result in a larger and heavier device, which may not be suitable for portable electronic devices, for example. Furthermore, in some examples, active cooling may not be sufficient to lower the dark current to prevent saturation of the integrating capacitor.

To prevent saturation of the integrating capacitor, the frame rate of the ROIC can be increased. When an integrating capacitor is sampled or read out, the capacitor can be reset or discharged, thereby preventing residual charge that can increase the likelihood of saturation. In some examples, the frame rate can be determined based on a specific readout time. In some examples, the frame rate can be based on the capacitance of the integrating capacitor. In some examples, the frame rate can be based on the intended application and/or properties of the object being measured. In some examples, the frame rate can be based on the dark current, the active area of the detector, or both. In some examples, the frame rate can be based on the optical flux.

When the optical flux increases, the frame rate can increase. For example, in applications including active illumination (i.e., illumination of the measured object or the active area of the detector by a light source), the saturation may need to be higher to account for optical flux and higher photocurrents. Active illumination can be advantageous due to the lower amount of unwanted variations in the output current due to ambient light levels and inherent reflection of objects in the background (i.e., objects distinct from the object of interest). The unwanted variations can make it difficult to generate reproducible results and to account for differences in environmental conditions. Furthermore, active illumination can lead to a higher ratio of photocurrent to dark current, and thus, a higher SNR. In some examples, active illumination can lead to a photocurrent that is 2-10 times greater than the dark current. In some examples, the active illumination source can be configured to emit 100 nW per detector pixel. In some examples, the frame rate can be greater than 60 Hz. In some examples, the frame rate can be between 1 kHz and 10 kHz, which can be useful for applications such as spectroscopy.

Furthermore, saturation of the integrating capacitor can be prevented by employing a larger integrating capacitor. The capacitance of the integrating capacitor can depend on many factors such as the frame rate and the active area of the detector. For higher frame rates, the integrating capacitor can be discharged more frequently. As a result, for the same saturation level, the capacitance of the integrating capacitor can be smaller. For example, a 100 mega electron integrating capacitor can be used with a 1 kHz frame rate or a 10 mega electron integrating capacitor can be used with a 10 kHz frame rate. For detector pixels with a larger active area, the capacitance of the integrating capacitor can be increased. For example, a 10 mega electron integrating capacitor can be used for a 15 μm detector pixel size or smaller or a 100 mega electron integrating capacitor can be used for a 15-20 μm detector pixel size. In some examples, the capacitance of the integrating capacitor can be determined based on the speed of the ADC. In some examples, the capacitance of the integrating capacitor can be based on the source optical flux. For a higher source optical flux, the capacitance of the integrating capacitor can be larger.

In some examples, the capacitance of the integrating capacitor can be based on the active area of the detector divided by the frame rate. For example, a 400 mega electron integrating capacitor can be used for a 30 μm detector pixel size operating at a frame rate of 100 kHz, and a 40 mega electron integrating capacitor can be used for the same size detector pixel when operating at a frame rate of 10 kHz.

Figure 12:
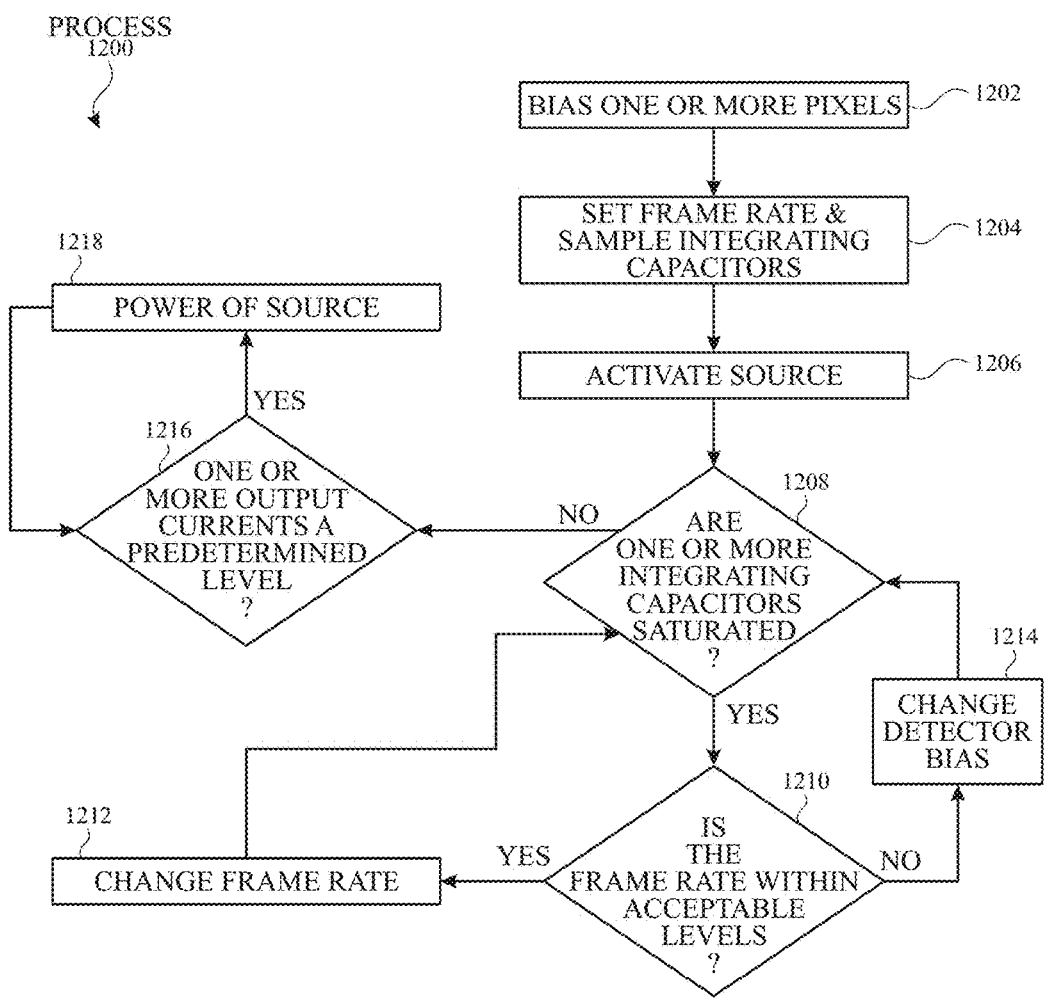
FIG. 12 illustrates an exemplary process flow for adjusting one or more parameters of the ROIC to prevent saturation of the integrated capacitors according to examples of the disclosure.

FIG. 12 illustrates an exemplary process flow for adjusting one or more parameters of the ROIC to prevent saturation of the integrated capacitors according to examples of the disclosure. Process 1200 can begin with biasing one or more detector pixels (step 1202). A controller or user can set a frame rate for sampling and reading one or more integrated capacitors (step 1204). In some examples, the frame rate can be a predetermined value. The controller or user can active the illumination source (step 1206). In some examples, the controller or user can activate the illumination source only after determining that the power consumption of the device is below another predetermined value, for example. The controller or user can determined if the output current is saturating one or more integrating capacitors, is greater than a predetermined level, a higher contrast is desired, or any combination therefore (step 1208). If so, the controller or user can determine if the frame rate is within an acceptable range (step 1210). If the frame rate is within an acceptable range, the frame rate can be changed (step 1212). For example, the frame rate can be increased to increase the sensitivity without saturating the integrating capacitors. In some examples, the acceptable range can be based on the application. If the frame rate is not within an acceptable range, the bias applied to the detector can be changed (step 1214). In some examples, the controller can determine if the detector is background-limited in performance (BLIP) limited and can adjust the frame rate if not. In some examples, the controller can determine that the output current is not saturating one or more integrating capacitors (or is less than or equal to a first predetermined level), while also below a second predetermined level (e.g., a level sufficient to ascertain the photocurrent) (step 1216). If the output current is below the first predetermined level, the power of the illumination source can be adjusted (step 1218). In this manner, the system can dynamically change the frame rate, power of the illumination source, and detector bias to account for variations in optical flux (due to the properties of the measured object, for example), environmental conditions, and desired detector performance (e.g., sensitivity).

One or more of the functions described above can be performed, for example, by firmware stored in memory and executed by a processor or controller. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus, or device, a portable computer diskette (magnetic), a random access memory (RAM) (magnetic), a read-only memory (ROM) (magnetic), an erasable programmable read-only memory (EPROM) (magnetic), a portable optical disc such as a CD, CD-R, CD-RW, DVD, DVD-R, or DVD-RW, or flash memory such as compact flash cards, secured digital cards, USB memory devices, memory sticks and the like. In the context of this document, a "transport medium" can be any medium that can communicate, propagate, or transport the program for use by or in connection with the instruction execution system, apparatus, or device. The transport readable medium can include, but is not limited to, an electronic, magnetic, optical, electromagnetic, or infrared wired or wireless propagation medium.

A light detector is disclosed. The light detector can comprise: a first light absorber configured to absorb one or more first wavelengths of light and including at least one of a plurality of slits, a mesh, and a plate absorber; a first temperature sensor thermally coupled to the first light absorber; and a second light absorber configured to absorb one or more second wavelengths of light. Additionally or alternatively to one or more examples disclosed above, in some examples, the first light absorber includes a plurality of slits oriented in a first polarizing direction, and the second light absorber includes a plurality of slits oriented in a second polarizing direction different from the first polarizing direction. Additionally or alternatively to one or more examples disclosed above, in some examples, the second polarizing direction is orthogonal to the first polarizing direction. Additionally or alternatively to one or more examples disclosed above, in some examples, the light detector further comprises: a third light absorber including a plurality of slits oriented in a third polarizing direction orthogonal to the first polarizing direction; a third temperature sensor thermally coupled to the third light absorber; a fourth light absorber including a plurality of slits oriented in a fourth polarizing direction orthogonal to the second polarizing direction; and a fourth temperature sensor thermally coupled to the fourth light absorber. Additionally or alternatively to one or more examples disclosed above, in some examples, the light detector further comprises: a second temperature sensor thermally coupled to the second light absorber, wherein the first and second temperature sensors are electrically coupled, and the light detector is capable of determining an angle of polarization of light absorbed by the first and second light absorbers based on a differential reading between the first and second temperature sensors. Additionally or alternatively to one or more examples disclosed above, in some examples, the first light absorber includes a plurality of embedded slits or polarizer lines. Additionally or alternatively to one or more examples disclosed above, in some examples, the plurality of slits of the first light absorber are spaced a first distance apart, the first distance equal to a quarter of at least one of the one or more first wavelengths of light. Additionally or alternatively to one or more examples disclosed above, in some examples, a length of an outer edge of the first light absorber is equal to a long-end wavelength of the one or more first wavelengths of light. Additionally or alternatively to one or more examples disclosed above, in some examples, a distance between adjacent slits included in the plurality of slits of the first light absorber is equal to a short-end wavelength of the one or more first wavelengths of light. Additionally or alternatively to one or more examples disclosed above, in some examples, the second light absorber includes a second post to thermally couple to the first temperature sensor, the detector further comprising: a third light absorber configured to absorb light, wherein the third light absorber includes a third post to thermally couple to the first temperature sensor; and a fourth light absorber configured to absorb light, wherein the fourth light absorber includes a fourth post to thermally couple to the first temperature sensor. Additionally or alternatively to one or more examples disclosed above, in some examples, the light detector further comprises: an encapsulation disposed on at least a portion of the first light absorbers and including a transparent material. Additionally or alternatively to one or more examples disclosed above, in some examples, the light detector further comprises: an encapsulation supporting at least the first and second light absorbers. Additionally or alternatively to one or more examples disclosed above, in some examples, the light detector further comprises: a second temperature sensor thermally coupled to the second light absorber; and a processor capable of calculating an angle of polarization of light absorbed by the first and second light absorbers based on at least information from the first and second temperature sensors. Additionally or alternatively to one or more examples disclosed above, in some examples, the light detector further comprises: a reflector having a surface facing at least one of the first and second light absorbers and spaced a distance equal to a quarter of at least one of the one or more first wavelengths of light or at least one of the one or more second wavelengths of light. Additionally or alternatively to one or more examples disclosed above, in some examples, the light detector further comprises: a second temperature sensor thermally coupled to the second light absorber, wherein the reflector is thermally coupled to at least one of the first and second temperature sensors. Additionally or alternatively to one or more examples disclosed above, in some examples, the light detector further comprises: one or more structures configured to support the reflector; and an encapsulation, the encapsulation comprising a same material as the one or more structures. Additionally or alternatively to one or more examples disclosed above, in some examples, the light detector further comprises: a first electrical insulator thermally coupled to the first light absorber and the first temperature sensor, wherein the first electrical insulator electrically isolates the first light absorber from the second light absorber, and further wherein the first temperature sensor thermally couples the first light absorber to the second light absorber. Additionally or alternatively to one or more examples disclosed above, in some examples, the first and second light absorbers are included in a plurality of light absorbers, each light absorber is a mesh, and the plurality of light absorbers form a capacitive resonant mesh. Additionally or alternatively to one or more examples disclosed above, in some examples, the mesh of the first light absorber includes a plurality of wires spaced a first distance apart, the first distance equal to a quarter of at least one of the one or more first wavelengths of light. Additionally or alternatively to one or more examples disclosed above, in some examples, the plurality of slits of the first light absorber at least partially overlaps the plurality of slits of the second light absorber. Additionally or alternatively to one or more examples disclosed above, in some examples, the one or more first wavelengths of light includes at least one of the one or more second wavelengths of light, and further wherein the first light absorber is spaced a second distance from the second light absorber, the second distance equal to a quarter of the at least one of the one or more second wavelengths of light to be absorbed by the first and second light absorbers. Additionally or alternatively to one or more examples disclosed above, in some examples, the light detector further comprises: a first post thermally coupled to the first light absorber and first temperature sensor, wherein the first post passes through the second light absorber while remaining thermally isolated from the second light absorber. Additionally or alternatively to one or more examples disclosed above, in some examples, the light detector further comprises: a second temperature sensor thermally coupled to the second light absorber, and a second post, wherein the first post is located at a first position of the first light absorber, and the second post is located at a second position of the first light absorber, and further wherein the first position and the second position are symmetric with respect to a center position of the first light absorber. Additionally or alternatively to one or more examples disclosed above, in some examples, the first light absorber overlaps the second light absorber, and further wherein at least one of the one or more first wavelengths of light is longer than at least one of the one or more second wavelengths of light. Additionally or alternatively to one or more examples disclosed above, in some examples, at least one of the one or more first wavelengths of light and the one or more second wavelengths of light includes short-wavelength infrared (SWIR), and further wherein the light detector is configured to be uncooled. Additionally or alternatively to one or more examples disclosed above, in some examples, a size of the first light absorber differs from a size of the second light absorber.

A method of detecting incident radiation is disclosed. The method can comprise: applying a first voltage to a first light absorber included in a detector; applying a second voltage to a second light absorber included in the detector; measuring a first photocurrent from the first light absorber, the first photocurrent associated with one or more first wavelengths of light; measuring a second photocurrent from the second light absorber, the second photocurrent associated with one or more second wavelengths of light; and determining a polarization of the incident radiation based on the measured first and second photocurrents. Additionally or alternatively to one or more examples disclosed above, in some examples, the second photocurrent is included in the first photocurrent, and further wherein the measuring the first photocurrent and measuring the second photocurrent includes determining a different reading between the first light absorber and the second light absorber.

An uncooled light detection system is disclosed. The detection system can comprise: a detector pixel configured to detect incident light; an illumination source configured to emit light; and a readout circuit including one or more integrating capacitors, wherein each integrating capacitor has a predetermined capacitance, and the readout circuit is configured to operate at a frame rate determined such that the product of the predetermined capacitance and the frame rate is proportional to an active area of the detector pixel. Additionally or alternatively to one or more examples disclosed above, in some examples, the product of the predetermined capacitance and the framerate is proportional to a dark current value obtained from the readout circuit. Additionally or alternatively to one or more examples disclosed above, in some examples, the predetermined capacitance is between 10-200 mega electrons. Additionally or alternatively to one or more examples disclosed above, in some examples, the frame rate is between 1-10 kHz. Additionally or alternatively to one or more examples disclosed above, in some examples, a target wavelength of light to be absorbed by the detector pixel is greater than 1.7 microns. Additionally or alternatively to one or more examples disclosed above, in some examples, the detection system is configured to operate at a temperature above 15 degrees Celsius. Additionally or alternatively to one or more examples disclosed above, in some examples, a power level of the illumination source is dynamically set such that a photocurrent measured by the readout circuit is greater than a dark current value obtained from the readout circuit. Additionally or alternatively to one or more examples disclosed above, in some examples, the power level of the illumination source is dynamically set such that the photocurrent measured by the readout circuit is 2-10 times the dark current value obtained from the readout circuit. Additionally or alternatively to one or more examples disclosed above, in some examples, the uncooled light detection system further comprises an array of detector pixels including the detector pixel, wherein the array of detector pixels is incorporated in an imager.

A method of operating a light detection system, the light detection system including one or more detector pixels and a readout circuit is disclosed. The method can comprise: applying a bias to the one or more detector pixels; setting a frame rate of the readout circuit; sampling an integrating capacitor included in the readout circuit to obtain an output current; determining whether the integrating capacitor is saturated based on the output current; and increasing the frame rate of the readout circuit in response to determining that the integrating capacitor is saturated. Additionally or alternatively to one or more examples disclosed above, in some examples, the light detection system further includes an illumination source, and the method further comprising: determining whether a photocurrent included in the output current is greater than a predetermined threshold; and increasing a power of the illumination source in response when the output current is less than or equal to the predetermined threshold. Additionally or alternatively to one or more examples disclosed above, in some examples, the method further comprises: determining whether an updated frame rate is within a predetermined ranged; increasing the frame rate to the updated frame rate when the updated frame rate is within the predetermined range; and adjusting the bias applied to the one or more detector pixels when the updated frame rate is outside the predetermined range.

An integrated circuit configured for measuring a plurality of photocurrents from a detector array is disclosed. The method can comprise: a first set of select lines and a second set of select lines; a first set of unit cells coupled to the first set of select lines and configured to operate at a first frame rate; a second set of unit cells coupled to the second set of select lines and configured to operate at a second frame rate, wherein the first set of units cells are interleaved with the second set of unit cells; and a first multiplexer coupled to the first set of unit cells and a second multiplexer coupled to the second set of unit cells, wherein the first frame rate is different from the second frame rate. Additionally or alternatively to one or more examples disclosed above, in some examples, the first set of unit cells are coupled to a first set of amplifiers having a first gain and the second set of unit cells are coupled to a second set of amplifiers having a second gain, and further wherein the first gain is different from the second gain.

An imager is disclosed. The imager can comprise: a first set of detector pixels, each detector pixel in the first set including: one or more first light absorbers, each first light absorber configured for absorbing light and producing heat in response to the absorbed light, a first sensor thermally coupled to the one or more first light absorbers and configured for detecting a temperature change in the one or more first light absorbers due to the absorbed light, and a plurality of first structures having a first characteristic and coupled to the first sensor and a plurality of first contacts; and a second set of detector pixels, each detector pixel in the second set including: one or more second light absorbers, each second light absorber configured for absorbing light and producing heat in response to the absorbed light, a second sensor thermally coupled to the one or more second light absorbers and configured for detecting a temperature change in the one or more second light absorbers due to the absorbed light, and a plurality of second structures having a second characteristic and coupled to the second sensor and a plurality of second contacts, wherein the first characteristic and second characteristic include one or more lengths, time constants, resistances, or thermal conductivities that are different. Additionally or alternatively to one or more examples disclosed above, in some examples, the first set of detector pixels are interleaved with the second set of detector pixels. Additionally or alternatively to one or more examples disclosed above, in some examples, the plurality of first structures has a length longer than the plurality of second structures, and further wherein the one or more first light absorbers has a slower time constant than the one or more second light absorbers.

A method of integrating a plurality of photocurrents is disclosed. The method can comprise: sampling a first set of voltage values stored in a first set of capacitors; transmitting the first set of voltage values to a first multiplexer; sampling a second set of voltage values stored in a second set of capacitors; transmitting the second set of voltage values to a second multiplexer; reading the first set of voltage values from the first multiplexer at a first frame rate; reading the second set of voltage values from the second multiplexer at a second frame rate, wherein the first frame rate is different from the second frame rate. Additionally or alternatively to one or more examples disclosed above, in some examples, the first set of voltage values are associated with a first set of detector pixels and the second set of voltage values are associated with a second set of detector pixels, and further wherein a ratio of the second frame rate to the first frame rate is equal to a ratio of a thermal conductivity of the first set of detector pixels and a thermal conductivity of the second set of detector pixels. Additionally or alternatively to one or more examples disclosed above, in some examples, the method further comprises: setting the first frame; and setting the second frame rate such that the first frame rate is equal to a multiple of the second frame rate.

A detector pixel is disclosed. The detector pixel can comprise: a first light absorber configured for absorbing a first light and producing heat in response to the first light; a second light absorber configured for absorbing a second light and producing heat in response to the second light; a first sensor thermally coupled to the first light absorber and configured for detecting a first temperature change in the first light absorber due to the absorbed first light; and a plurality of first contacts electrically coupled to the first sensor and a circuit, wherein the circuit is further coupled to the second light absorber. Additionally or alternatively to one or more examples disclosed above, in some examples, the second light absorber is disposed on a substrate and is located closer to the substrate than the first light absorber. Additionally or alternatively to one or more examples disclosed above, in some examples, the first light absorber overlaps at least a portion of the second light absorber, the first light being incident on the first light absorber and including a first portion and a second portion, the first portion absorbed by the first light absorber and the second portion not absorbed by the first light absorber, and wherein the second light absorber absorbs the second portion of the first light. Additionally or alternatively to one or more examples disclosed above, in some examples, the detector pixel further comprises: a second sensor thermally coupled to the second light absorber and configured for detecting a second temperature change in the second light absorber due to the absorbed second light; and one or more second contacts electrically coupled to the second sensor and the integrated circuit. Additionally or alternatively to one or more examples disclosed above, in some examples, the first sensor is thermally coupled to the second light absorber and configured for detecting a second temperature change due to the absorbed second light. Additionally or alternatively to one or more examples disclosed above, in some examples, an absorbance of the first light absorber is greater than an absorbance of the second light absorber. Additionally or alternatively to one or more examples disclosed above, in some examples, a sensitivity of the first light absorber is less than a sensitivity of the second light absorber. Additionally or alternatively to one or more examples disclosed above, in some examples, the second light absorber is configured for absorbing the second light only when a flux of the first light and second light is greater than a threshold value. Additionally or alternatively to one or more examples disclosed above, in some examples, the first light and second light are different, and the first light absorber and second light absorber are non-overlapping. Additionally or alternatively to one or more examples disclosed above, in some examples, the first light absorber and second light absorber are different sizes. Additionally or alternatively to one or more examples disclosed above, in some examples, the detector pixel further comprises: a third light absorber configured for absorbing a third light and producing heat in response to the third light; a third sensor thermally coupled to the third light absorber and configured for detecting a third temperature change in the third light absorber due to the absorbed third light; and one or more third contacts electrically coupled to the third sensor and the integrated circuit. Additionally or alternatively to one or more examples disclosed above, in some examples, an incident light includes the first light and the second light, and further wherein the third light absorber is located closer to the incident light than at least one of the first light absorber and the second light absorber. Additionally or alternatively to one or more examples disclosed above, in some examples, the third light absorber has at least one of a different size, form factor, heat capacity, and type of material than at least one of the first light absorber and the second light absorber. Additionally or alternatively to one or more examples disclosed above, in some examples, an absorbance of the third light absorber is less than an absorbance of the first light absorber, second light absorber, or both. Additionally or alternatively to one or more examples disclosed above, in some examples, the detector pixel is incorporated into an imager configured for absorbing short-wave infrared wavelength light. Additionally or alternatively to one or more examples disclosed above, in some examples, the detector pixel further comprises: a thermal structure coupled to the first sensor and the plurality of first contacts; and a third light absorber configured for absorbing at least one of the first light and second light, the third light absorber thermally coupled to the thermal structure. Additionally or alternatively to one or more examples disclosed above, in some examples, the third light absorber includes a same material composition as the first light absorber and has a resistivity equal to 10% of a resistivity of the first light absorber.

A method of detecting incident radiation is disclosed. The method can comprise: receiving a first photocurrent from a first light absorber included in a detector pixel; receiving a second photocurrent from a second light absorber included in the detector pixel; determining whether the first photocurrent is indicative of a flux of incident light greater than or equal to a flux threshold value; and when the flux of incident light is greater than or equal to a flux threshold value, ignoring the first photocurrent and determining one or more properties of incident light based on the second photocurrent. Additionally or alternatively to one or more examples disclosed above, in some examples, the method further comprises: when the flux of incident light is less than the flux threshold value, determining one or more properties of incident light based on the first photocurrent.

A detector pixel is disclosed. The detector pixel can comprise: one or more light absorbers, each light absorber configured for absorbing light and producing heat in response to the absorbed light; one or more sensors thermally coupled to the one or more light absorbers and configured for detecting a temperature change in the one or more light absorbers due to the absorbed light; a plurality of contacts, each sensor of the one or more sensors coupled to at least two of the plurality of contacts; a plurality of conductive structures, each conductive structure coupled to one of the one or more sensors and one of the plurality of contacts; a first conductive plate coupled to at least one of the plurality of contacts and configured for receiving a first electrical charge from the at least one of the plurality of contacts, wherein at least one of the one or more sensors and first conductive plate are located on a first substrate; and a second conductive plate located on a second substrate and configured for receiving a second electrical charge, the second conductive plate including an insulator. Additionally or alternatively to one or more examples disclosed above, in some examples, the plurality of structures includes: a first structure and a second structure configured to electrically couple one of the one or more sensors to an integrated circuit, a third structure configured to electrically couple a voltage source to the first conductive plate, and a fourth structure configured to mechanically support one of the one or more sensors and prevent the one of the one or more sensors from tilting, turning, flipping, or a combination thereof. Additionally or alternatively to one or more examples disclosed above, in some examples, the detector pixel is incorporated into a sensor system, the sensor system including: a first voltage source coupled to at least one of the plurality of contacts and configured to apply a first voltage to the first conductive plate, and a second voltage source coupled to the second conductive plate and configured to apply a second voltage to the second conductive plate, wherein applying the first voltage and applying the second voltage creates a voltage difference across the first conductive plate and the second conductive plate such that the first and second conductive plates are electrostatically attracted to each other. Additionally or alternatively to one or more examples disclosed above, in some examples, the insulator included in the second conductive plate is configured as a heat sink to thermally conduct heat away from the one or more light absorbers.

A method of detecting incident radiation is disclosed. The method can comprise: applying a first voltage to a first conductive plate included in a detector element; applying a second voltage to a second conductive plate included in the detector element, wherein the second conductive plate includes an insulator, causing the first conductive plate to contact the insulator included in the second conductive plate by creating a difference between the applied first voltage and applied second voltage. Additionally or alternatively to one or more examples disclosed above, in some examples, the difference between the applied first voltage and applied second voltage is based on a flux of the incident radiation, thermal conductance of the detector element, or both.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:
1. A light detector comprising:
a plurality of light absorbers including:
a first light absorber configured to absorb light, and
a second light absorber configured to absorb light,
wherein the first light absorber is thermally coupled to the second light absorber;

at least one electrical isolator configured to electrically isolate the first light absorber from the second light absorber; and a sensor thermally coupled to the first light absorber and second light absorber, wherein the sensor is configured to generate one or more signals indicative of the absorbed light.

2. The light detector of claim 1, wherein the at least one electrical isolator includes:
a first electrical insulator coupled to the first light absorber, and
a second electrical insulator coupled to the second light absorber.

3. The light detector of claim 1, further comprising:
a plurality of posts including:
a first post configured to thermally couple the first light absorber to the sensor, and
a second post configured to thermally couple the second light absorber to the sensor.

4. The light detector of claim 3,
wherein the plurality of light absorbers further include:
a third light absorber configured to absorb light, and
a fourth light absorber configured to absorb light,
the first, second, third, and fourth light absorbers thermally coupled together,
wherein the plurality of posts further includes:
a third post configured to thermally couple the third light absorber to the sensor, and
a fourth post configured to thermally couple the fourth light absorber to the sensor.

5. The light detector of claim 4, wherein:
each of the plurality of posts is located at a unique corner of the respective light absorber, and
the plurality of light absorbers fan out from a center of the light detector.

6. The light detector of claim 1, wherein the plurality of light absorbers includes a plurality of wires that form a capacitive resonant mesh, wherein the absorbed light is selected based on at least a spacing of the plurality of wires.

7. The light detector of claim 1, where the plurality of light absorbers is configured to select the absorbed light from a range of wavelengths, wherein the range of wavelengths is associated with lengths of edges of the plurality of light absorbers and a spacing of a plurality of features included in the plurality of light absorbers.

8. The light detector of claim 1, further comprising:
a reflector configured to reflect incident light, wherein the reflector is thermally coupled to the plurality of light absorbers,
wherein the sensor is thermally coupled to the plurality of light absorbers through the reflector.

9. The light detector of claim 8, wherein an absorbing surface of at least one of the plurality of light absorbers faces the reflector.

10. The light detector of claim 8, wherein a distance between an absorbing surface of at least one of the plurality of light absorbers and the reflector is equal to a quarter of a wavelength of the absorbed light.

11. The light detector of claim 1, wherein the plurality of light absorbers are plate absorbers.

12. The light detector of claim 1, wherein the at least one electrical isolator is an encapsulation further configured to thermally couple the plurality of light absorbers to the sensor.

13. The light detector of claim 1, further comprising:
a plurality of another light absorbers including:
a fifth light absorber configured to absorb light, and
a sixth light absorber configured to absorb light; and
at least one another electrical isolator configured to electrically isolate the fifth light absorber from the sixth light absorber,
wherein the plurality of another light absorbers is located on a different layer than the plurality of light absorbers, and
wherein the sensor is thermally coupled to the fifth light absorber and the sixth light absorber.

14. An imager comprising:
an array of detector pixels, each detector pixel including:
a plurality of first light absorbers thermally coupled together, each first light absorber configured to absorb light,
at least one electrical isolator configured to electrically isolate the plurality of first light absorbers from each other, and
a first sensor thermally coupled to the plurality of first light absorbers;
a plurality of contacts configured to transmit signals to and from the array of detector pixels to an integrated circuit; and
the integrated circuit configured to:
receive signals indicative of the absorbed light, and
transmit signals to control operation of the array of detector pixels.

15. The imager of claim 14, wherein at least one detector pixel further includes:
a plurality of posts, each post configured to thermally couple a respective one of the plurality of first light absorbers to the respective first sensor included in the at least one detector pixel.

16. The imager of claim 15, wherein for the at least one detector pixel:
each of the plurality of posts is located at a corner of one of the plurality of first light absorbers,
the plurality of posts are located at different corners of the plurality of first light absorbers, and
the plurality of first light absorbers fan out from a center of the at least one detector pixel.

17. The light detector of claim 14, further comprising:
a second light absorber located on a different layer than the plurality of first light absorbers; and
a second sensor thermally coupled to the second light absorber.

18. A method for operating a light detector, the method comprising:
electrically isolating a plurality of light absorbers from each other;
thermally coupling the plurality of light absorbers to each other and to a sensor;
biasing the plurality of light absorbers; and
measuring one or more of a change in resistance and a change in temperature of the plurality of light absorbers using the sensor, wherein the measured change is indicative of an absorption of incident light by the light detector.

19. The method of claim 18, further comprising:
redirecting the incident light using a reflector to the plurality of light absorbers, wherein the plurality of light absorbers are thermally coupled to the sensor using the reflector.

20. The method of claim 18, wherein the plurality of light absorbers are electrically isolated from each other using an encapsulation, and further wherein the plurality of light absorbers are thermally coupled to each other and to the sensor using the encapsulation.

\* \* \* \* \*